United States Patent
Davies et al.

(10) Patent No.: US 11,989,203 B1
(45) Date of Patent: May 21, 2024

(54) METHODS, DEVICES, AND SYSTEMS FOR OUTPUTTING A REPRESENTATION OF DATA

(71) Applicant: Omnivisto Limited, Tonbridge (GB)

(72) Inventors: Barnaby Davies, Ilkley (GB); Damian Hagger, Wakefield (GB)

(73) Assignee: Omnivisto Limited, Tonbridge (GB)

( * ) Notice: Subject to any disclaimer, the term of this patent is extended or adjusted under 35 U.S.C. 154(b) by 165 days.

(21) Appl. No.: 17/820,081

(22) Filed: Aug. 16, 2022

(51) Int. Cl.
| | |
|---|---|
| G06F 16/00 | (2019.01) |
| G06F 16/26 | (2019.01) |
| G06F 16/28 | (2019.01) |
| G06F 16/901 | (2019.01) |

(52) U.S. Cl.
CPC ............ *G06F 16/26* (2019.01); *G06F 16/285* (2019.01); *G06F 16/9024* (2019.01)

(58) Field of Classification Search
CPC ..... G06F 16/26; G06F 16/285; G06F 16/9024
See application file for complete search history.

(56) References Cited

U.S. PATENT DOCUMENTS

| 11,170,215 B1* | 11/2021 | Sieracki | G06F 18/2453 |
| 2019/0332963 A1* | 10/2019 | Wong | G06N 20/00 |
| 2023/0230338 A1* | 7/2023 | Prochnow | G06Q 50/02 |
| | | | 382/103 |

OTHER PUBLICATIONS

Kwon et al, "Clustervision: Visual Supervision of Unsupervised Clustering",IEEE,pp. 142-151 (Year: 2018).*
Timeline Storyteller (Alpha), https://timelinestoryteller.com/img/annotation.gif, accessed on Dec. 6, 2022, 1 page.

* cited by examiner

*Primary Examiner* — Alexander Khong
(74) *Attorney, Agent, or Firm* — NK Patent Law

(57) ABSTRACT

In one aspect, a method of outputting a representation of data is described. The method is executed by a digital electronic processor communicatively coupled to at least one display device and comprises receiving a dataset comprising a plurality of data items, each data item comprising one or more parameters. In response to determining that a first representation of the plurality of data items fits within a display area of the at least one display device, outputting the first representation to the display area. In response to determining that the first representation exceeds the display area: determining one or more clusters of data items by performing a clustering analysis based on at least one of the one or more parameters, wherein the or each cluster of data items corresponds to a sub-region of the display area.

20 Claims, 49 Drawing Sheets

Typical smart phone aspect ratio (20:9)

METHODS, DEVICES, AND SYSTEMS FOR OUTPUTTING A REPRESENTATION OF DATA

FIELD OF THE INVENTION

The present invention relates to displaying a representation of data.

BACKGROUND

Technology has resulted in increasing volumes of data being available to decision makers and stakeholders in every setting. The data is diverse as are the audiences, their preferences and the uses to which the data is being put.

There are a very great many existing approaches to visualising data of varying sophistication. All assist in the interpretation of data. Allowing a greater ease in the review and interpretation supports the goals of publishing the data in the first place. Data that is opaque and difficult to interpret is less likely to be acted upon than data that is transparent and easy to review. The exploitable value of data is closely correlated to the ease with which it can be reviewed and consumed.

A practical constraint that limits the ability of data to reach its potential is that data sets are often very large. Typical approaches to visualising data are often constrained by the available display area of the physical media on which they are being viewed. This is as valid on a large desktop computer display as it is for an A4-sized piece of paper or a smartphone or tablet screen. Modern data sets have no practical threshold to limit their size but the displays on which they are visualized and interpreted do.

Equally, it is not necessarily the data that is the goal in itself for those seeking to review it. Rather than the data and corresponding detail, what is often sought is information and insight. The specific appetites and preferences of those reviewing the data cannot always (of even typically) be anticipated by those publishing it. This creates a challenge as any decision by those publishing the data on how best to condense it for meaningful publication is often a unilateral decision. Data is rolled up or summarised and the imperatives for this are typically a) retaining an overall level of meaning in the data and b) condensing it in a way that supports the medium in which it is published.

A by-product of the decisions made by those publishing the data is that it has the opportunity to introduce bias.

Any mechanism that supports the visualisation of data sets of any size, which in turn allows those data sets to be published (and exploited maximally) regardless of the physical medium in which they are displayed would be advantageous. Furthermore, an approach that was broadly agnostic with respect to the input data and one which supported the breadth of the detail contained in the underlying data set would be an improvement over the current state of the art.

SUMMARY

According to a first aspect of the invention, there is provided a method executed by a digital electronic processor communicatively coupled to at least one display device, comprising: receiving a dataset comprising a plurality of data items, each data item comprising one or more parameters. In response to determining that a first representation of the plurality of data items fits within a display area of the at least one display device, outputting the first representation to the display area. In response to determining that the first representation exceeds the display area: determining one or more clusters of data items by performing a clustering analysis based on at least one of the one or more parameters, wherein the or each cluster of data items corresponds to a sub-region of the display area. For the or each given cluster of data items: in response to determining that a second representation of all the data items belonging to the given cluster fits within the respective sub-region, outputting the second representation to the respective sub-region. In response to determining that the second representation exceeds the respective sub-region: generating a third representation comprising an individual representation of each data item belonging to a display subset of the given cluster and an aggregated representation of the data items of the given cluster not included in the display subset and outputting the third representation to the respective sub-region of the display.

In other words, for a given cluster, the aggregated representation represents the disjoint of the display subset.

The method may comprise determining two or more clusters of data items.

A coordinate system may span the display area and is parameterised by a first coordinate and a second coordinate, wherein the one or more parameters comprise a first parameter. The first representation may comprise representing each given data item of the plurality of data items with a graphic having a first coordinate value based on the first parameter of the given data item, and a second coordinate value which is different to the rest of the plurality of data items.

The first parameter may be user selectable. The first parameter may be a numerical value. A range of first parameters corresponding to the display area may be user selectable.

Each sub-region may correspond to a range of first coordinate values, and wherein the second representation comprises, for the or each given cluster, representing each data item of the given cluster with the graphic having a first coordinate value based on the first parameter of the given data item and a second coordinate value which is different to the rest of the data items belonging to the given cluster.

The third representation may comprises representing the aggregated representation with the graphic having a first coordinate value based on the first parameters of the data items of the given cluster not included in the display subset, and representing the individual representation of each given item belonging to the display subset of the given cluster with the graphic having a first coordinate value based on the first parameter of the given data item and a second coordinate value which is different to the rest of the data items belonging to display subset and the aggregated representation.

The one or more parameters may comprise a second parameter. The graphic corresponding to the aggregated representation may have a length spanning a range of first coordinate values based on the first parameters of the data items of the given cluster not included in the display subset and on second parameters of the data items of the given cluster not included in the display subset.

The one or more parameters may comprise a second parameter. The graphic corresponding to a given data item may have a length spanning a range of first coordinate values based on the first parameter and second parameter of the given data item.

The second parameter may be user selectable. The second parameter may be a numerical value. A range of second parameters to include may be user selectable.

The first parameter may be a start time. The second parameter may be a duration. The second parameter may be an end time. Time may be discretised according to any of years, months, weeks, days, hours and second, or a combination thereof.

The one or more parameters may comprise a third parameter. Second coordinate values of graphics corresponding to a given data item may be based on the third parameter of the given data item.

The third parameter may be user selectable. The third parameter may be a numerical value. A range of third parameters to include may be user selectable.

The second coordinate value of an aggregated representation corresponding to a given cluster may be based on the third parameters of the data items of the given cluster not included in the display subset.

Two or more clusters of data items may be determined and wherein the range of first coordinate values corresponding to the sub-region corresponding to a given cluster of the two or more clusters overlaps the range of first coordinate values corresponding to one or more sub-regions corresponding to other clusters of the two or more clusters.

Two or more clusters of data items may be processed sequentially, wherein areas corresponding to any graphics belonging to the second or third representation of a previously processed cluster are removed from sub-regions corresponding to any subsequently processed clusters.

For example, for first and second overlapping clusters, the second or third representation of the first cluster is determined, and any areas corresponding to graphics belonging to the first cluster are excluded from the sub-region available for generating the second or third representation of the second cluster.

The coordinate system may be radial, the first coordinate may be polar angle and the second coordinate may be radius. The coordinate system may be Cartesian.

Generating the third representation may further comprise iteratively adding data items to the display subset one at a time until any further addition would cause the third representation to exceed the respective sub-region.

The order that the data items are added to the display subset may be determined by one or more extraction rules. For example a first extraction rule may prioritise data items based on the relative sizes of the display area for the data set and the area required to display associated descriptive text. A second extraction rule may prioritise data items which are the largest, smallest, longest or shortest when displayed, have the greatest or smallest area when displayed. A third extraction rule may prioritise data having a "flag" marking it as important for extraction, and so move the flagged data item up in the priority list for extraction. A fourth extraction rule may prioritise "milestone tasks" which have a zero length or size. A fifth extraction rule may be based on ordering according to the third parameter.

Representations of all data items in a single representation (e.g. the first, the second or the third representations may be displayed simultaneously once the analysis of the data items is complete.

Generating the third representation may further comprise: extracting data items from the given cluster one at a time; for each data item extracted from the cluster, determining whether the individual representation of the extracted data item plus the existing third representation fits within the respective sub-region; in response to a positive determination, adding the data item to the display subset.

The aggregated representation may include an indication of the number of data items of the given cluster not included in the display subset.

The display area may be user selectable.

The first representation may comprise the plurality of data items formatted according to one or more first display rules. Each second representation may comprise the plurality of data items of the respective cluster formatted according to one or more second display rules. Each third representation may comprise the individual representations of the data items belonging to the display subset and the aggregated representation, formatted according to one or more third display rules.

The first, second and third display rules may be the same display rules.

The first, second and/or third display rules may include one or more of: a representation size; a representation area; a representation spacing; a representation colour; a representation shape; or a relative position of one or more of the plurality of data items.

A display rule of the one or more first, second or third display rules may at least partly based on a parameter of the one or more parameters.

In the first, second and third representations, a given data item may be represented as an arc of a circle bounded by inner and outer radii and first and second polar angles, wherein the first and second polar angles may be determined based on the one or more parameters of the given data item.

The inner and outer radii of the arc of the circle corresponding to the given data item may also be determined based on the one or more parameters of the given data item.

In the third representation corresponding to the or each given cluster, the aggregated representation may take the form of an arc of a circle bounded by inner and outer radii and first and second polar angles. The first and second polar angles may be determined based on the one or more parameters of the data items of the given cluster not included in the display subset.

The inner and outer radii of the arc of the circle corresponding to the aggregated representation of the given cluster may also be determined based on the one or more parameters of the data items of the given cluster not included in the display subset.

The method may further comprise displaying text associated with a given data item superimposed on the representation of the given data item; or displaying text associated with the given data item adjacent to the representation of the data item.

The text associated with the given data item may be displayed on the representation of the given data item (that is, overlaid on the representation of the given data item) if the text fits within the representation of the given data item, and may be displayed adjacent to the representation of the given data item if the text does not fit within the representation of the given data item.

The font size of the text may be determined by a user.

Displaying text on the representation of the data item may include displaying text overlaying the representation.

The one or more parameters may comprise a time or a time period associated with one or more data items.

The one or more parameters may comprise an indication of an order of the plurality of data items.

The one or more parameters may determine the value of one or more other parameters of the plurality of data items. For example, a time or a duration of a data item may determine the indication or order.

According to a second aspect of the invention, there is provided a graphical user interface for visualising a hierarchical tree structure of data items having two or more levels including a top level, a bottom level and zero or more intermediate levels, each data item comprising one or more parameters. The graphical user interface is configured to carry out the method of the first aspect on a dataset comprising a subset of the hierarchical tree structure.

The subset may be determined based on user inputs of one or more ranges of the one or more parameters and/or user input of one or more levels of the hierarchical tree structure.

The subset may be limited to all or some of the data items belonging to a given layer of the hierarchical tree structure.

In response to receiving a user input to change the displayed layer of the hierarchical tree structure, the graphical user interface may carry out the method of the first aspect on a new dataset comprising a subset of the hierarchical tree structure limited to all or some of the data items belonging to the user selected layer of the hierarchical tree structure.

The user input may take the form of a user selecting the representation of a given data item which has one or more descendant data items within the hierarchical tree structure, wherein the new dataset may comprise the data items descended from the given data item and belonging to next layer down the hierarchical tree structure.

The user input may take the form of a user selecting an ascend function. The new dataset may comprise all or some of the data items belonging to the next layer up the hierarchical tree structure.

In response to receiving a user selection of the representation of a given data item, the graphical user interface may carry out the method of the first aspect on a new dataset comprising a subset of the hierarchical tree structure limited to the given data item and all data items descending therefrom in the hierarchical tree structure.

In response to receiving a user selection of the representation of a given data item, the graphical user interface may carry out the method of the first aspect on an expanded dataset comprising the existing dataset having the given data item replaced by all data items immediately descendant from the given data item in the hierarchical tree structure.

Immediately descendant from a given data item means those data items one level below in the hierarchical tree structure and descendant from the given data item.

Upon initiating the graphical user interface, the subset may be limited to the data items belonging to the top level of the hierarchical tree structure.

Upon receiving a user selection of the representation of a given data item, the representation of the given data item may be removed from the first, second, or third representations.

The method of the first aspect may be performed on the dataset without the user-selected data item.

According to a third aspect of the invention, there is provided a computing device performing the method steps of the first aspect. The computing device includes a memory and at least one processor.

According to a fourth aspect of the invention, there is provided a non-transitory computer readable medium (CRM) having program instructions for performing the method of the first aspect.

BRIEF DESCRIPTION OF THE DRAWINGS

Certain embodiments of the present invention will now be described, by way of example, with reference to the accompanying drawings, in which.

DETAILED DESCRIPTION

Figure 1A:
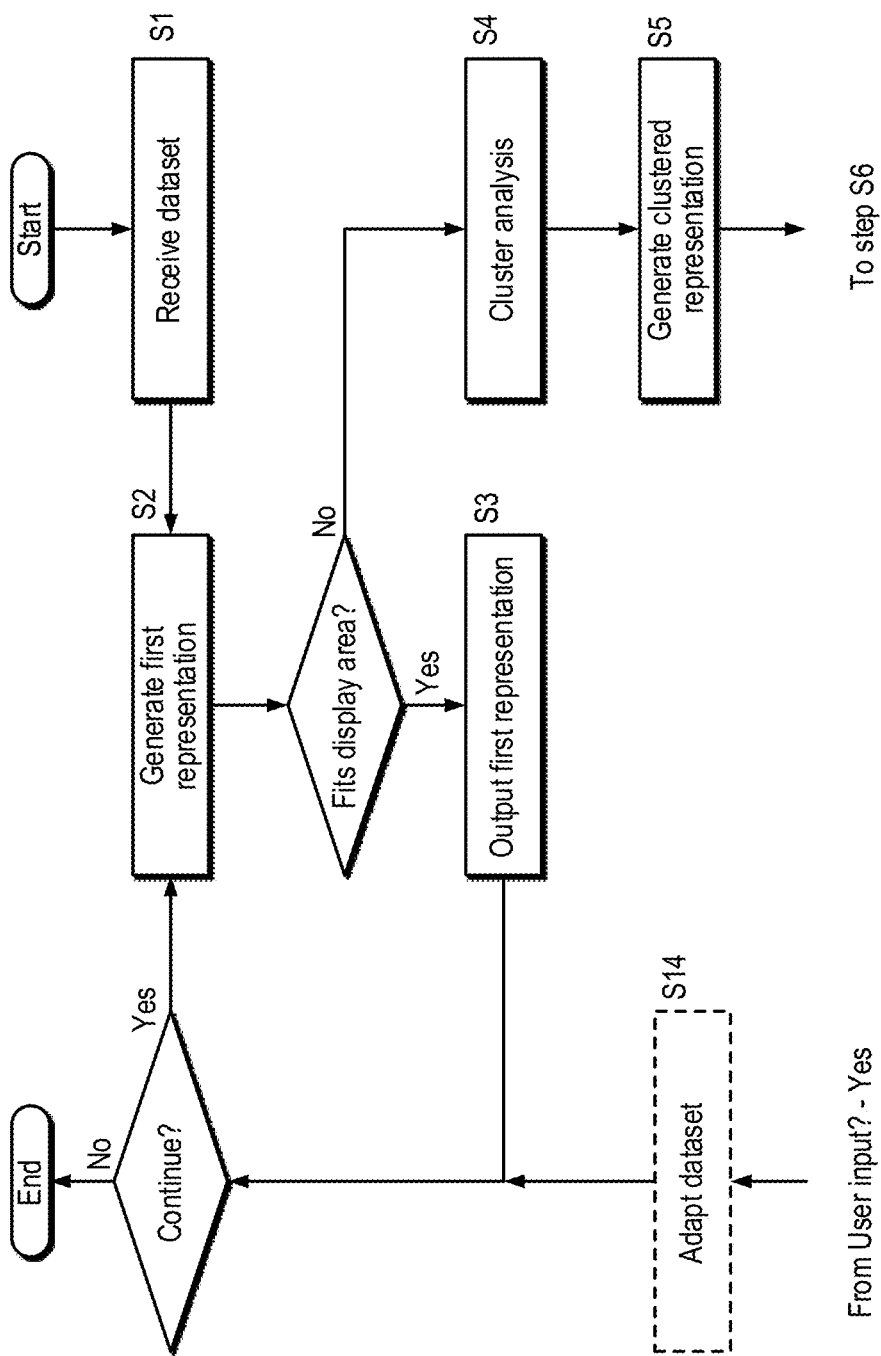
FIG. 1A is a process flow diagram for generating a representation of data.
Figure 1B:
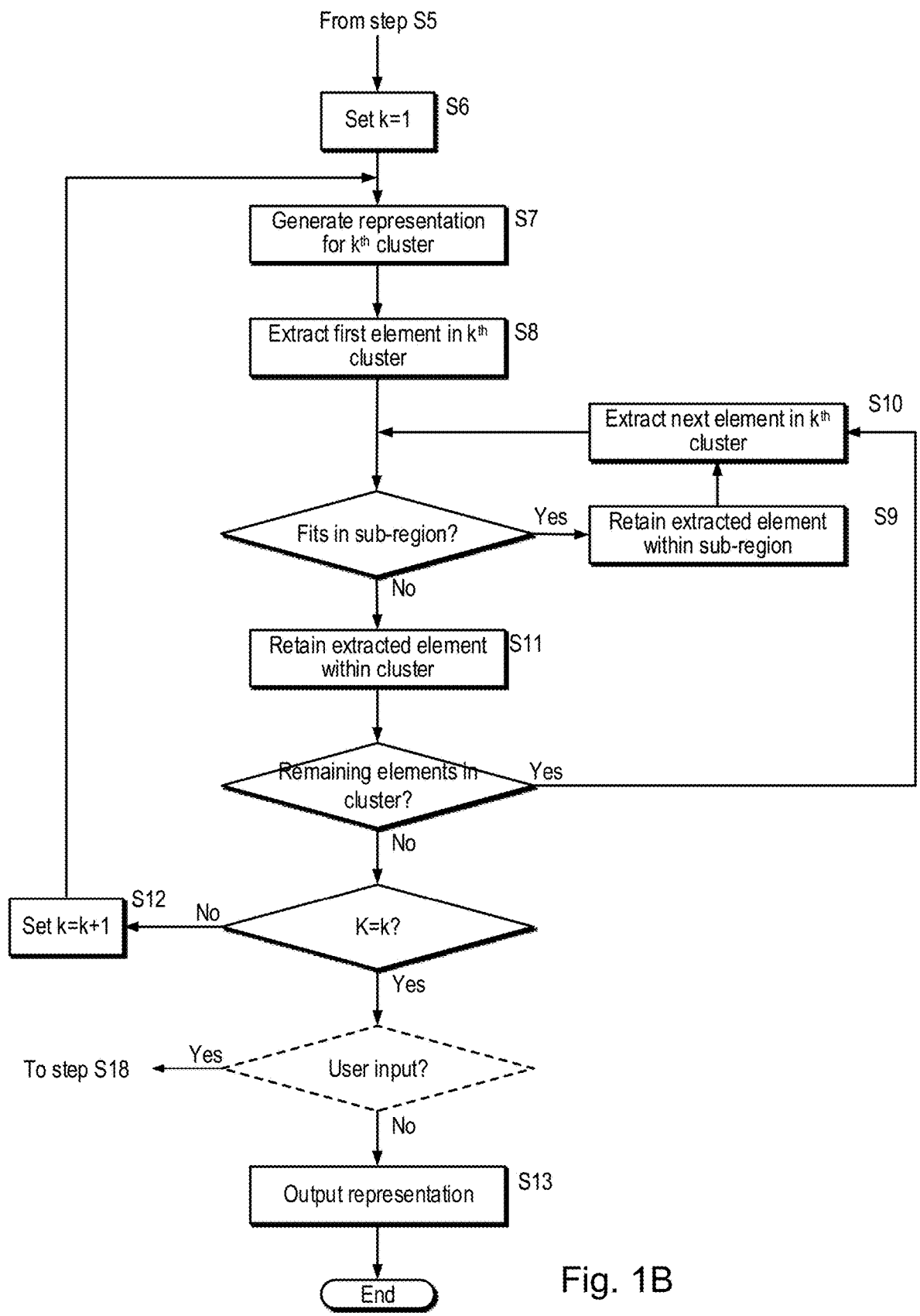
FIG. 1B is a process flow diagram for generating a representation of data.

Referring to FIG. 1, a dataset is received by a by a digital electronic processor communicatively coupled to at least one display device. (step S1). The dataset comprises a plurality of data items and each data item comprises one or more parameters. The dataset is processed to determine whether a representation of the plurality of data items fits within a display area (step S2), for example, the display area of the at least one display device. If the plurality of data items do fit within the display area, a first representation is output to the display area (step S3). If the plurality of data items exceed the display area, a clustering analysis is performed based on at least one of the one or more parameters, wherein each cluster of data items corresponds to a sub-region of the display area (step S4). First, a clustered representation is generated (step S5).

There may be k number of clusters, and each cluster is processed (step S6). For each given cluster of data items, in response to determining that a second representation of all the data items belonging to the given cluster fits within the respective sub-region, outputting the second representation to the respective sub-region (step S7).

In response to determining that the second representation exceeds the respective sub-region, a third representation comprising an individual representation of each data item belonging to a display subset of the given cluster and an aggregated representation of the remaining data items is generated and output to the respective sub-region of the display. First, the first element of the kth cluster (e.g. the first cluster) is extracted (step S8). If the first element fits within the respective sub-region, it is retained within that sub-region, i.e. the sub-element is kept outside of the cluster and added for display in the respective sub-region (step S9). The next element in the $k^{th}$ cluster is then extracted (step S10) and is also assessed to determine whether it fits within the respective sub-region. This loop continues until either no further elements remain in the cluster (in which case the process goes to S12) or, no further elements remain that can be accommodated within the available sub-region. If a representation of an extracted element from the $k^{th}$ cluster does not fit within the respective sub-region, the element is retained within the cluster (step S11), i.e., the element will be represented along with other retained or remaining elements of a cluster. For example, the representation of all the remaining elements of a cluster which cannot be extracted and displayed individually are represented together in one sub-region, and the extracted elements are each represented in their respective sub-regions. If there are remaining elements in the cluster, the next element (e.g. a second, third, or $n^{th}$ element) are extracted and the process repeats (e.g. returns to S7).

The process is repeated for each of the remaining clusters by incrementing the cluster indicator k by 1 (step S12). If all clusters have been processed, the representation is output (step S13). Optionally, a user may provide an input to alter the representation, for example, by selecting a cluster or element for deletion or collapse from the representation. If such an input is provided, the dataset is adapted (step S14) and the process of preparing the output representation continues from step S2 where a first representation of the adapted dataset is generated.

In other words, for a given cluster, the aggregated representation represents the disjoint of the display subset.

Generating one of the representations within the display area, or a sub-region of the display area may comprise iteratively adding data items to the display subset one at a time until any further addition would cause the third representation to exceed the respective sub-region.

The order that the data items are added to the display subset may be determined by one or more extraction rules. For example a first extraction rule may prioritise data items based on the relative sizes of the display area for the data set and the area required to display associated descriptive text. A second extraction rule may prioritise data items which are the largest, smallest, longest or shortest when displayed, have the greatest or smallest area when displayed. A third extraction rule may prioritise data having a "flag" marking it as important for extraction, and so move the flagged data item up in the priority list for extraction. A fourth extraction rule may prioritise "milestone tasks" which have a zero length or size.

Representations of all data items in a single representation (e.g. the first, the second or the third representations may be displayed simultaneously once the analysis of the data items is complete.

Data items from a given cluster may be extracted one at a time. For each data item from the cluster, determining whether the total calculated area of a representation of the extracted data items plus a representation of the remaining cluster fits within the respective sub-region and in response to a positive determination, adding the data item to the display subset.

The representation of the residual group may also indicate the number of residual data items.

The first representation may comprise the plurality of data items formatted according to one or more first display rules, for example maximum and minimum angles and lengths of a data item representation may determine how many data items can be added to the display area. Further display rules may include colour rules, area, spacing, share and relative position rules. Likewise, the second and third representations may comprise the plurality of data items formatted according to one or more second and third display rules. The display rules may be the same or different for each of the representations. One or more of the display rules may be dependent on a parameter of one or more of the data items.

As will be described in more detail below, displaying at least one data item of the plurality of data items in the first, second or third representations may comprise displaying a representation of the data item as an arc of a circle. The circle may represent one or more parameters and the length of the arc and the radial position of the arc are determined by the one or more parameters.

Displaying at least one data item belonging to the display subset of the given cluster or the aggregated representation of the remaining data items in the first representation may comprise displaying at least one data item belonging to the display subset of the given cluster or the aggregated representation of the remaining data items as an arc of a circle. The circle may represent one or more parameters and the length of the arc and the radial position of the arc are determined by the one or more parameters. The arc is defined by an inner radius, an outer radius and first and second angles. The circle may or may not be displayed alongside the representation.

Text associated with the data item may be superimposed on the representation of the data item, overlaying the representation of the data item or displayed adjacent to the data item. The location of the text display may depend on the size of the text, which can be defined by a user.

The one or more parameters of each data item may comprise a time, a time period, or an indication of order associated with the plurality of data items.

The methods described here may be performed on a computing device. The methods described here may be recorded on a computer readable medium (CRM).

Data Visualisation

If data were to be reviewed that relates to the gross domestic product (GDP) of countries, there are a limited number of options that could be considered.

Figure 3:
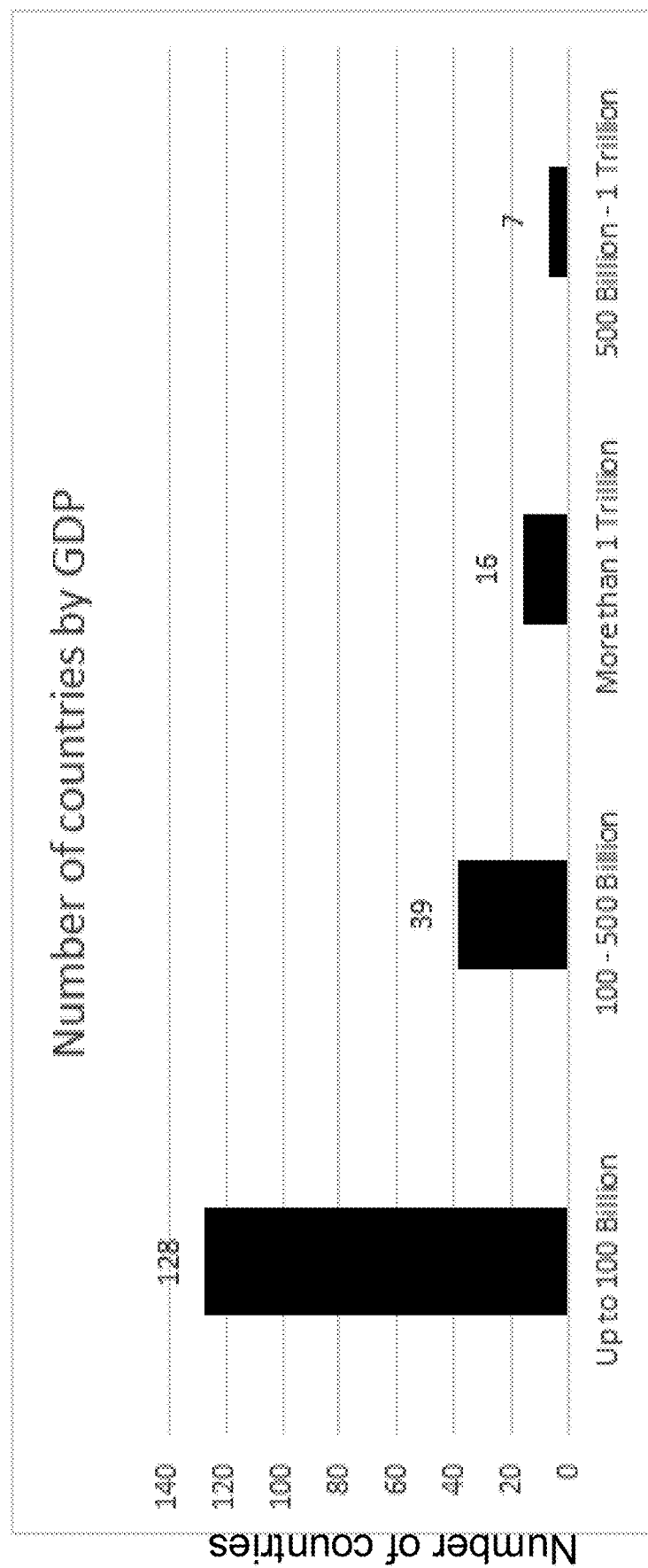
FIG. 3 is a bar chart of GDP data distributions.

The data could simply be displayed in table format, for example in Table 1:

Referring to FIG. 3, this second chart is another way to visualise the data, but it too has limitations. A great deal of detail has been forgone in order that the entire data set can be displayed.

Figure 4:
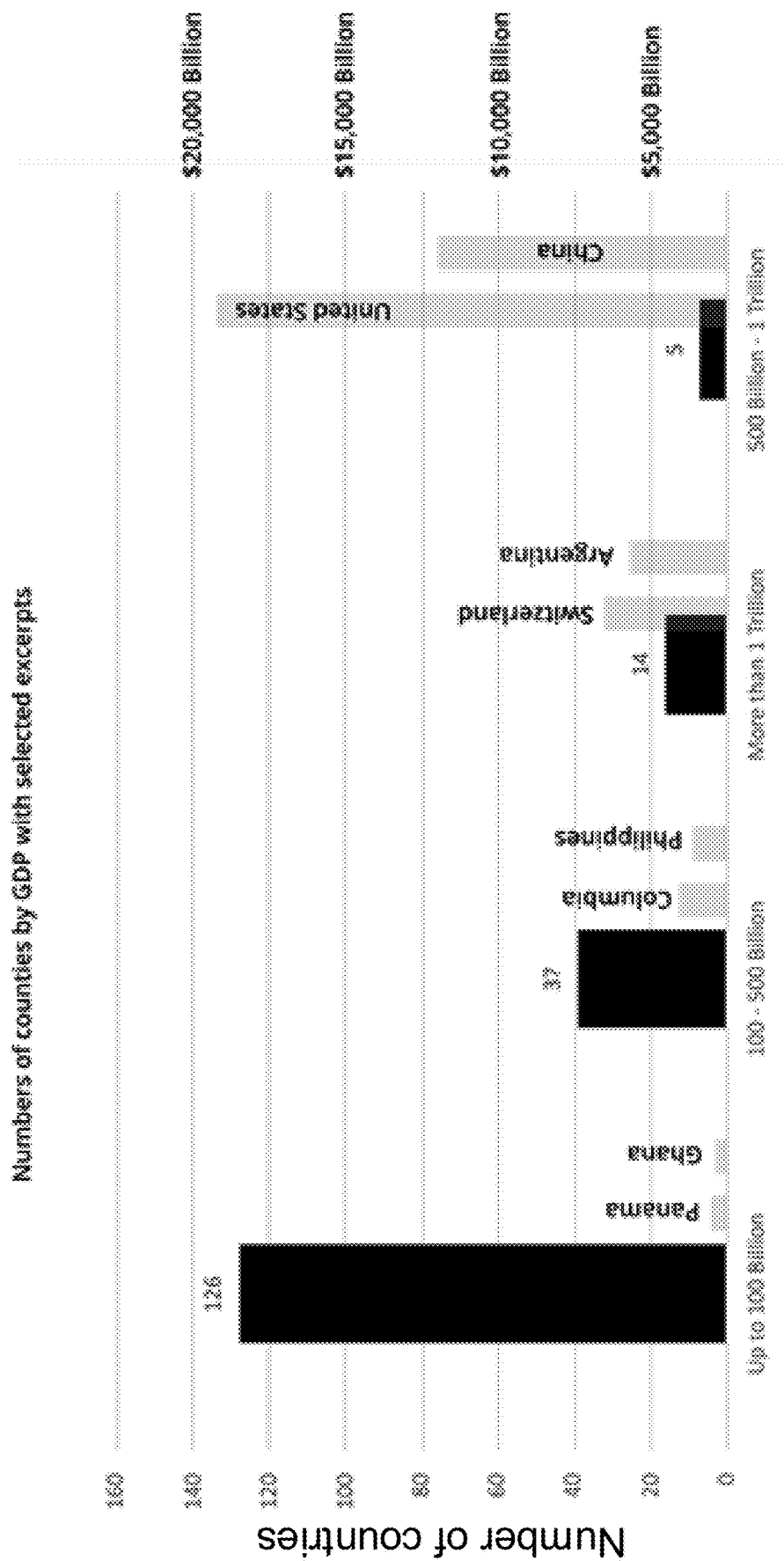
FIG. 4 is a bar chart of GDP data distributions.

Referring to FIG. 4, selected data points from the previous visual have been 'extracted' and displayed. More or less data points can be extracted depending on the available display area. In this scenario, many data points remain 'grouped' with only a small proportion extracted. In other scenarios however, relatively few data points might require grouping while the great proportion of data can be rendered.

Figure 5:
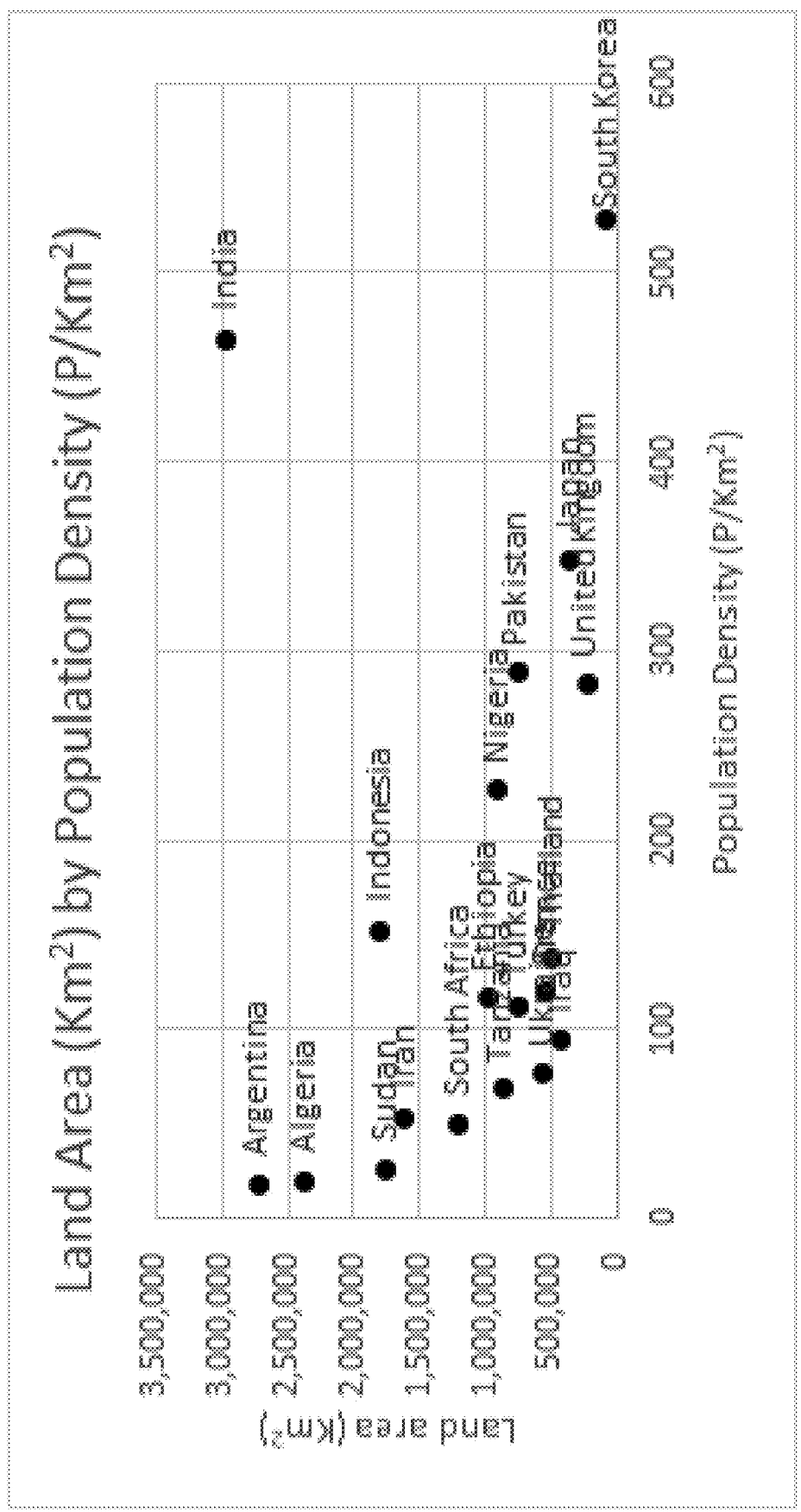
FIG. 5 is a scatter plot of land area and population density.

The same broad principles can be applied to bi-variate or multi-variate data sets. When there are two values which define a data point, algorithmic clustering analysis (such as K-Means) can be used to automatically generate a consistent and optimized grouping. Referring to FIG. 5, a further constraint arises. The viability of the chart is not just limited by the density/volume of the source data but also by the need to label the data meaningfully. The value of any data set and its visualisation is greatly enhanced by the inclusion and clarity of the labelling.

Some data points in FIG. 5 are clear, some marginal and some are indecipherable.

Figure 6:
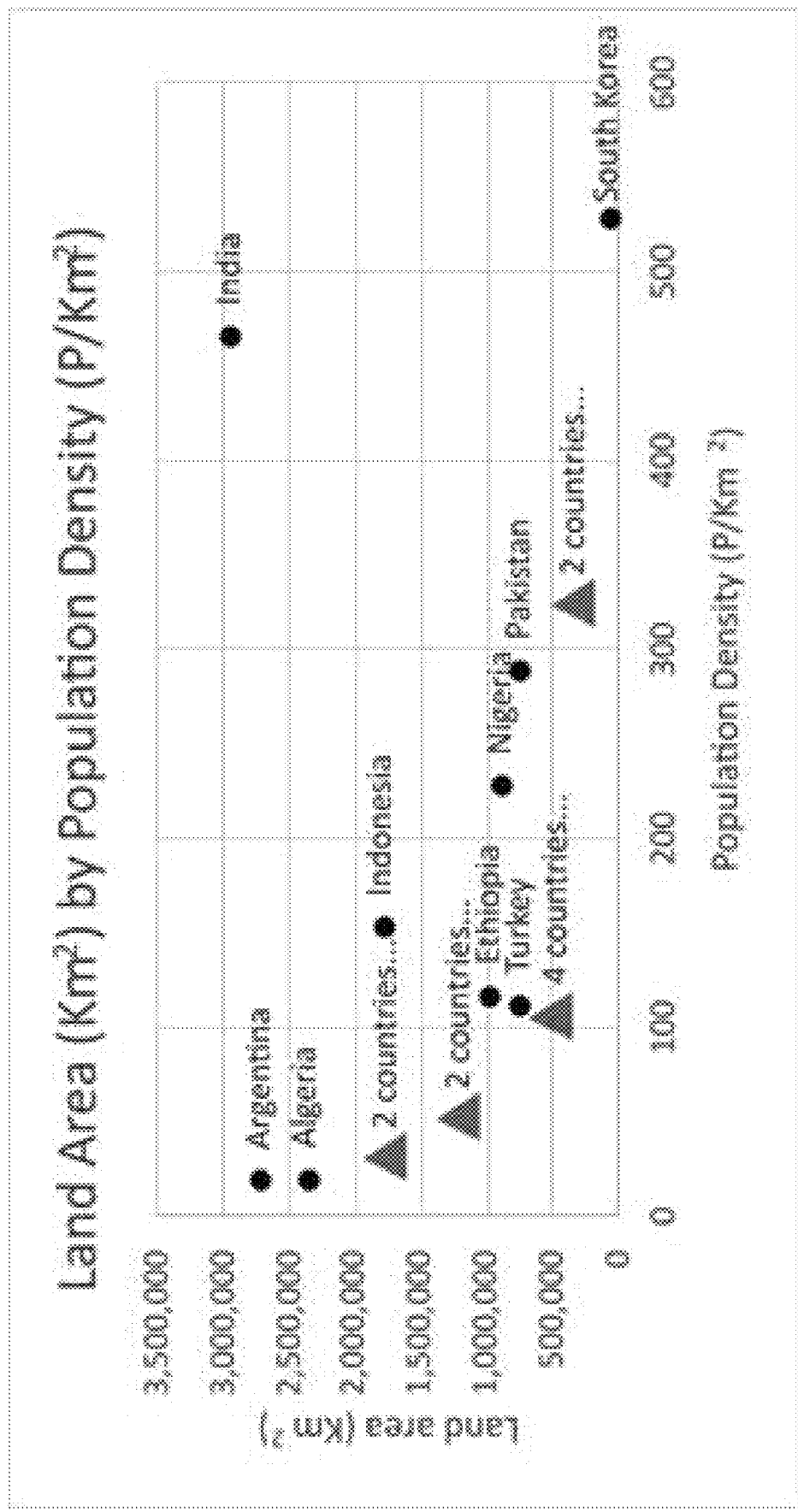
FIG. 6 is a scatter plot of land area and population density.

Referring to FIG. 6, this chart is however much more readable. An argument exists that there is little (or no) value in surfacing data points which detract from the clarity (or other measure) of what is being published.

The means to drill into the grouped data points is relatively straight-forward to provide. Equally, the input data can be enriched to forestall grouping of specific items or prefer the grouping of others.

To a large degree, the preceding elements of this application have focussed on establishing some guiding principles relating to the visualisation of data. In order to establish those principles clearly and plainly, relatively small and simple data sets have been used.

TABLE 1

| Country | GDP (nominal 2017) | GDP (abbrev.) | GDP (growth) | Population (2017) | GDP per capita | Share of World GDP |
|---|---|---|---|---|---|---|
| Australia | $1,323,421,072,479 | $1.323 trillion | 1.96% | 24,584,620 | $53,831 | 1.64% |
| Spain | $1,314,314,164,402 | $1.314 trillion | 3.05% | 46,647,428 | $28,175 | 1.62% |
| Mexico | $1,150,887,823,404 | $1.151 trillion | 2.04% | 124,777,324 | $9,224 | 1.42% |
| Indonesia | $1,015,420,587,285 | $1.015 trillion | 5.07% | 264,650,963 | $3,837 | 1.25% |
| Turkey | $851,549,299,635 | $852 billion | 7.44% | 81,116,450 | $10,498 | 1.05% |
| Netherlands | $830,572,618,850 | $831 billion | 3.16% | 17,021,347 | $48,796 | 1.03% |
| Saudi Arabia | $686,738,400,000 | $687 billion | −0.86% | 33,101,179 | $20,747 | 0.85% |
| . . . | . . . | . . . | . . . | . . . | . . . | . . . |

There are however 192 countries which might need to be displayed in such a table. This is sub-optimal in many foreseeable settings. Equally, data and detail are being prioritised over insight and information.

Figure 2:
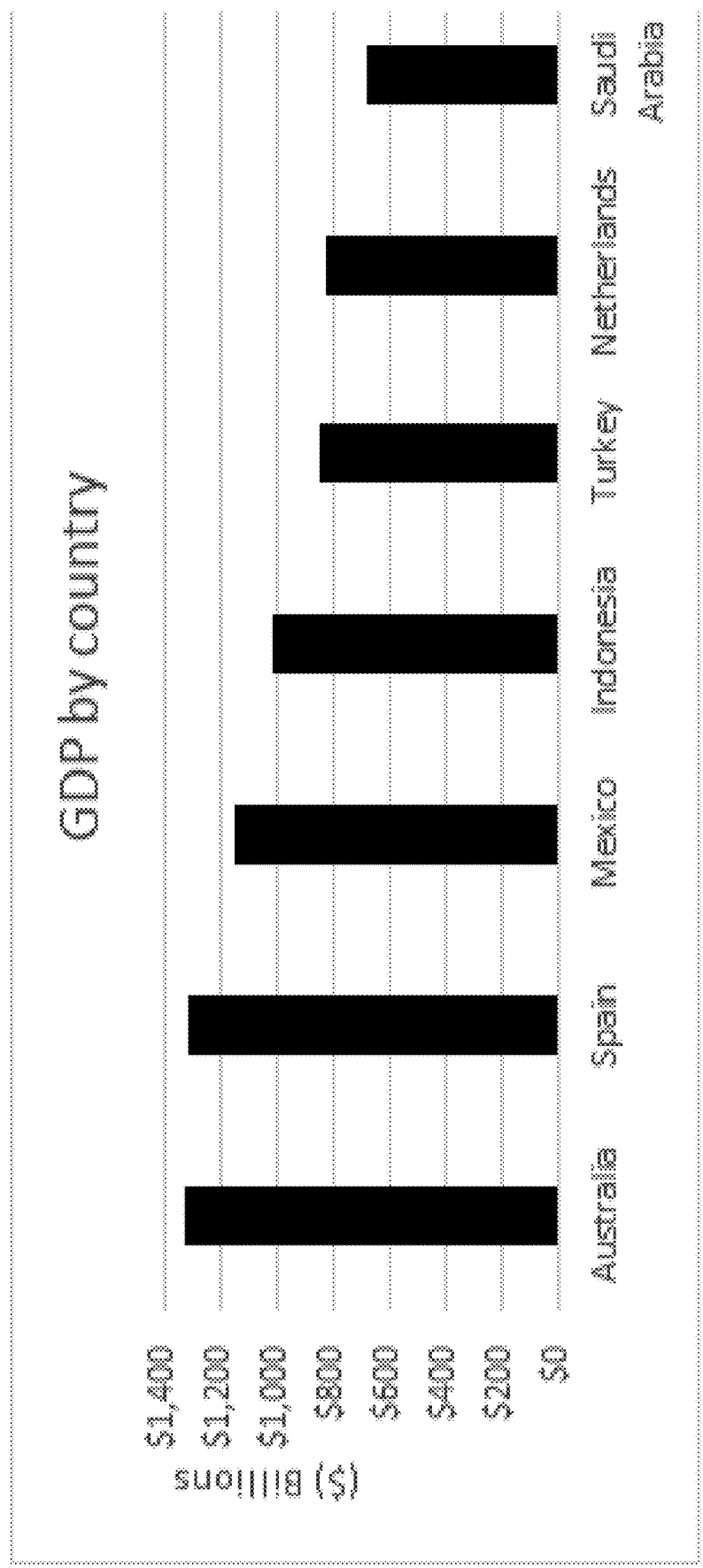
FIG. 2 is a bar chart of GDP data for various countries.

Referring to FIG. 2, this chart is a step towards address some of the points raised above, but challenges remain. This chart (or any chart) cannot realistically display 192 countries in a way that is intelligible, compelling or sustainable. This is all the more so on physical media with limited display areas such as smartphones and tablets.

However there are workloads in which a much greater need to condense large data sets is apparent. Equally, the benefits from doing so are greater than those so far discussed. Project management is a field associated with planning. Projects themselves often comprise multiple plans, multiple versions of plans as well as associated documentation and collateral which is closely linked to the plan. Programmes (defined here as multi-year transformations comprising multiple projects) are similarly intensively planned activities. Portfolios (defined as the entire scope of planned change comprising programmes and projects) can comprise very substantial volumes of schedule data.

There is an unresolved trade-off between the need for detail and the management of the datasets that support that detail. In fact, in no setting can one plan really do everything required of it by the mixture of participants, contributors and stakeholders.

Figure 7:
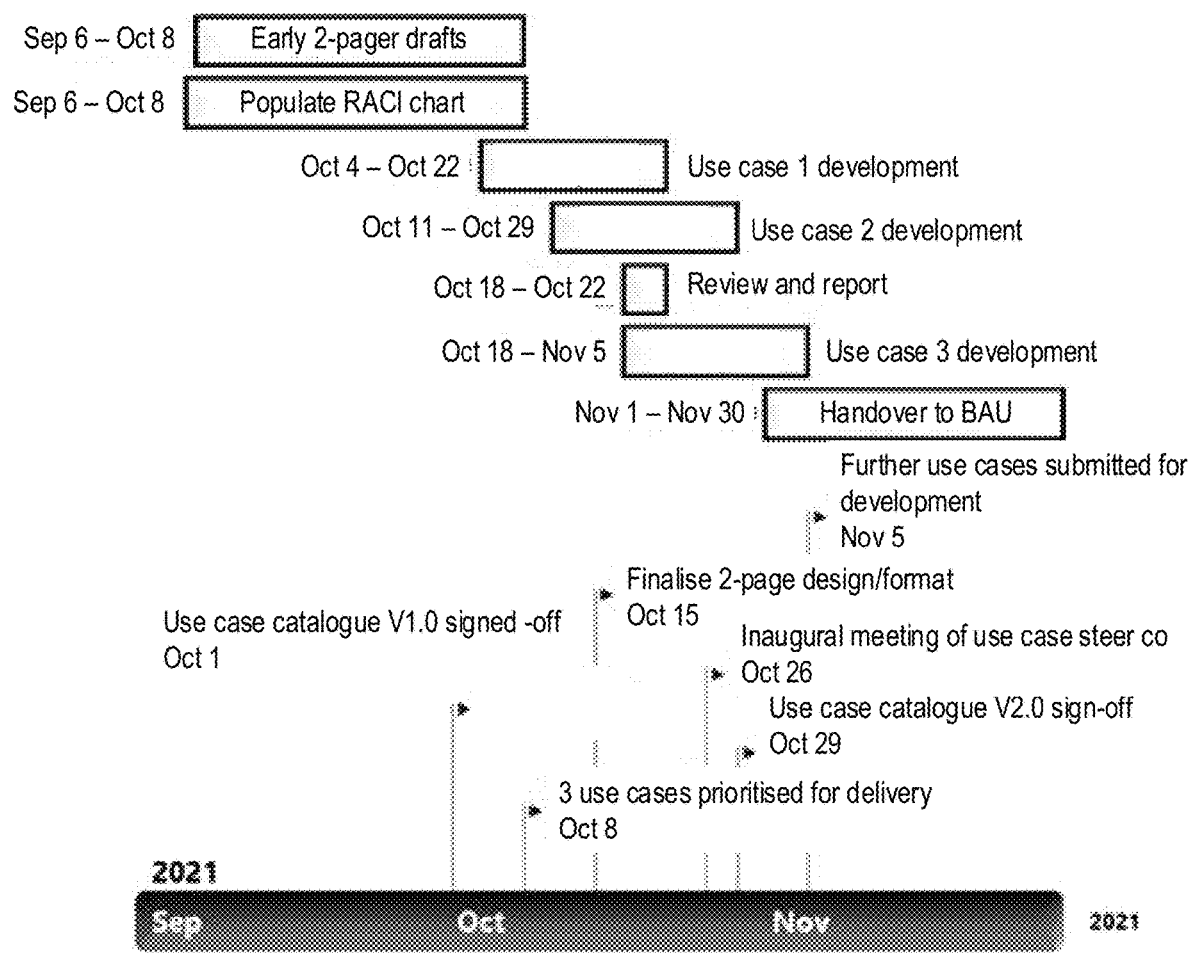
FIG. 7 is a Gantt chart.

Referring to FIG. 7, a Gantt chart (a type of bar chart) used almost universally in project and programme management settings.

The Gantt of FIG. 7 is noteworthy insofar as is contains only a very limited amount of information but requires considerable display area. A plan encompassing an entire programme or multiple programmes may encompass 100,000 line items or more and several years.

While a Gantt chart is clear, it is extremely inefficient in its use of display area. Equally, a limitation of Gantt charts is they are effective in supporting only a limited subset of the aims and underlying processes typical in project planning. Their inherent (and required) flexibility to support indeterminate data sets results in an absence of the structure required to support determinate data sets.

Gantt charts can quickly become unwieldy. They often require specialist, complex and costly software to manipulate or review. This in turn limits the value of the stored data which drives the computer driven visualisation.

The work to condense this into a plan which is lightweight, up-to-date and fit for purpose for senior leaders and decision makers is extremely laborious, costly and error prone. Rarely is it entirely successful.

The means to utilise existing data sets which are then automatically condensed and rendered into a compelling visual format which can be optimized to fit the available display area is the focus of the following discussion.

Specific Examples

Figure 8:
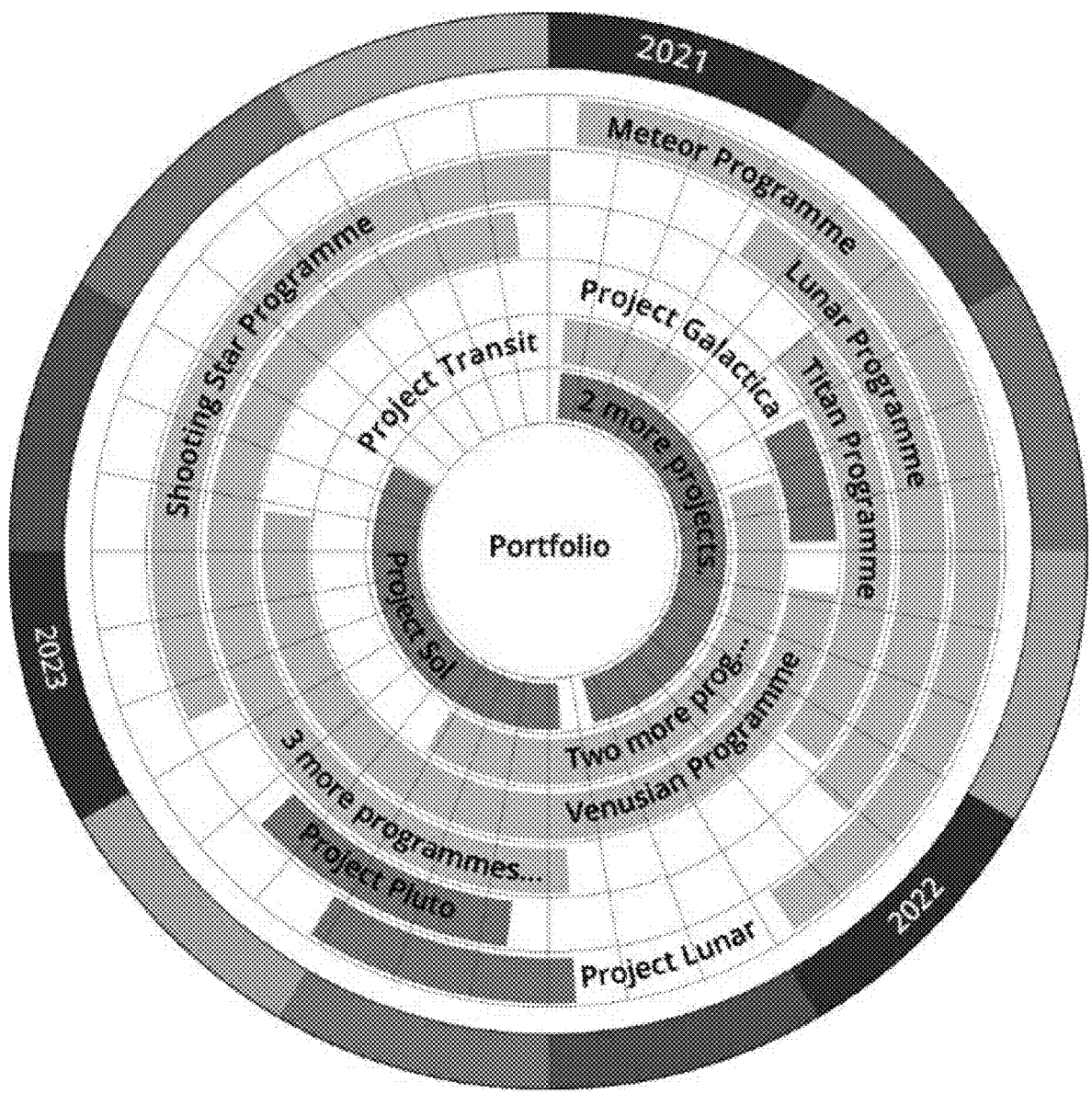
FIG. 8 is a representation of data according to the present application.

Referring to FIG. 8, A useful first step in introducing the concept of controlled extraction to project portfolio management (PPM) data sets is the radially formatted project plan (also referred to hereinafter as a Vistogram). This proposed format can scale to encompass PPM data sets of any foreseeable size. This is something that just isn't possible or practical with the tools and approaches currently available.

The Vistogram is useful in helping visualize specific concepts and approaches described in this document. Once discussed, the same principles will be used to explore how data sets of any size can be similarly rendered in a more typical Gantt chart format.

The grouping of programmes, projects or any scheduled activity means that whatever the size of the input data, it can be accommodated in the available fixed display area.

Defining a fixed and determinate display area has a number of benefits. As has already been pointed out, it provides the means by which indeterminate data sets of any size can condensed to fit the available display area. Just as importantly however, it allows other data sets to be superimposed.

Figure 9:
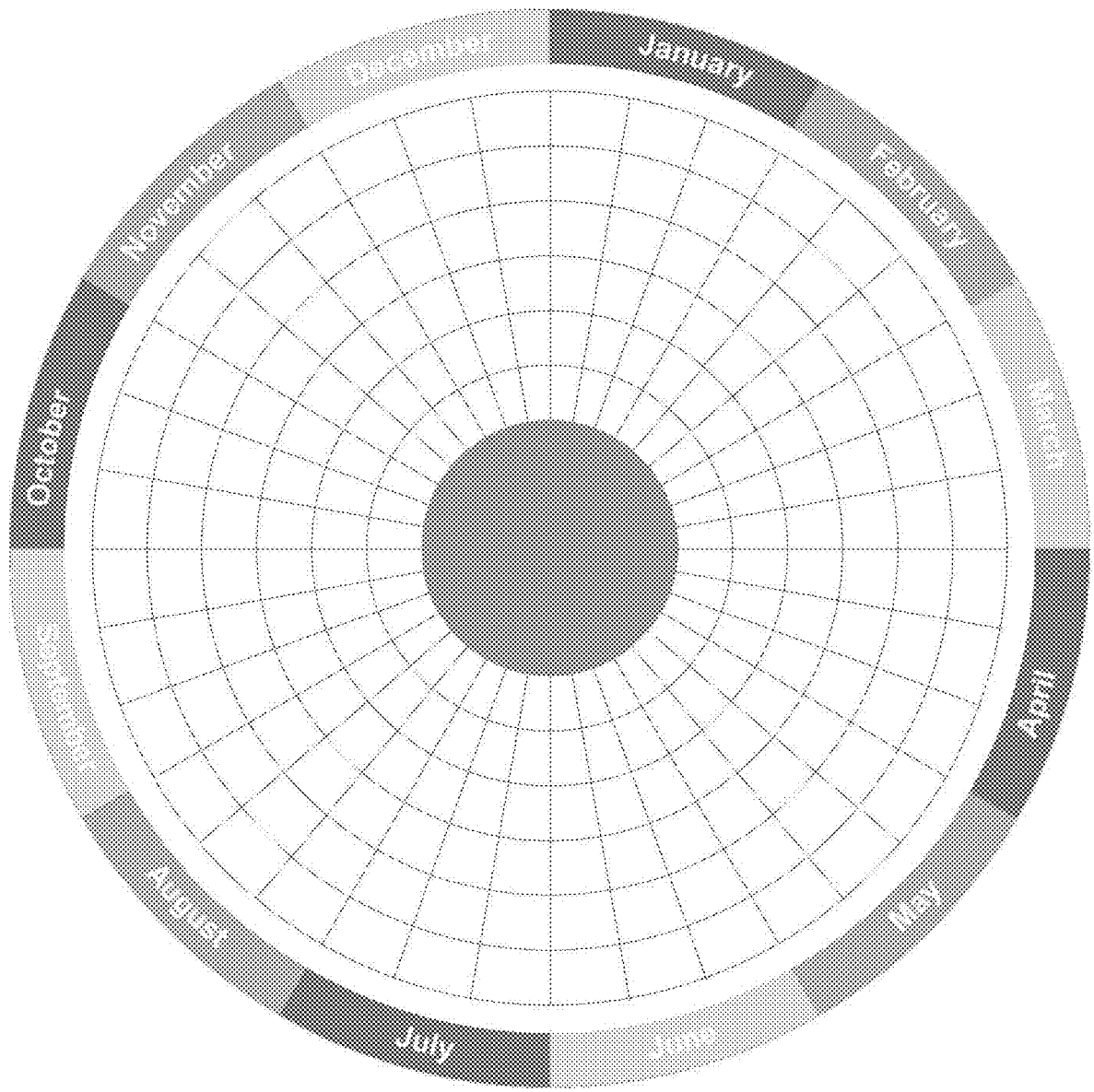
FIG. 9 is a clock-face representation divided into twelve months.
Figure 10:
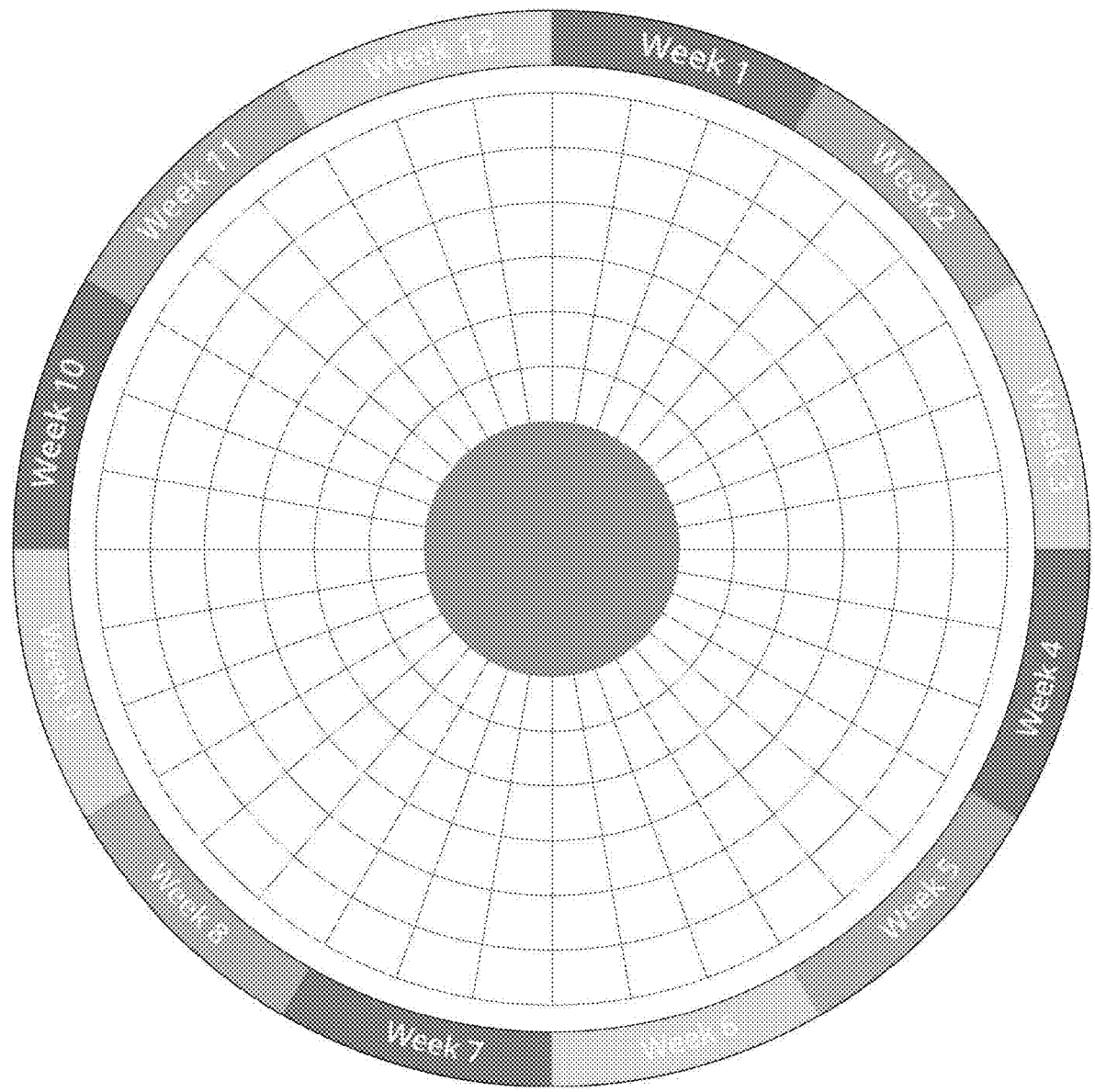
FIG. 10 is a clock-face representation divided into twelve weeks.
Figure 11:
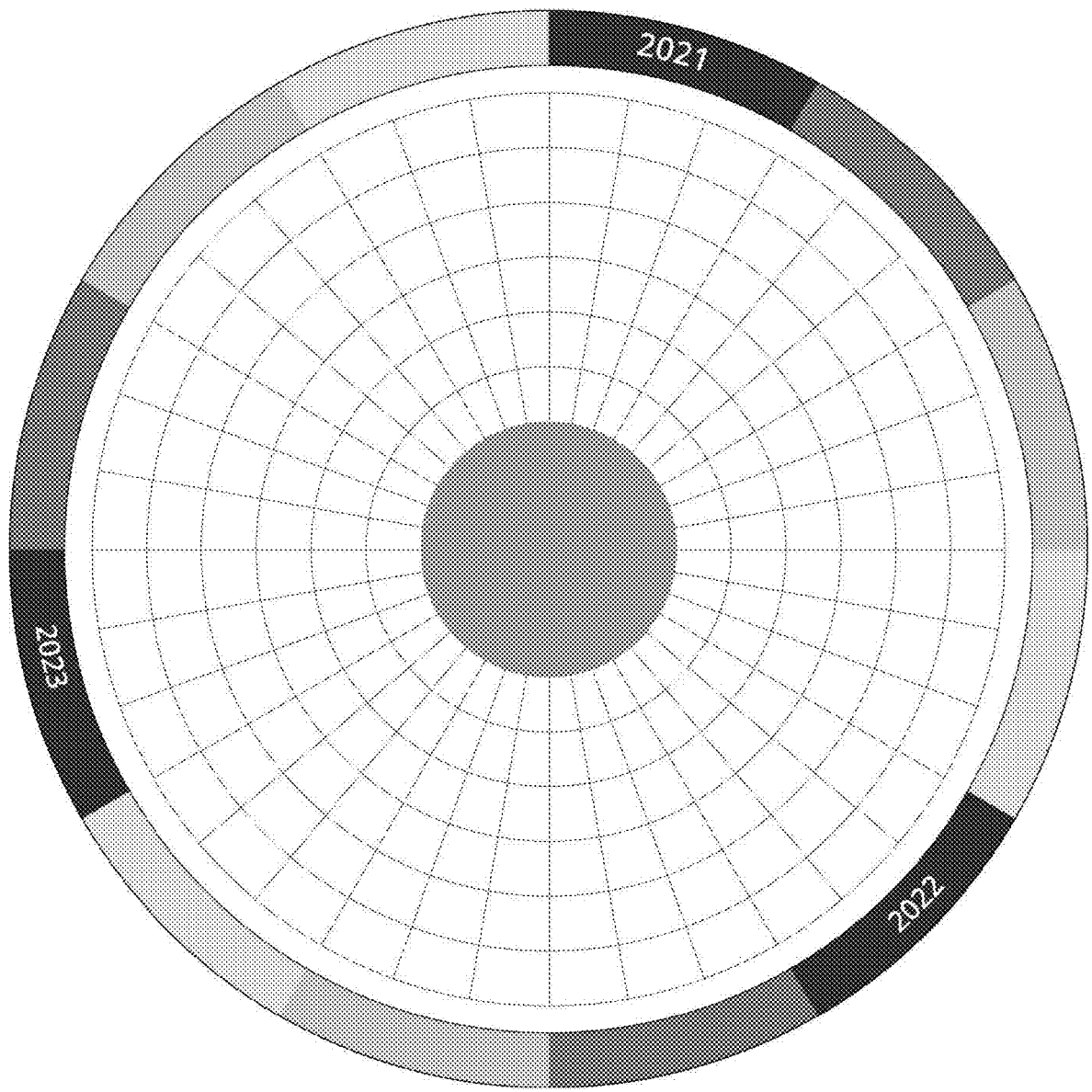
FIG. 11 is a clock-face representation divided into twelve quarters.

Referring to FIGS. 9, 10, and 11, the elements of a Vistogram which comprise the user interface will be explored.

There are 12 quarters in 3 years and 12 months in a year. 3 months (a useful planning increment) comprises around 12 weeks. With this born in mind, while there is no requirement for the Vistogram to use a 12 increment time scale, it is very practical.

This in turn provides a useful visual cue for those reviewing Vistograms insofar as it will be recognisable to most as a clock face.

Referring again to FIG. 8, should anyone reviewing this Vistogram wish to explore in more detail the Meteor Programme, simply clicking the visual element in the user interface will drill into the Meteor Programme and expose the following view.

The time-scale has been automatically switched to the optimum for the duration of the Meteor Programme.

As can now be seen, all of the projects which together comprise the Meteor Programme can now be reviewed. If there are too many projects to fully display, selected projects will be automatically clustered. Those clusters can be explored similarly. To return to the top level, simply clicking the Meteor Programme 'browses up' in the hierarchy.

Figure 12:
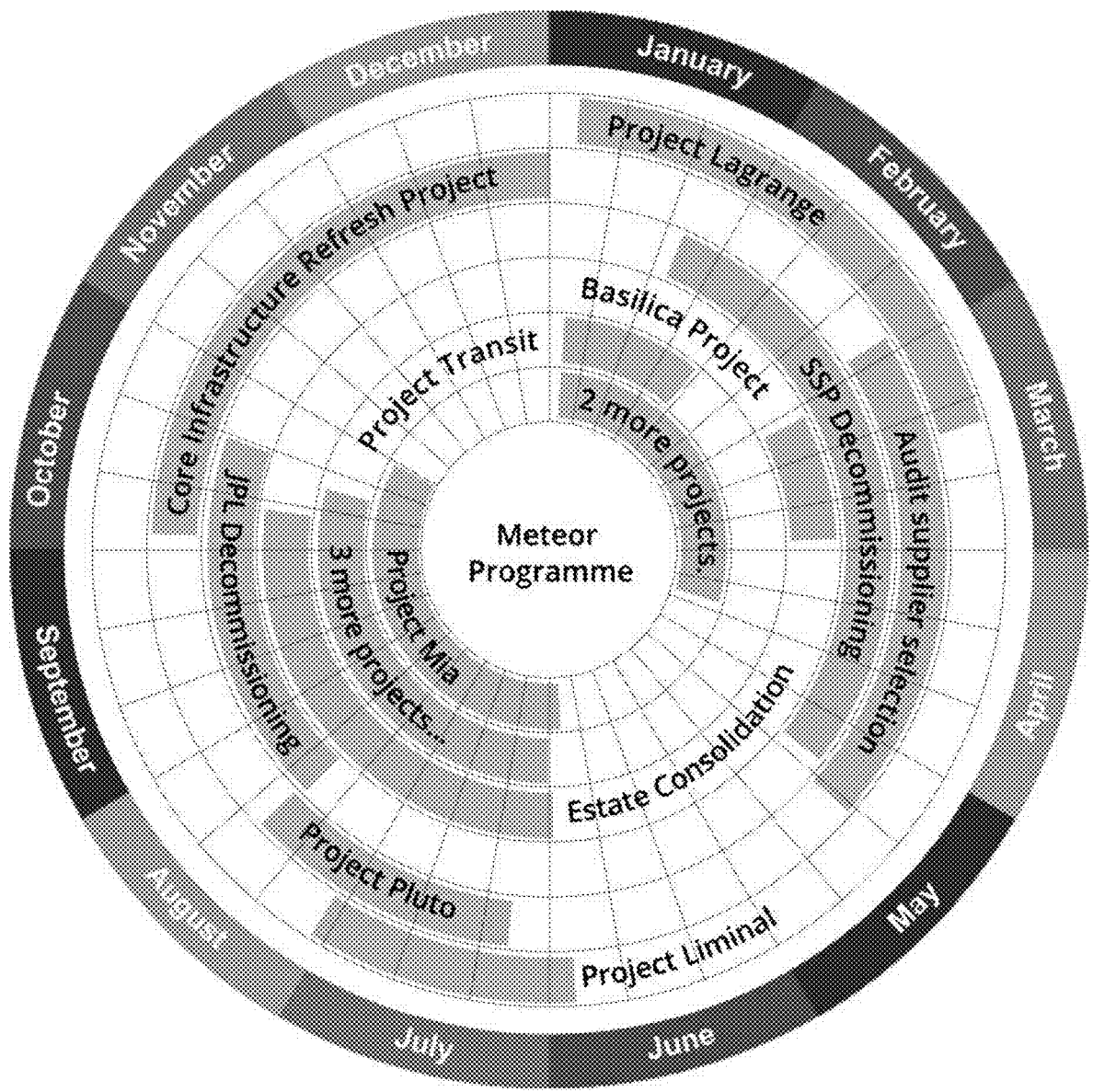
FIG. 12 is a representation of data according to the present application.
Figure 13:
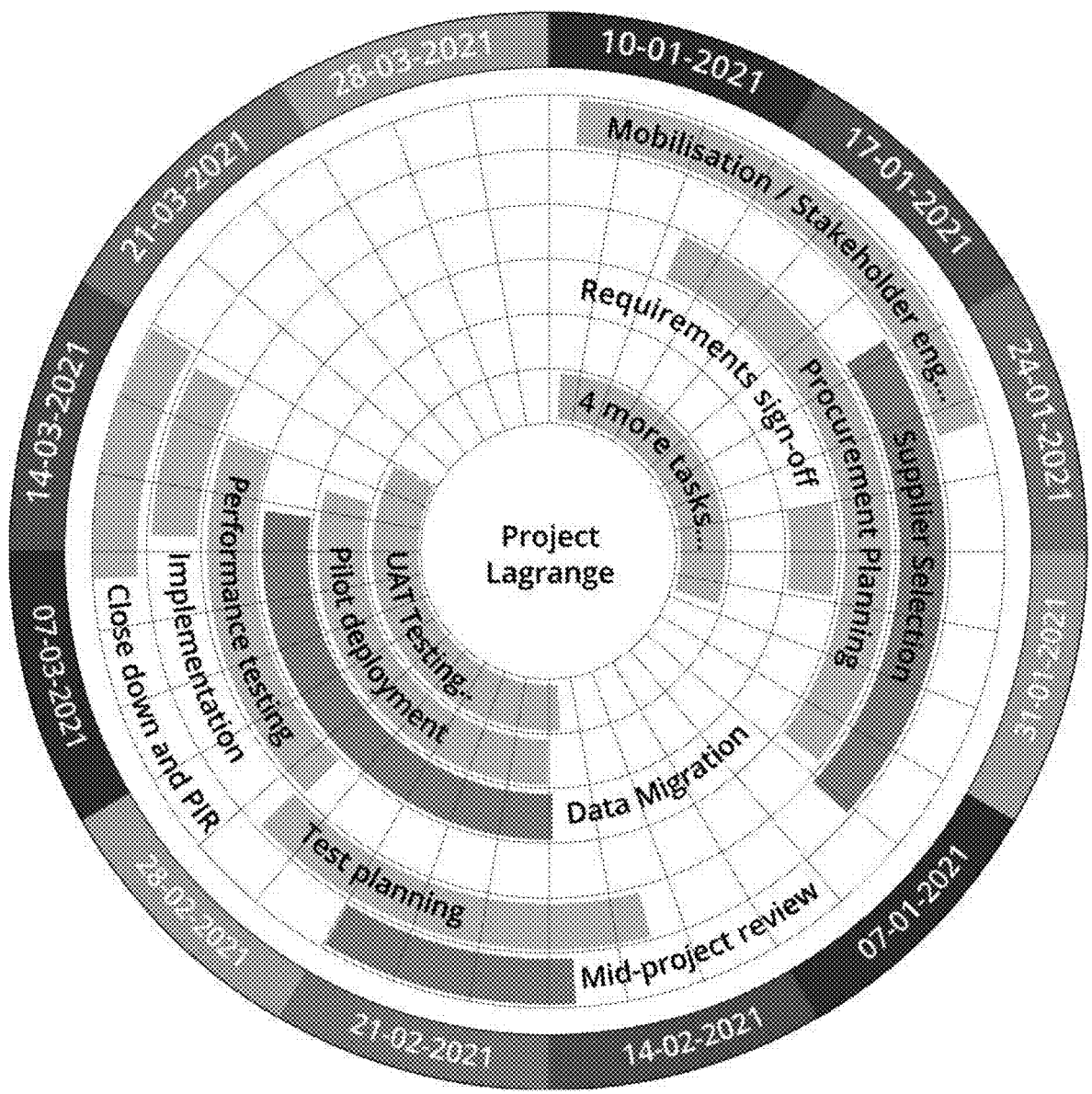
FIG. 13 is a representation of data according to the present application.

If the user wished to drill into still yet further detail they could drill into (for instance) Project Lagrange as is in FIG. 12. Here the time-scale has been adjusted again. There is also some remaining requirement for clustering as can be seen.

Some indication can be provided to show whether any element displayed on the Vistogram has additional 'child items'. Referring to FIG. 12, a darker shading is used for three of the tasks to indicate that there are further elements of detail to be explored.

As described previously, to re-ascend the hierarchy, simply clicking the centre element (in this case, Project Lagrange) will return the user to the next level up in the hierarchy. The exception to this is where the user has drilled into a cluster. In this instance, the user will be returned to the previous view.

The discussion of the UI up to this point has been limited solely to browsing the portfolio hierarchy by programme, project or task. This may not always be what is sought. It is reasonable to anticipate that users of the Vistogram may want a 'time-centric' view of the portfolio rather than a project, programme or task centric view.

This question might practically manifest itself with the question: what manufacturing projects does the business have planned for Q4?

This is a very useful question to ask (and answer). However, the UI and navigational elements discussed hitherto cannot on their own provide the answer to this question.

A useful (and so far, unused) element of the user interface is the time-scale which can be utilised.

Figure 14:
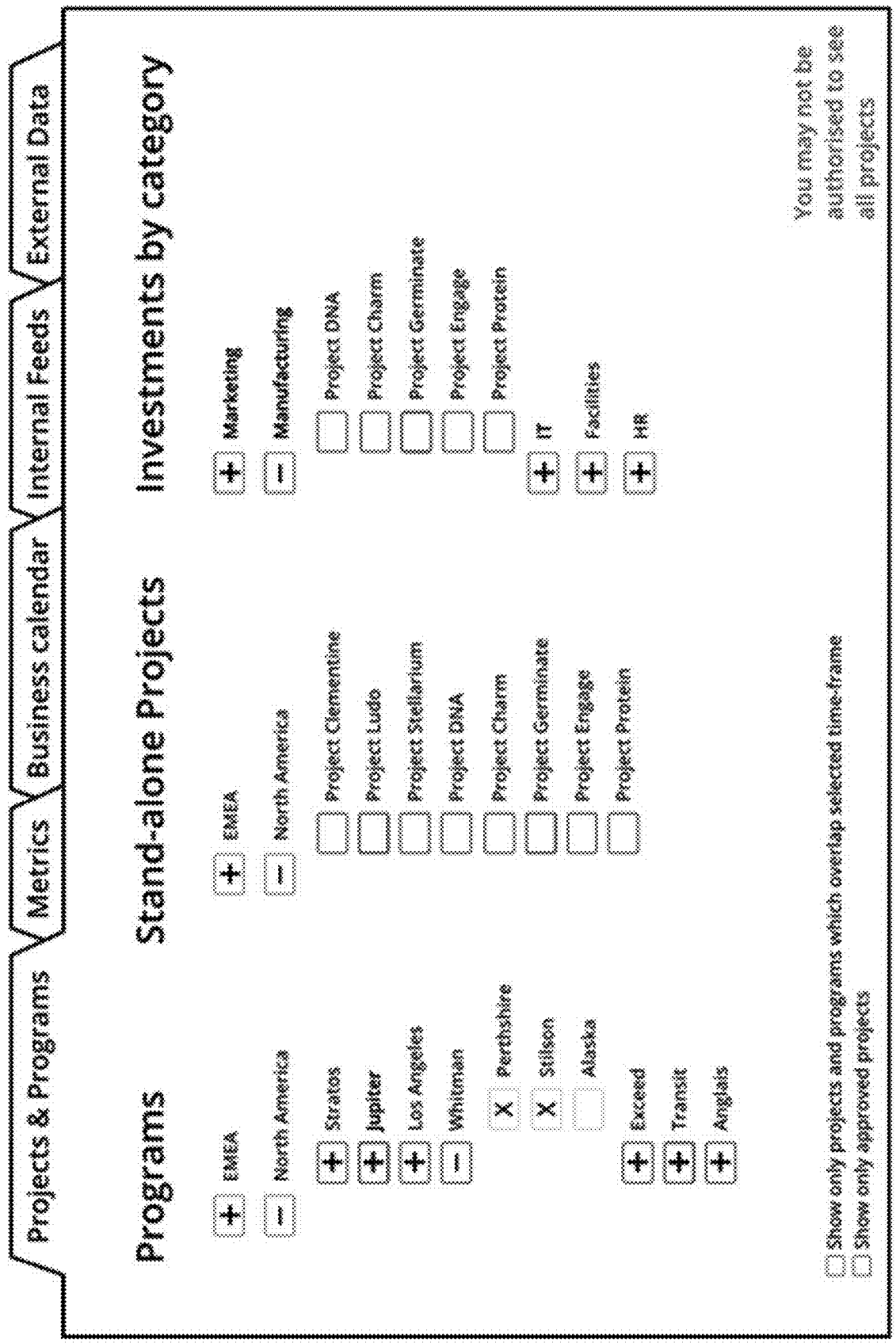
FIG. 14 is a graphical user interface for selecting data for visualisation.
Figure 15:
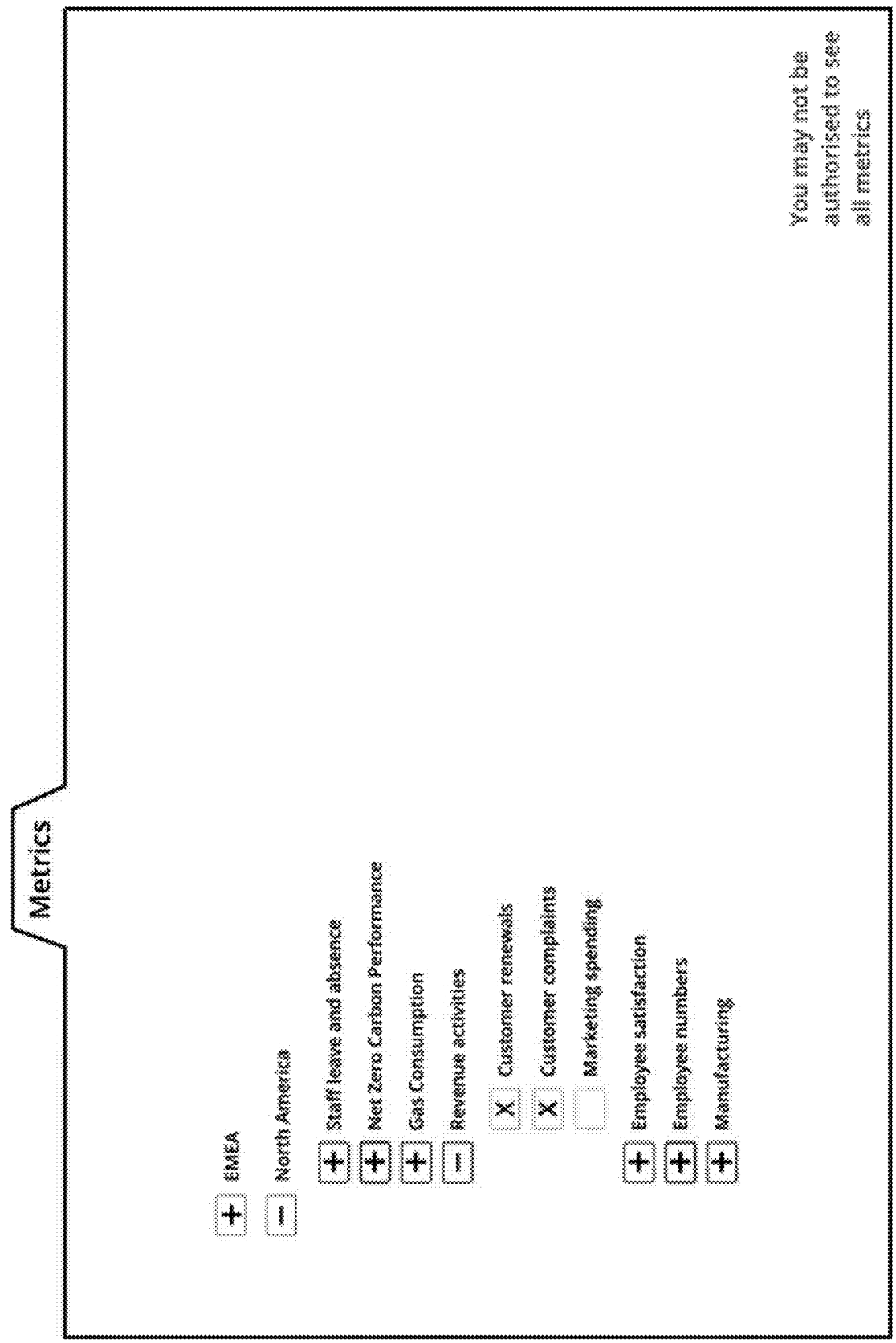
FIG. 15 is a graphical user interface for selecting data for visualisation.
Figure 16:
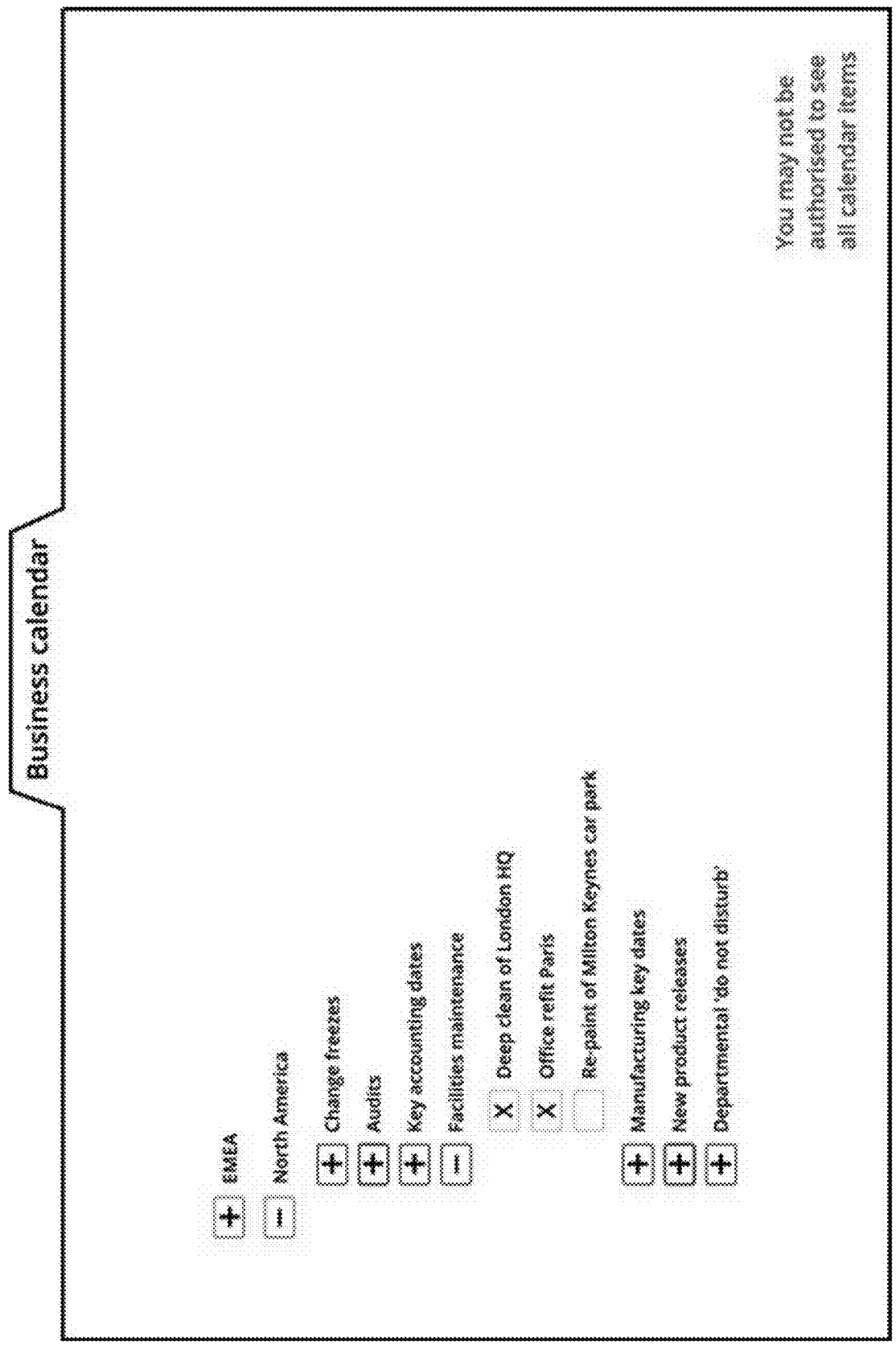
FIG. 16 is a graphical user interface for selecting data for visualisation.
Figure 17:
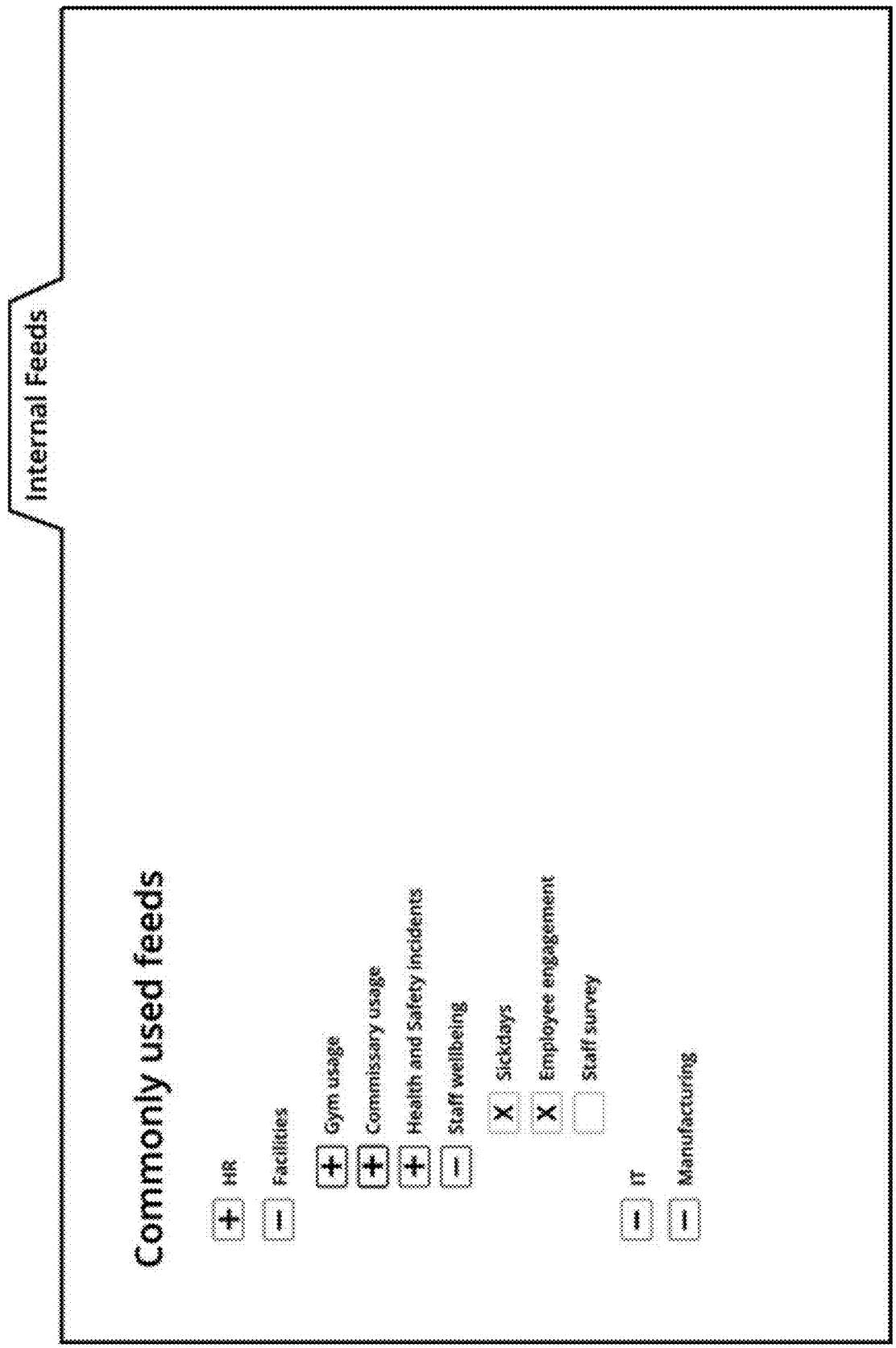
FIG. 17 is a graphical user interface for selecting data for visualisation.
Figure 18:
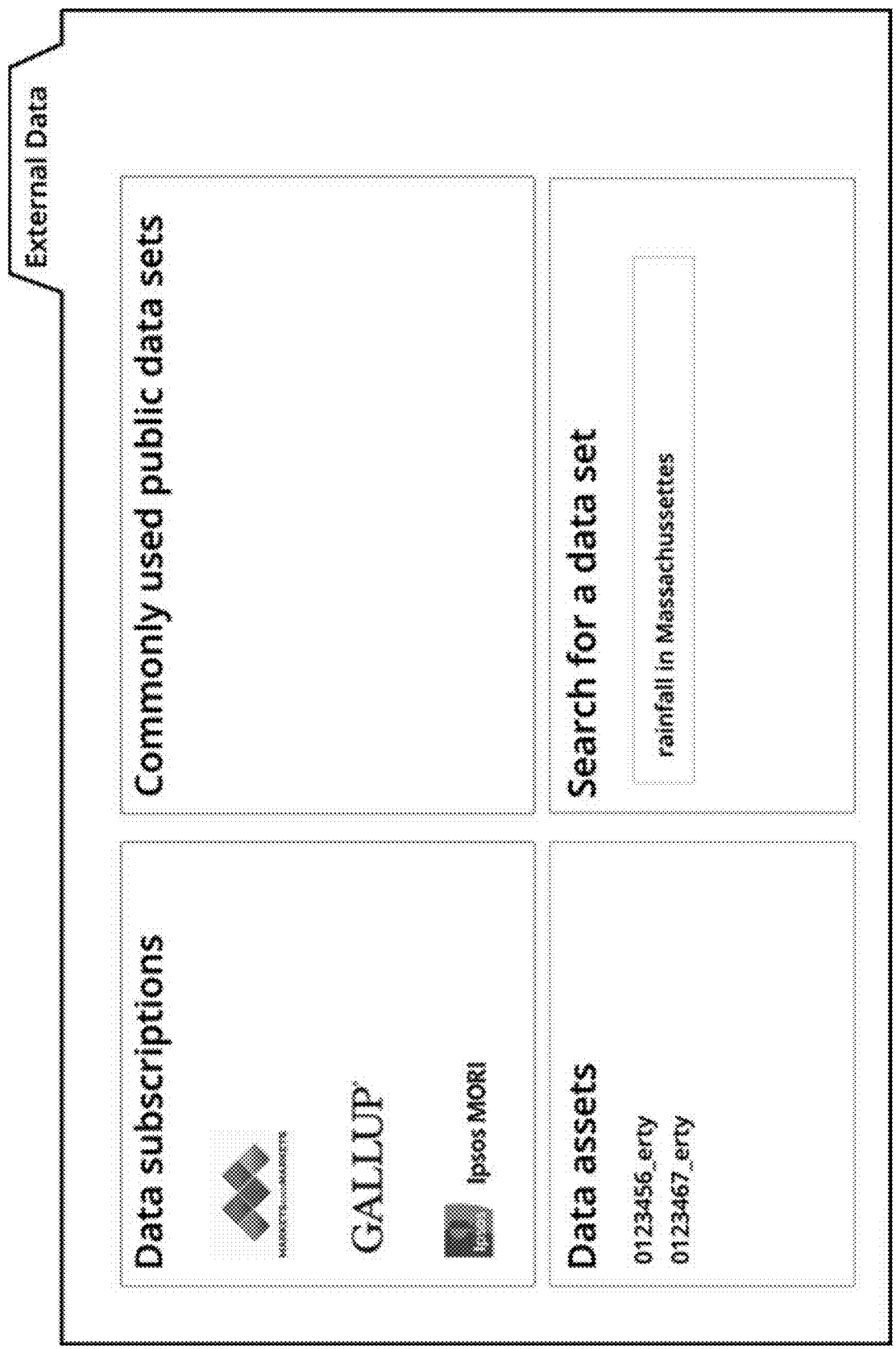
FIG. 18 is a graphical user interface for selecting data for visualisation.

Selecting the time-scale will present the user with a user interface, for example, as in FIG. 14. Selecting items from interface below allows the user to configure and filter any Vistogram based on what they want to review in a given time-period.

What selectable elements are presented to the user is really a matter of choice and what is suitable in a given setting. Notwithstanding the following examples are suggested.

Referring to FIGS. 15 to 18, the opportunity is taken at this point to highlight the value of the Vistogram as a tool in other settings. Similar functionality and insights would be highly beneficial in a range of other settings including;

1. Complex investigations such as criminal fraud or accident investigation
2. Regulation and compliance settings providing an audit trail that was straight-forward to evaluate
3. Educational settings and particularly for students of history
4. Event planning and management
5. Personal medical records.

In the case of the Vistogram in FIG. 12, but also in all other foreseeable scenarios, there is a requirement to condense data sets to avoid what might usefully be described as 'over-crowding'.

Figure 19:
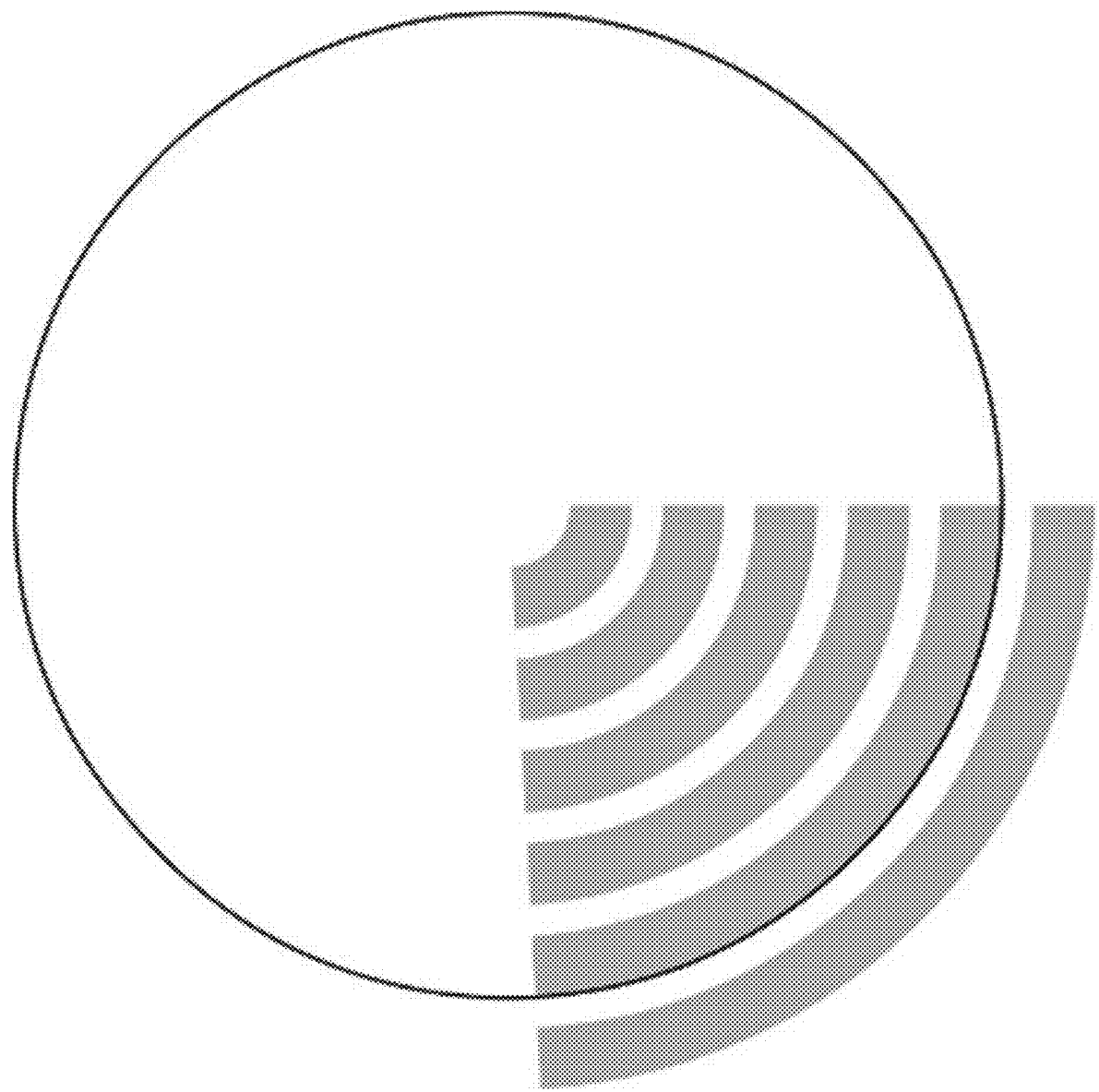
FIG. 19 is a first example of data incorrectly fitting a display area.
Figure 20:
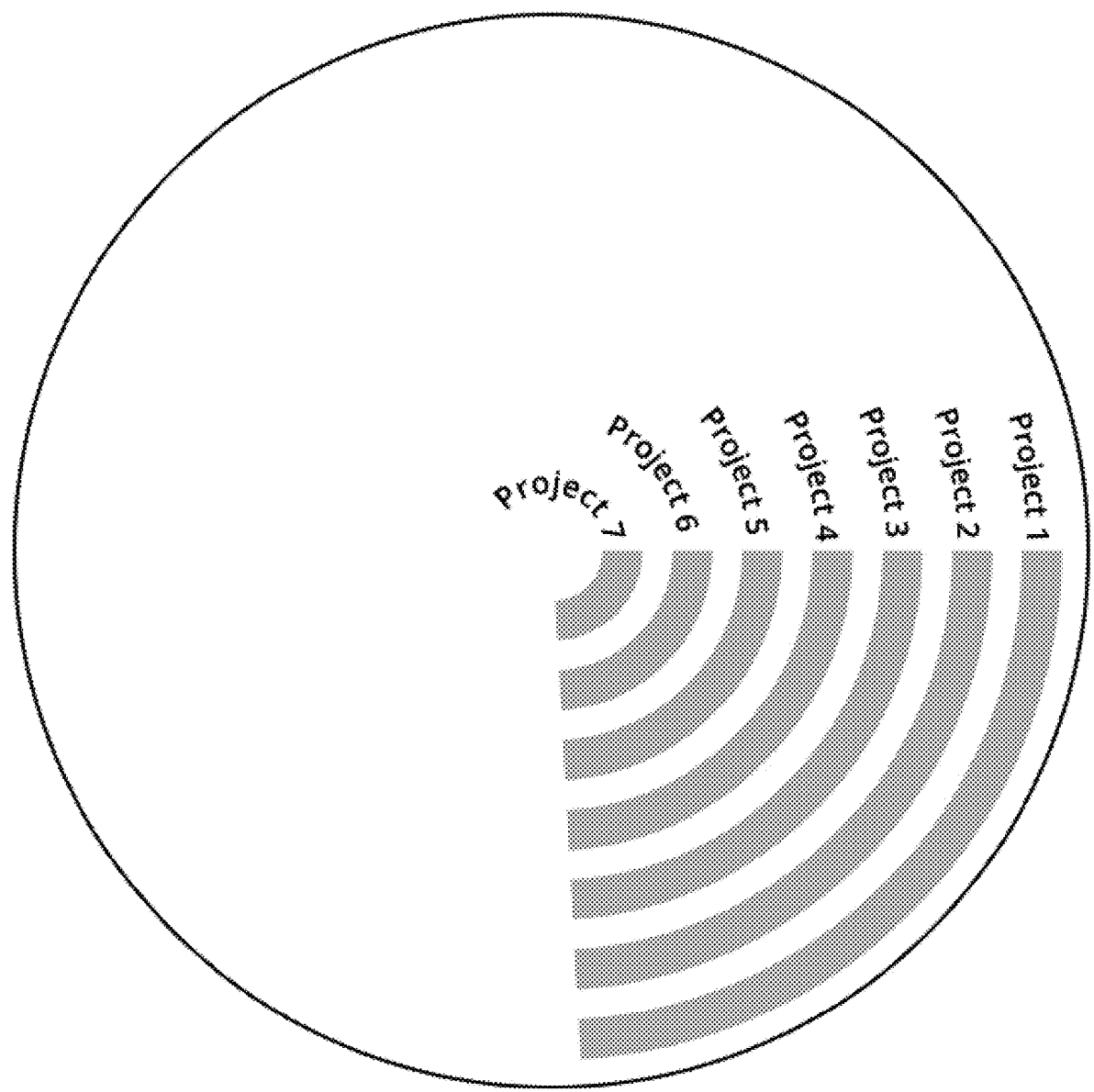
FIG. 20 is a second example of data incorrectly fitting a display area.
Figure 21:
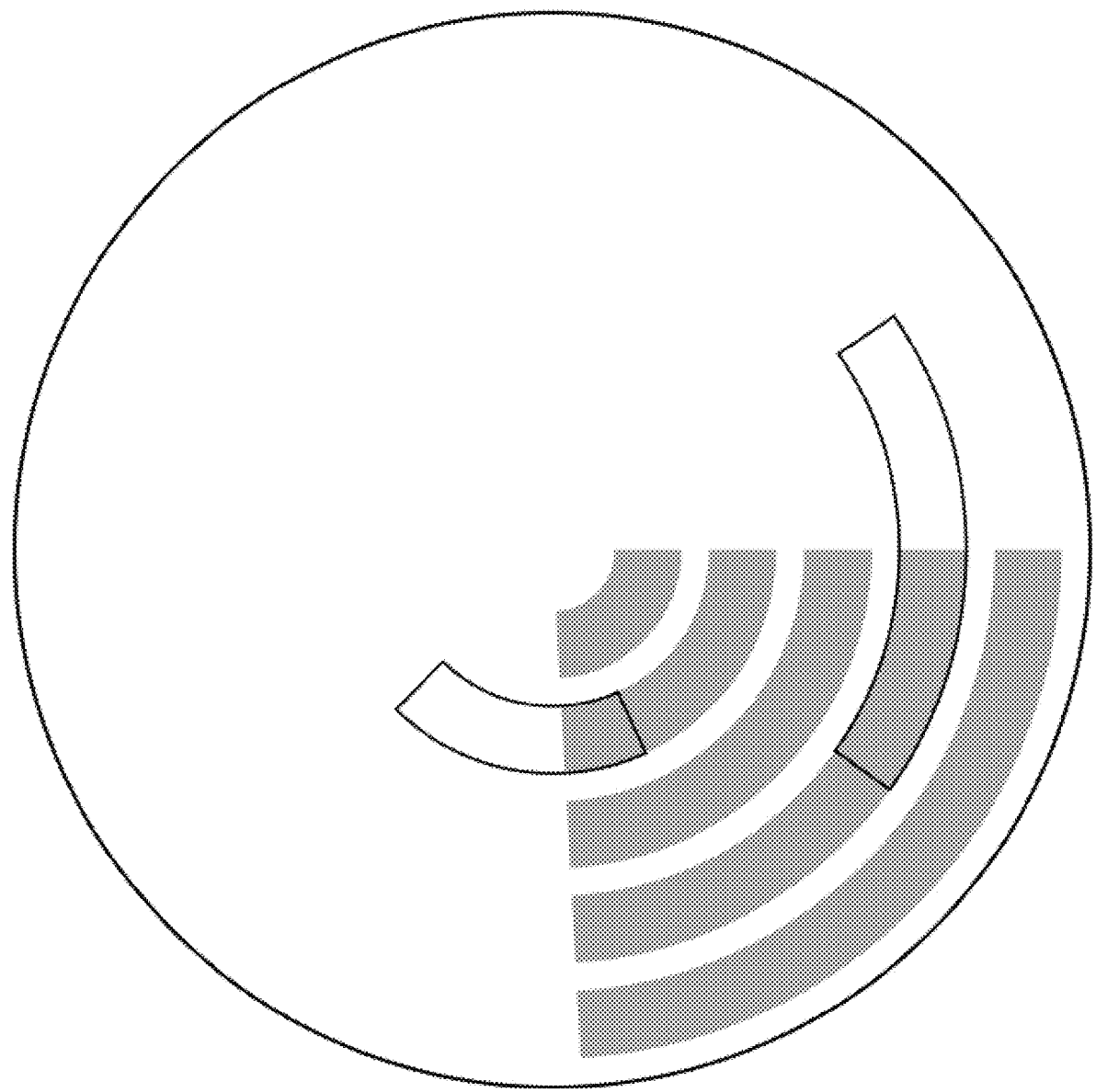
FIG. 21 is a third example of data incorrectly fitting a display area.

In the case of the Vistogram in FIG. 12, three over-crowding scenarios are illustrated in FIGS. 19 to 21. FIG. 19 is an example of data points over spilling the defined or usable display areas. FIG. 20 is an example of data points reduced to a size that is marginal or unreadable. FIG. 21 is an example of data points that overlap each other impacting readability.

Although the exact manifestation of these issues is somewhat aligned to the charting approach, they apply broadly.

A number of mitigations need to be developed and integrated to produce a useable visualisation.

First amongst these mitigations is performing cluster analysis to ensure that the volume of data presented to the user is both re-sizeable and re-sized to suit the available display area.

Figure 22:
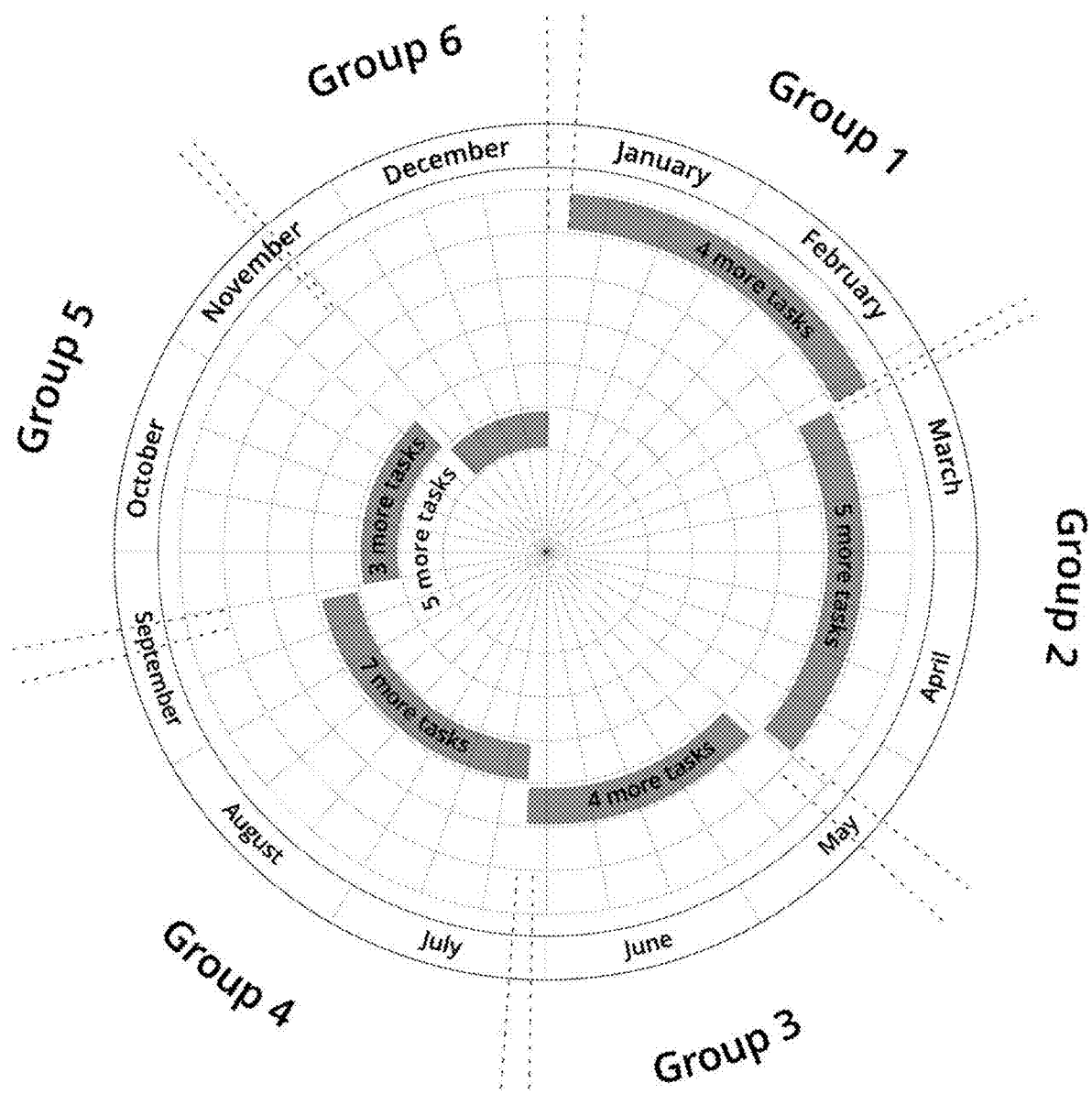
FIG. 22 is an example of how a cluster analysis is performed.

Referring to FIG. 22, a data set that has had cluster analysis performed is shown. The tasks along a timeline, January to December (an example of a first parameter), and clusters of tasks occupy different radii (an example of a second parameter). The clustering supports the objectives of ensuring that data sets of any size do not spill over outside the available display area. However, it is sub-optimal insofar as a great deal of the display area remains unused. A lot of information that could be presented at this 'top level' is subordinated and requires user action and effort to view. While not an example of a first representation, if each group of tasks were a data item, FIG. 22 would look similar to a first representation as none of the task groups overlap in time line (e.g. the first parameter).

While these points need to be born in mind, clustering is an important part of the overall data enrichment and analysis. Clustering the data enables data sets of any foreseeable size to be condensed to fit a limited fixed display area.

To optimise the view presented to the end user, additional questions need to be addressed.

Namely:
1. What to group or conversely, what not to group?
2. Where to plot the elements of the data set?

There are some specific difficulties that apply to answering those questions. It may seem that specific challenges arise due to the radial approach selected. However, in addressing the challenges for a radial plot (the Vistogram) a number of computational products and artefacts are created which will be applicable in a variety of other scenarios.

Figure 23:
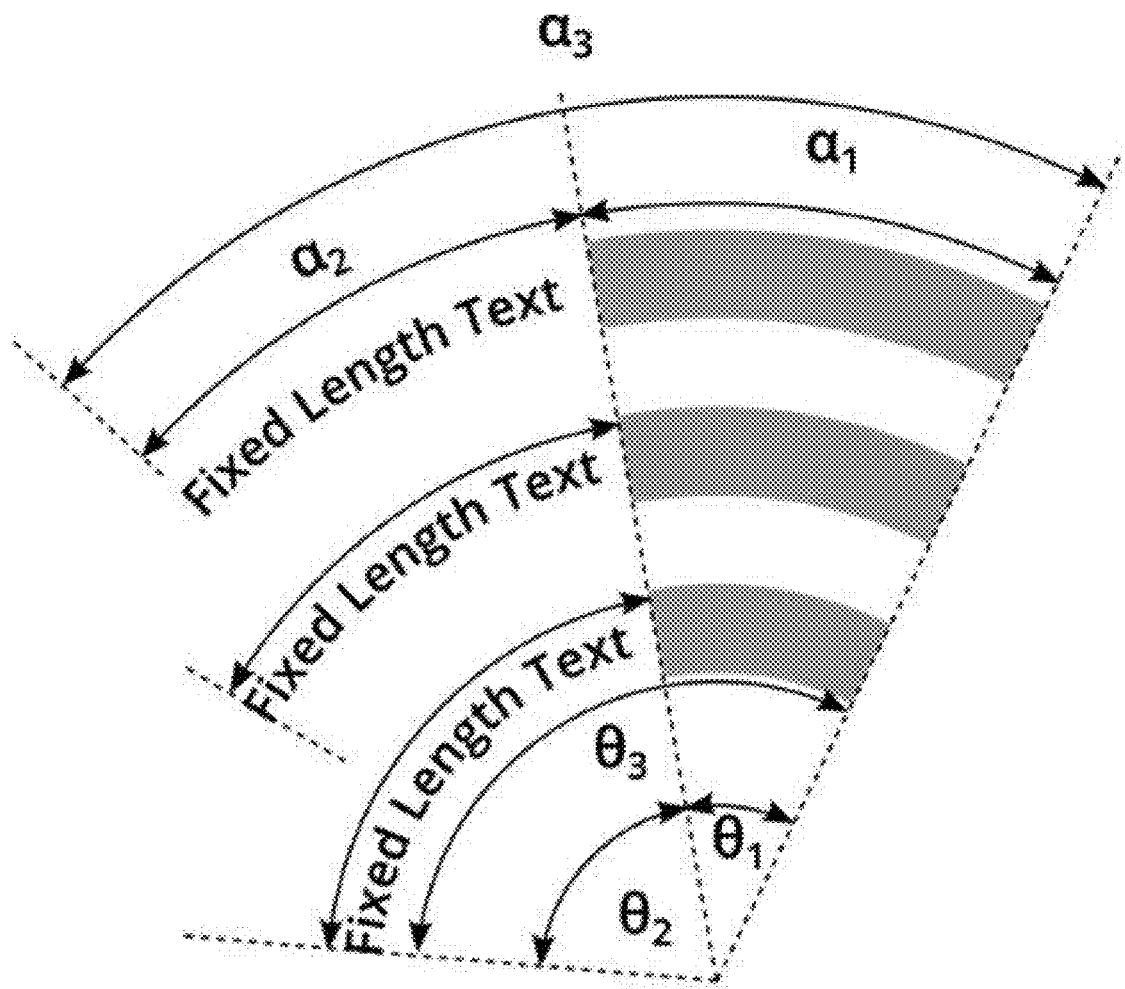
FIG. 23 is a schematic indicating angles and lengths.

Referring to FIG. 23 all following references to angles termed Θ or arc lengths termed α reference the angles and lengths in FIG. 23.

Θ1 which is the start and end angle of the drawn arc which corresponds to the start and end dates of the activity.

α1 is arc length of the drawn element at the radius it is being drawn.

Θ2 the additional angle (at a given radius) required to accommodate the text label associated with the drawn arc. Θ2 varies with the radius of the drawn arc. Θ2 can be zero if the text can be accommodated in the drawn arc or if there is no text label.

α2 is the additional arc length of the text label associated with the drawn element at a given radius.

α2 can be zero if the text can be accommodated in the drawn arc or if there is no text label.

Θ3 is the combined angle Θ1 and Θ2.

α3 is the combined arc length α1 and α2

For a 'drawn element' without text the angle of arc (Θ1) remains constant, but arc length (α1) varies as $2\pi r(\theta1/360)$ but r (radius) and θ1 are unknown.

The angle of arc for a drawn element with text (θ3) is θ1+θ2 but if θ2<Θ1, then Θ3=θ1

For text, the arc length α2 is broadly constant.

Angle of arc (Θ2) varies as $360(\alpha2/2\pi r)$ but at this point, neither r (radius) or α2 are known.

A mechanism to mitigate the information deficits to make the problem solvable is required.

The input data can be enriched with a predefined set of values for r. If r is known, or able to be simulated, then it supports further mechanisms via which values for Θ3 and α3 can be modelled.

An understanding of the input data is required to support the discussion that follows.

PPM data sets almost universally comprise the following fields described in Table 2. Often many more. It should be apparent that the fields below are equally applicable to any scheduling data set.

TABLE 2

| Field | Description |
| --- | --- |
| Name | Task name. Free text string of between 1 and many characters. |
| Duration | Duration of task in mins, hours, days, weeks, months or years |
| Start Date | The date the task is scheduled to start |
| Finish Date | The date the task is scheduled to end |
| Predecessors | The other task in the plan upon which this task depends to some degree for its start or completion. |
| Outline Level | Information regarding the location of this task in the plan's hierarchy. |

A typical data set might be as follows in Table 3:

TABLE 3

| # | Name | Duration | Start Date | Finish Date | Predecessors | Outline Level |
| --- | --- | --- | --- | --- | --- | --- |
| 1 | Contracts | 0 | 1 Jun. 2021 | 1 Jun. 2021 | | 1 |
| 2 | Supply Lot Sale Agreement | 0 | 1 Jun. 2021 | 1 Jun. 2021 | | 2 |
| 3 | Supply Construction Agreement | 0 | 1 Jun. 2021 | 1 Jun. 2021 | | 2 |
| 4 | Supply Contract Plans | 0 | 1 Jun. 2021 | 1 Jun. 2021 | 3 | 2 |
| 5 | Supply Contract Specifications | 0 | 1 Jun. 2021 | 1 Jun. 2021 | 3 | 2 |
| 6 | Supply Contract Site Plan | 0 | 1 Jun. 2021 | 1 Jun. 2021 | 3 | 2 |
| 7 | Secure Financing | 0 | 1 Jun. 2021 | 1 Jun. 2021 | | 2 |
| 8 | Construction Loan Settlement | 0 | 1 Jun. 2021 | 1 Jun. 2021 | | 2 |
| 9 | Document Review & Revision | 34 | 1 Jun. 2021 | 5 Jul. 2021 | | 1 |
| 10 | Review & Finalize Plans | 20 | 1 Jun. 2021 | 21 Jun. 2021 | 4 | 2 |
| 11 | Review & Finalize Specifications | 27 | 1 Jun. 2021 | 28 Jun. 2021 | 5 | 2 |
| 12 | Review & Finalize Site Plan | 0 | 22 Jun. 2021 | 22 Jun. 2021 | 6, 10 | 2 |

TABLE 3-continued

| # | Name | Duration | Start Date | Finish Date | Predecessors | Outline Level |
|---|------|----------|------------|-------------|--------------|---------------|
| 13 | Print Construction Drawings | 6 | 29 Jun. 2021 | 5 Jul. 2021 | 10, 11, 12 | 2 |
| 14 | Approve Revised Plans | 0 | 5 Jul. 2021 | 5 Jul. 2021 | 13 | 2 |
| 15 | Approve Revised Specifications | 0 | 5 Jul. 2021 | 5 Jul. 2021 | 13 | 2 |
| 16 | Approve Revised Site Plan | 0 | 5 Jul. 2021 | 5 Jul. 2021 | 13 | 2 |

Figure 24:
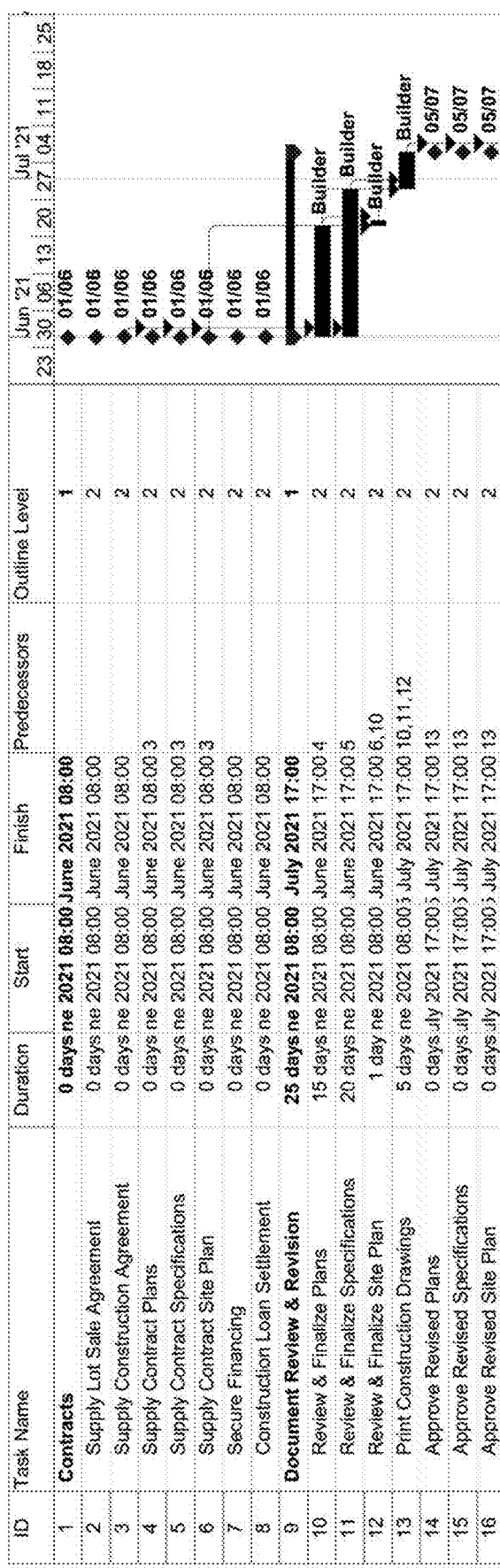
FIG. 24 is a Gantt chart and table.

And for completeness, this data set is shown in FIG. 24 rendered in a typical Gantt chart view in a widely used project management software application.

A commonly used convention in PPM data sets is that zero length tasks are milestones. Review of the Gantt chart below also illustrates the inherent hierarchical nature of PPM data with almost all line items being a child item, a parent or both. The use of the outline level (or other mechanism) records a specific activity's location in the hierarchy.

Referring to the following dataset in Table 4:

TABLE 4

| ID | Name | Duration | Start | Finish | Predecessors | Outline Level |
|----|------|----------|-------|--------|--------------|---------------|
| 1 | Phase A | 59 days | 4 Apr. 2022 08:00 | 23 Jun. 2022 17:00 | | 1 |
| 2 | Task 1 | 7 days | 4 Apr. 2022 08:00 | 12 Apr. 2022 17:00 | | 2 |
| 3 | Task 2 | 6 days | 4 Apr. 2022 08:00 | 11 Apr. 2022 17:00 | | 2 |
| 4 | Task 3 | 2 days | 4 Apr. 2022 08:00 | 5 Apr. 2022 17:00 | | 2 |
| 5 | Task 4 | 8 days | 4 Apr. 2022 08:00 | 13 Apr. 2022 17:00 | | 2 |
| 6 | Task 5 | 3 days | 4 Apr. 2022 08:00 | 6 Apr. 2022 17:00 | | 2 |
| 7 | Task 6 | 7 days | 4 Apr. 2022 08:00 | 12 Apr. 2022 17:00 | | 2 |
| 8 | Task 7 | 4 days | 4 Apr. 2022 08:00 | 7 Apr. 2022 17:00 | | 2 |
| 9 | Task 8 | 3 days | 4 Apr. 2022 08:00 | 6 Apr. 2022 17:00 | | 2 |
| 10 | Task 9 | 2 days | 4 Apr. 2022 08:00 | 5 Apr. 2022 17:00 | | 2 |
| 11 | Task 10 | 8 days | 4 Apr. 2022 08:00 | 13 Apr. 2022 17:00 | | 2 |
| 12 | Task 11 | 2 days | 4 Apr. 2022 08:00 | 5 Apr. 2022 17:00 | | 2 |
| 13 | Task 12 | 8 days | 4 Apr. 2022 08:00 | 13 Apr. 2022 17:00 | | 2 |
| 14 | Task 13 | 6 days | 7 Apr. 2022 08:00 | 14 Apr. 2022 17:00 | 9 | 2 |
| 15 | Task 14 | 5 days | 7 Apr. 2022 08:00 | 13 Apr. 2022 17:00 | 9 | 2 |
| 16 | Task 15 | 7 days | 14 Apr. 2022 08:00 | 22 Apr. 2022 17:00 | 15 | 2 |
| 17 | Task 16 | 6 days | 14 Apr. 2022 08:00 | 21 Apr. 2022 17:00 | 12, 13 | 2 |
| 18 | Task 17 | 3 days | 14 Apr. 2022 08:00 | 18 Apr. 2022 17:00 | 12, 13 | 2 |
| 19 | Task 18 | 2 days | 14 Apr. 2022 08:00 | 15 Apr. 2022 17:00 | 12, 13 | 2 |
| 20 | Task 19 | 8 days | 18 Apr. 2022 08:00 | 27 Apr. 2022 17:00 | 19 | 2 |
| 21 | Task 20 | 6 days | 18 Apr. 2022 08:00 | 25 Apr. 2022 17:00 | 19 | 2 |

TABLE 4-continued

| ID | Name | Duration | Start | Finish | Predecessors | Outline Level |
|----|------|----------|-------|--------|--------------|---------------|
| 22 | Task 21 | 5 days | 28 Apr. 2022 08:00 | 4 May 2022 17:00 | 20, 21 | 2 |
| 23 | Task 22 | 7 days | 28 Apr. 2022 08:00 | 6 May 2022 17:00 | 20, 21 | 2 |
| 24 | Task 23 | 4 days | 5 May 2022 08:00 | 10 May 2022 17:00 | 22 | 2 |
| 25 | Task 24 | 5 days | 5 May 2022 08:00 | 11 May 2022 17:00 | 22 | 2 |
| 26 | Task 25 | 6 days | 12 May 2022 08:00 | 19 May 2022 17:00 | 25 | 2 |
| 27 | Task 26 | 6 days | 20 May 2022 08:00 | 27 May 2022 17:00 | 26 | 2 |
| 28 | Task 27 | 2 days | 30 May 2022 08:00 | 31 May 2022 17:00 | 26, 27 | 2 |
| 29 | Task 28 | 8 days | 1 Jun. 2022 08:00 | 10 Jun. 2022 17:00 | 28 | 2 |
| 30 | Task 29 | 8 days | 1 Jun. 2022 08:00 | 10 Jun. 2022 17:00 | 28 | 2 |
| 31 | Task 30 | 2 days | 13 Jun. 2022 08:00 | 14 Jun. 2022 17:00 | 29 | 2 |
| 32 | Task 31 | 7 days | 15 Jun. 2022 08:00 | 23 Jun. 2022 17:00 | 31 | 2 |

What is discernible from this data set it that there are 31 tasks which occur in parallel with no inherent hierarchical arrangement. 31 tasks need to be rendered in a single Vistogram view and in all likelihood, some element of clustering will be required.

As to when clustering is (or is not) required, a rudimentary assessment can be made if there are more tasks at the same level occurring simultaneously (i.e. at the same time) than there are available radii in which they can be accommodated.

Referring again to FIG. 8, 6 separate radii are available which can display 6 activities occurring in parallel. The number 6 is somewhat arbitrary but is appears to be a good middle ground in most scenarios.

When reference is made to 'at the same level' this refers to what is illustrated in Tables and 6 below.

In scenario 1, there are 7 tasks occurring simultaneous 'at the same level'. There is no hierarchical distinction between tasks 1 to 7 and they are all child items of the Phase B activity at outline level 1.

Conversely in scenario 2, only tasks 1 to 4 sit directly under Phase B. Only 4 tasks would need to be displayed simultaneously at the same level in the Vistogram. Tasks 5, 6 and 7 are child items of task 4.

TABLE 5

| Scenario 1 | | | |
|---|---|---|---|
| Activity | Start | End | Outline Level |
| Phase B | Jan. 1, 2022 | Oct. 1, 2022 | 1 |
| Task 1 | Jan. 1, 2022 | Oct. 1, 2022 | 2 |
| Task 2 | Jan. 1, 2022 | Oct. 1, 2022 | 2 |
| Task 3 | Jan. 1, 2022 | Oct. 1, 2022 | 2 |
| Task 4 | Jan. 1, 2022 | Oct. 1, 2022 | 2 |
| Task 5 | Jan. 1, 2022 | Oct. 1, 2022 | 2 |
| Task 6 | Jan. 1, 2022 | Oct. 1, 2022 | 2 |
| Task 7 | Jan. 1, 2022 | Oct. 1, 2022 | 2 |

TABLE 6

| | Scenario2 | | |
|---|---|---|---|
| Activity | Start | End | Outline Level |
| Phase B | Jan. 1, 2022 | Oct. 1, 2022 | 1 |
| Task 1 | Jan. 1, 2022 | Oct. 1, 2022 | 2 |
| Task 2 | Jan. 1, 2022 | Oct. 1, 2022 | 2 |
| Task 3 | Jan. 1, 2022 | Oct. 1, 2022 | 2 |
| Task 4 | Jan. 1, 2022 | Oct. 1, 2022 | 2 |
| Task 5 | Jan. 1, 2022 | Oct. 1, 2022 | 3 |
| Task 6 | Jan. 1, 2022 | Oct. 1, 2022 | 3 |
| Task 7 | Jan. 1, 2022 | Oct. 1, 2022 | 3 |

A rudimentary calculation can be performed which will provide an indication of whether or not any degree of clustering will be required. This can disregard the requirements to accommodate any labelling (or utilise some basic assumptions).

Table 7 is the same data as that shown in Tables 5 and 6 but here, a start angle and end angle have been computed for each task. This is generated from defining the time-frame for the Vistogram as a whole and computing what proportion of the overall 360 degree circumference corresponds to a given task. At this point issues that arise due to uncertainty about $\alpha_2$ and $\alpha_3$ can be temporarily side-stepped. The start and end angles are determined solely from the start and end dates of the tasks.

TABLE 7

| Name | Duration | Start_Date | Finish_Date | Predecessors | Outline_Level | Start Angle | End Angle | K-Series Cluster |
|---|---|---|---|---|---|---|---|---|
| Phase A | 59 days | 4 Apr. 2022 08:00 | 23 Jun. 2022 17:00 | | 1 | | | |
| Task 1 | 7 days | 4 Apr. 2022 08:00 | 12 Apr. 2022 17:00 | | 2 | 14.29 | 50.18 | 0 |
| Task 2 | 6 days | 4 Apr. 2022 08:00 | 11 Apr. 2022 17:00 | | 2 | 14.29 | 45.89 | 0 |
| Task 3 | 2 days | 4 Apr. 2022 08:00 | 5 Apr. 2022 17:00 | | 2 | 14.29 | 20.18 | 0 |
| Task 4 | 8 days | 4 Apr. 2022 08:00 | 13 Apr. 2022 17:00 | | 2 | 14.29 | 54.46 | 0 |
| Task 5 | 3 days | 4 Apr. 2022 08:00 | 6 Apr. 2022 17:00 | | 2 | 14.29 | 24.46 | 0 |
| Task 6 | 7 days | 4 Apr. 2022 08:00 | 12 Apr. 2022 17:00 | | 2 | 14.29 | 50.18 | 0 |
| Task 7 | 4 days | 4 Apr. 2022 08:00 | 7 Apr. 2022 17:00 | | 2 | 14.29 | 28.75 | 0 |
| Task 8 | 3 days | 4 Apr. 2022 08:00 | 6 Apr. 2022 17:00 | | 2 | 14.29 | 24.46 | 0 |
| Task 9 | 2 days | 4 Apr. 2022 08:00 | 5 Apr. 2022 17:00 | | 2 | 14.29 | 20.18 | 0 |
| Task 10 | 8 days | 4 Apr. 2022 08:00 | 13 Apr. 2022 17:00 | | 2 | 14.29 | 54.46 | 0 |
| Task 11 | 2 days | 4 Apr. 2022 08:00 | 5 Apr. 2022 17:00 | | 2 | 14.29 | 20.18 | 0 |
| Task 12 | 8 days | 4 Apr. 2022 08:00 | 13 Apr. 2022 17:00 | | 2 | 14.29 | 54.46 | 0 |
| Task 13 | 6 days | 7 Apr. 2022 08:00 | 14 Apr. 2022 17:00 | 9 | 2 | 27.14 | 58.75 | 0 |
| Task 14 | 5 days | 7 Apr. 2022 08:00 | 13 Apr. 2022 17:00 | 9 | 2 | 27.14 | 54.46 | 0 |
| Task 15 | 7 days | 14 Apr. 2022 08:00 | 22 Apr. 2022 17:00 | 15 | 2 | 57.14 | 93.04 | 3 |
| Task 16 | 6 days | 14 Apr. 2022 08:00 | 21 Apr. 2022 17:00 | 12, 13 | 2 | 57.14 | 88.75 | 3 |
| Task 17 | 3 days | 14 Apr. 2022 08:00 | 18 Apr. 2022 17:00 | 12, 13 | 2 | 57.14 | 75.89 | 3 |
| Task 18 | 2 days | 14 Apr. 2022 08:00 | 15 Apr. 2022 17:00 | 12, 13 | 2 | 57.14 | 63.04 | 3 |
| Task 19 | 8 days | 18 Apr. 2022 08:00 | 27 Apr. 2022 17:00 | 19 | 2 | 74.29 | 114.46 | 3 |
| Task 20 | 6 days | 18 Apr. 2022 08:00 | 25 Apr. 2022 17:00 | 19 | 2 | 74.29 | 105.89 | 3 |
| Task 21 | 5 days | 28 Apr. 2022 08:00 | 4 May 2022 17:00 | 20, 21 | 2 | 117.14 | 144.46 | 5 |
| Task 22 | 7 days | 28 Apr. 2022 08:00 | 6 May 2022 17:00 | 20, 21 | 2 | 117.14 | 153.04 | 5 |
| Task 23 | 4 days | 5 May 2022 08:00 | 10 May 2022 17:00 | 22 | 2 | 147.14 | 170.18 | 5 |
| Task 24 | 5 days | 5 May 2022 08:00 | 11 May 2022 17:00 | 22 | 2 | 147.14 | 174.46 | 5 |
| Task 25 | 6 days | 12 May 2022 08:00 | 19 May 2022 17:00 | 25 | 2 | 177.14 | 208.75 | 2 |
| Task 26 | 6 days | 20 May 2022 08:00 | 27 May 2022 17:00 | 26 | 2 | 211.43 | 243.04 | 2 |
| Task 27 | 2 days | 30 May 2022 08:00 | 31 May 2022 17:00 | 26, 27 | 2 | 254.29 | 260.18 | 1 |
| Task 28 | 8 days | 1 Jun. 2022 08:00 | 10 Jun. 2022 17:00 | 28 | 2 | 262.86 | 303.04 | 1 |

TABLE 7-continued

| Name | Duration | Start_Date | Finish_Date | Predecessors | Outline_Level | Start Angle | End Angle | K-Series Cluster |
|---|---|---|---|---|---|---|---|---|
| Task 29 | 8 days | 1 Jun. 2022 08:00 | 10 Jun. 2022 17:00 | 28 | 2 | 262.86 | 303.04 | 1 |
| Task 30 | 2 days | 13 Jun. 2022 08:00 | 14 Jun. 2022 17:00 | 29 | 2 | 314.29 | 320.18 | 4 |
| Task 31 | 7 days | 15 Jun. 2022 08:00 | 23 Jun. 2022 17:00 | 31 | 2 | 322.86 | 358.75 | 4 |

Figure 25:
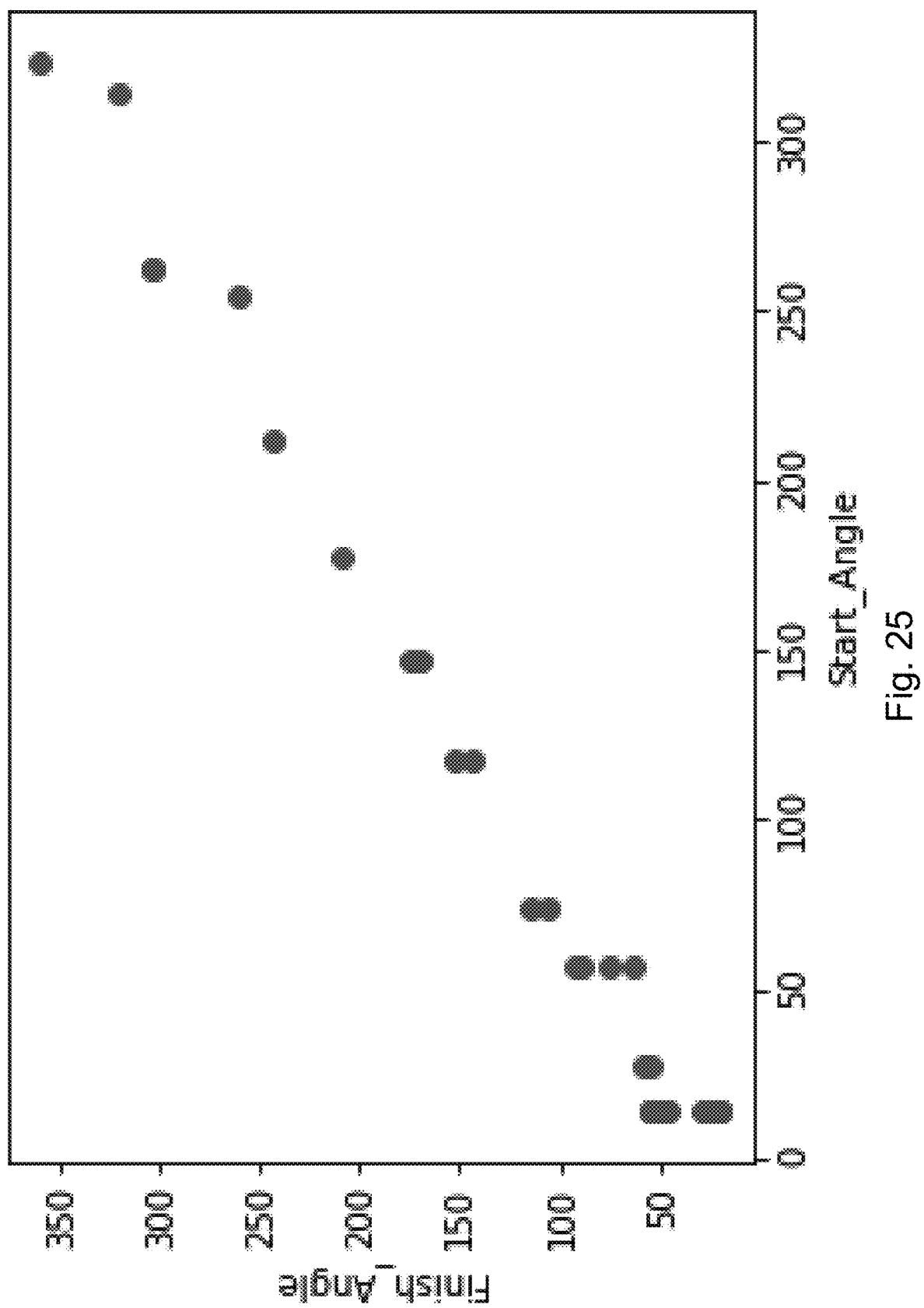
FIG. 25 is a scatter plot of start and end angles.

Note also the right most column which describes the cluster/group that the task has been assigned to. The 31 tasks can be plotted as shown in FIG. 25 using the start and end angles.

Cluster analysis can then be performed (for instance K-Means although different clustering algorithms may be preferable in specific circumstances)

Figure 26:
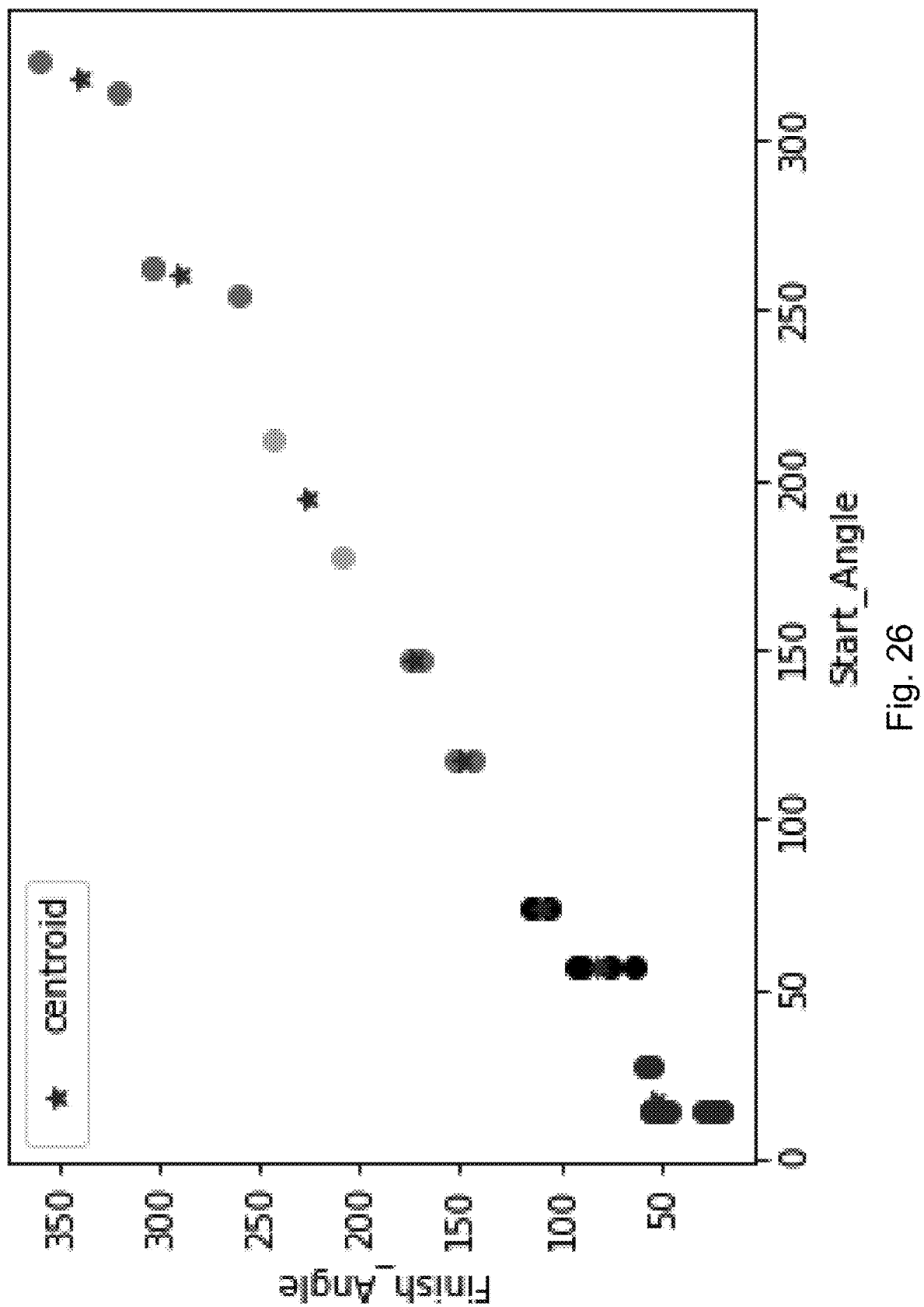
FIG. 26 is a scatter plot of start and end angles.

This in turn produces the plot in FIG. 26.

The various tasks have been assigned to one of 6 groups. The K-Means algorithm supports a computable optimum for the number of clusters (the elbow method) though in the instance 6 has been selected as there is some benefit in certain scenarios to matching the cluster count to the available radii. The specific scenario in which this is useful is with data sets which are very poorly disposed to any clustering. In an abstract worst case scenario, there could be significant overlap between the groups.

Figure 27:
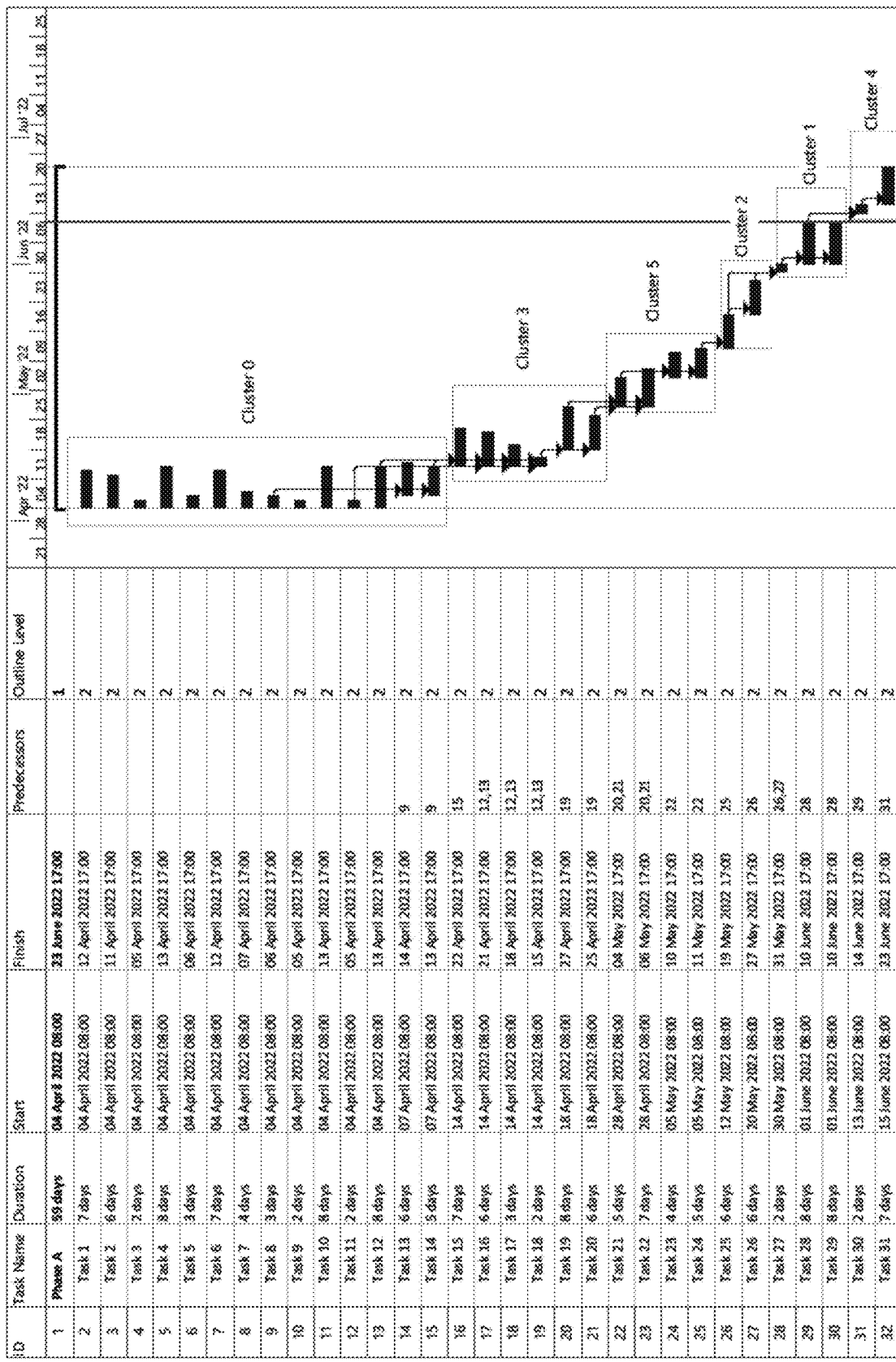
FIG. 27 is a Gantt chart and table.

It is the groupings shown in the Gantt chart of FIG. 27 which are recorded in Table 7 and FIG. 27.

The following visual is a summation of the work done so far. This encapsulates the work necessary to produce the previous conceptual illustration (Vistogram Interim Groups).

In order to render a Vistogram from a PPM data set Table 8 data needs to be generated. This does not support the plotting or clustering/grouping for the data points but it does allow the correct time scale to be determined. It supports the definition of the chart canvass on which the data points will be plotted.

TABLE 8

| Field | Description |
|---|---|
| Portfolio, programme, project or parent task | States the view in which a given task will be rendered |
| All Tasks_start | For a given view-what is the earliest start date of a member programme, project or task |
| All Tasks_end | For a given view-what is the latest end date of a member programme, project or task |
| Time-scale | Set appropriate Vistogram time-scale based on All tasks duration value. This will typically be 3 years (12 quarters), 1 year (12 months) or 12 weeks. Ultimately however, the time-scale used will be the minimum practical value for the activities displayed. |
| ActualStart | Set actual view Start date |
| ActualEnd | Set actual view End date |

In order to plot the specific data point on the Vistogram the following table data needs to be generated.

TABLE 9

| Field | Description | |
|---|---|---|
| Start_Angle | Start angle of $\alpha_1$ for a given task based solely on start date | |
| Finish_Angle | End angle of $\alpha_1$ for a given task based solely on end date | |
| $\theta_1$ | Angle of arc of drawn element excluding text | |
| Overlaps | It is possible at this point to model a value for the likely the maximum number of drawn elements that coincide at an angle. This can either use solely $\theta_1$ and $\alpha_1$ or additionally notional values for $\theta_2$ and $\alpha_2$. This is helpful insofar as determining whether grouping is necessary. | |
| Text_len ($\alpha_2$) | Calculation of task name text arc length $\alpha_2$ | |
| $\theta_2$(Tier1) | Calculation of $\theta_2$ at radius 95 mm (or other value) | Predetermining values for r is essential to overcoming the identified information deficits. A proposed visual that includes PPM data displayed at one of 6 different radii is proposed here although this number is mostly arbitrary. Defining the radius of each concentric ring allows values for $\theta_2$ to be modelled. This would remain the case whatever number of tiers were chosen and for any corresponding assigned radii. With this information now determined, the values or r at which label text can fit within the drawn element can be determined and candidate values for $\theta_3$ and $\alpha_3$ defined. |
| $\theta_2$(Tier2) | Calculation of $\theta_2$ at radius 80 mm (or other value) | |
| $\theta_2$(Tier3) | Calculation of $\theta_2$ at radius 65 mm (or other value) | |
| $\theta_2$(Tier4) | Calculation of $\theta_2$ at radius 50 mm (or other value) | |
| $\theta_2$(Tier5) | Calculation of $\theta_2$ at radius 35 mm (or other value) | |
| $\theta_2$(Tier6) | Calculation of $\theta_2$ at radius 20 mm (or other value) | |
| Ideal Tier | Smallest predefined radius at which text will fit in drawn element (if any) | |

Referring again to FIG. 22, with the existing conceptual model, there is now sufficient inputs to a programmatic solution to support the process of controlled extraction.

Figure 28:
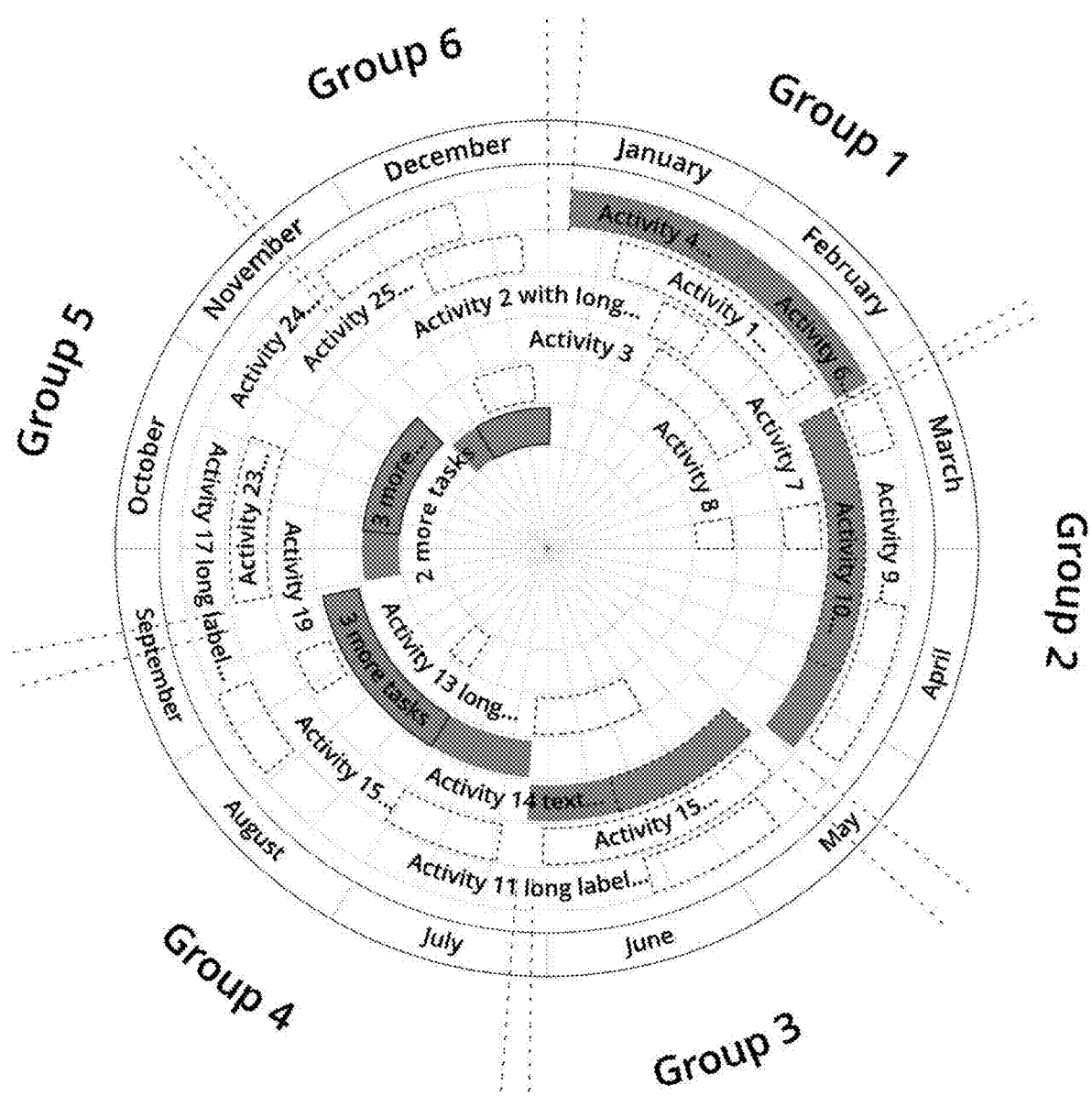
FIG. 28 is a visualisation of an interim step of producing a representation of data according to the present application.

Referring to FIG. 28, for sake of illustration, the following diagram is intended to articulate the process of controlled extraction. Starting with Group 1 (in this example), the tasks which it comprises are processed. The order, priority or weighting which is given to extraction is discretionary. Important tasks could be preferred for extraction. Large tasks, small tasks or tasks that coincide with the current date could all be prioritised singly or in combination.

The result is that tasks that can be extracted from the group and plotted on the Vistogram in whatever area is available. Values for $\Theta 2$ and $\alpha 2$ (and thus values for $\Theta 3$ and $\alpha 3$) are known at this point. Values of r for which $\alpha 2$ is less than $\alpha 1$ are also able to be identified.

In simple terms, tasks can be extracted from the group and placed in the Vistogram efficiently. If only one task remains in the group after extract, the group can be dissolved, and the remaining task placed in its stead. If only some tasks are able to be extracted, the start and end dates of the group can be adjusted accordingly to reflect the earliest start date and latest finish date of the tasks within the group.

Figure 29:
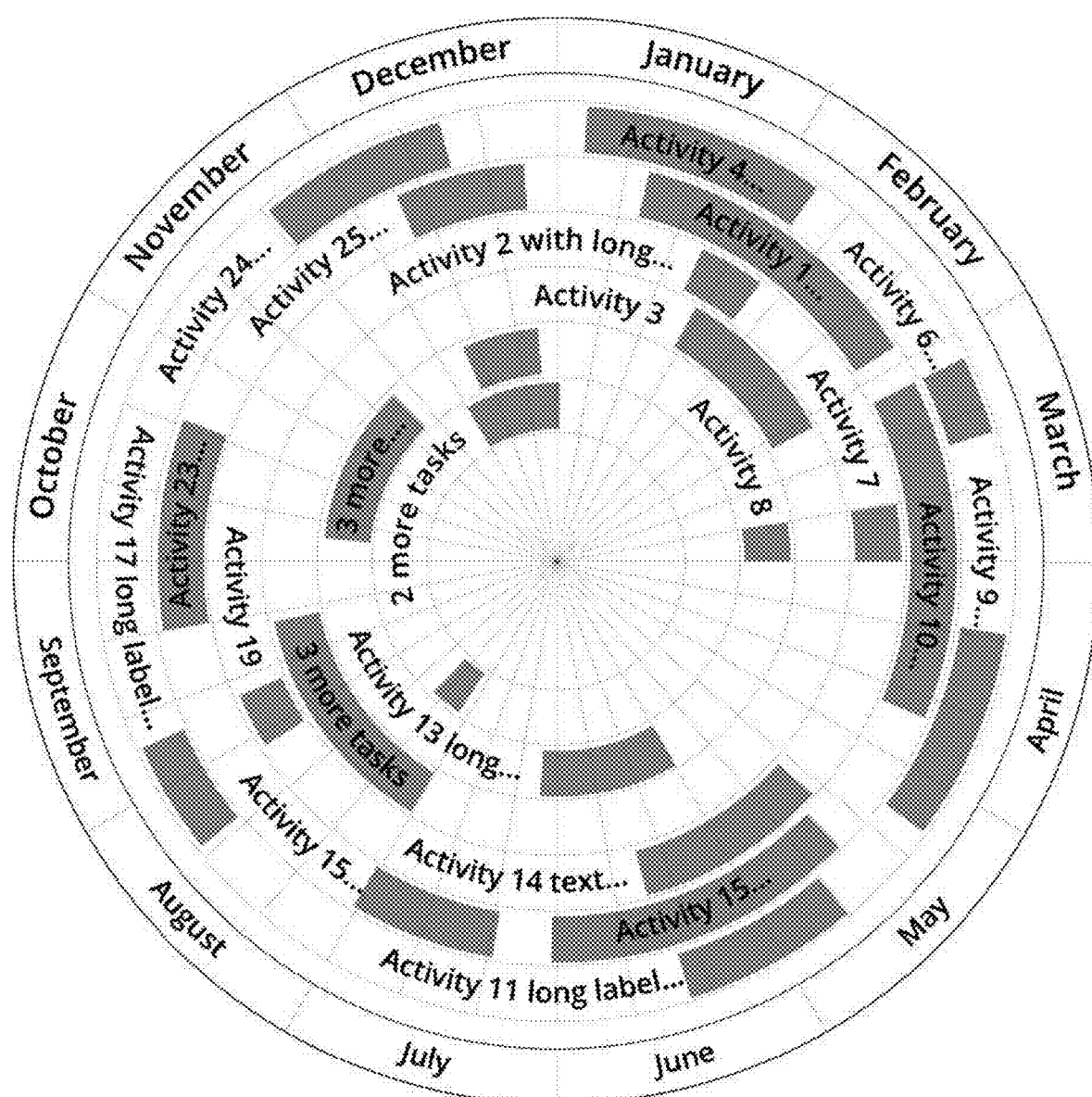
FIG. 29 is an example representation of data according to the present application.

This results in the final rendering of the Vistogram (see FIG. 29). All groups have been processed, extracting all the tasks possible.

Any remaining groups have been adjusted to reflect the dates of a reduced subset of tasks or dissolved completely.

Referring to FIG. 29, in some instances, only the graphical element could be extracted without the data label. Value is seen in displaying the arc even when the text might not be able to be accommodated. Modern computer software interfaces can propagate a variety of ways to support the end user interrogating the interface to retrieve additional detail.

In the following paragraphs, a detailed description of controlled extraction will be provided.

Figure 30:
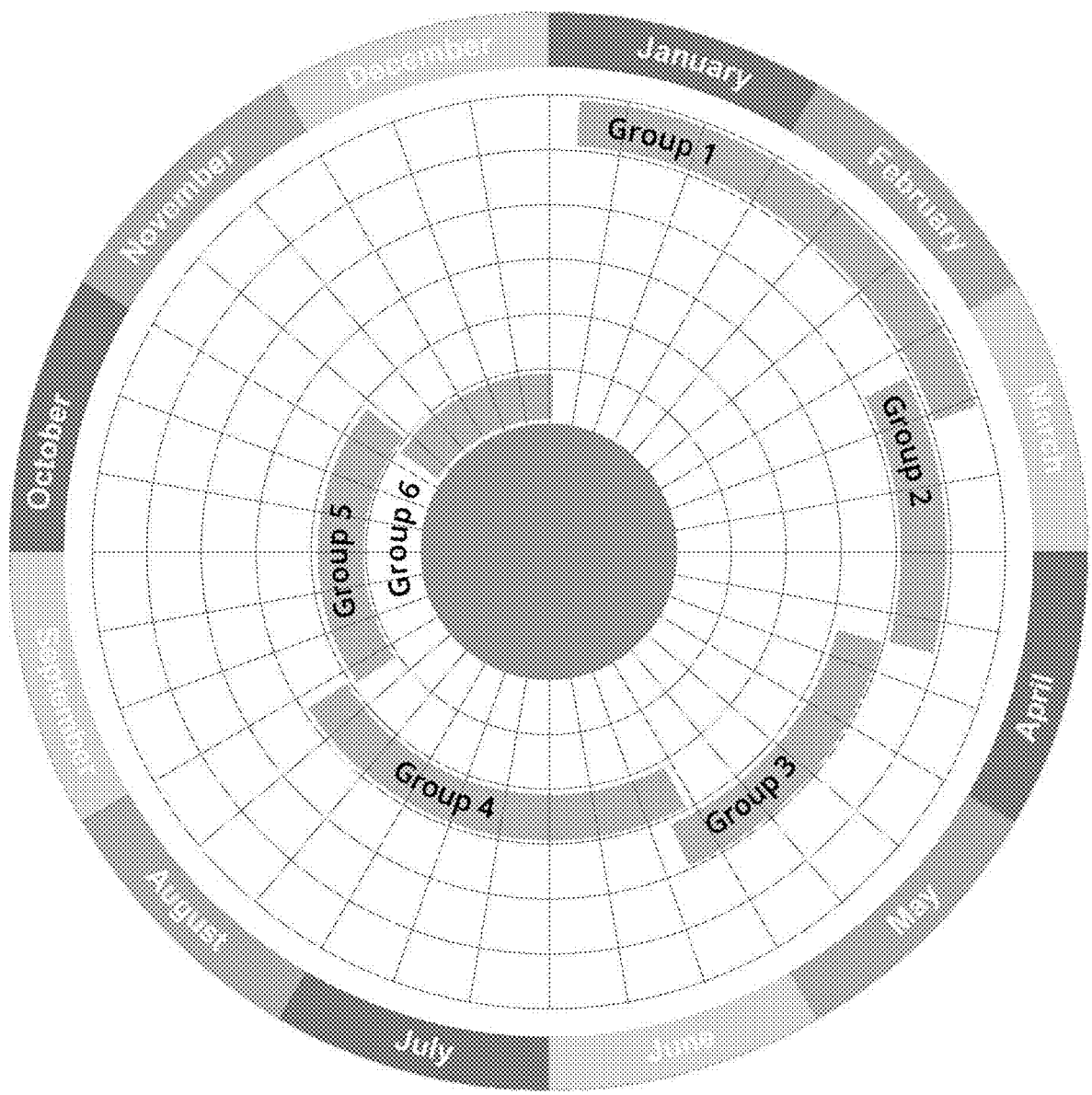
FIG. 30 is an example of a conceptual representation of grouped tasks.

Referring to FIG. 30, there is presented another conceptual image of tasks in 6 groups. Note that the groups are overlapping in time, e.g. a first parameter.

Figure 31:
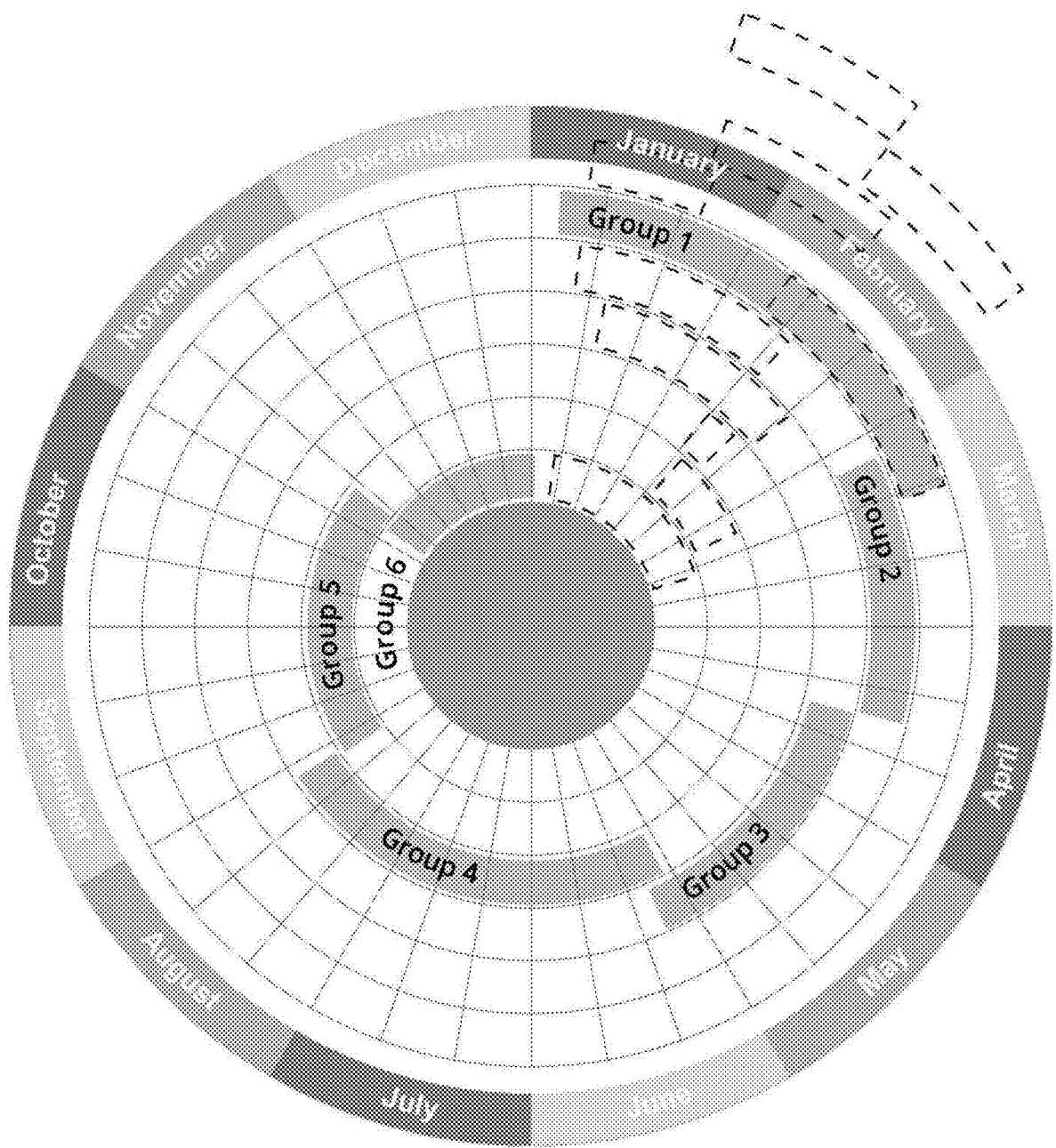
FIG. 31 is a representation of tasks within a group.

Group 1 contains 10 tasks which it is not feasible to display in the available display area. FIG. 31 provides an illustrative representation of how the 10 separate tasks (e.g. data items) would have to be displayed. This is a representation of a second representation of all the data items (tasks) belonging to the given cluster (group) that does not fit within the respective sub-region (sector of the circle defined by the first parameter (time) of group 1). At this point too, there is no consideration of the additional constraints which will arise due to text labels since values for α2 and Θ2 (and thus α3 and Θ3) cannot be calculated.

However, what can be determined are values of r for which α2 is less than α1, so a determination can be made that activity 1 can be extracted to the tier shown and the label will fit within the arc length (α1).

Figure 32:
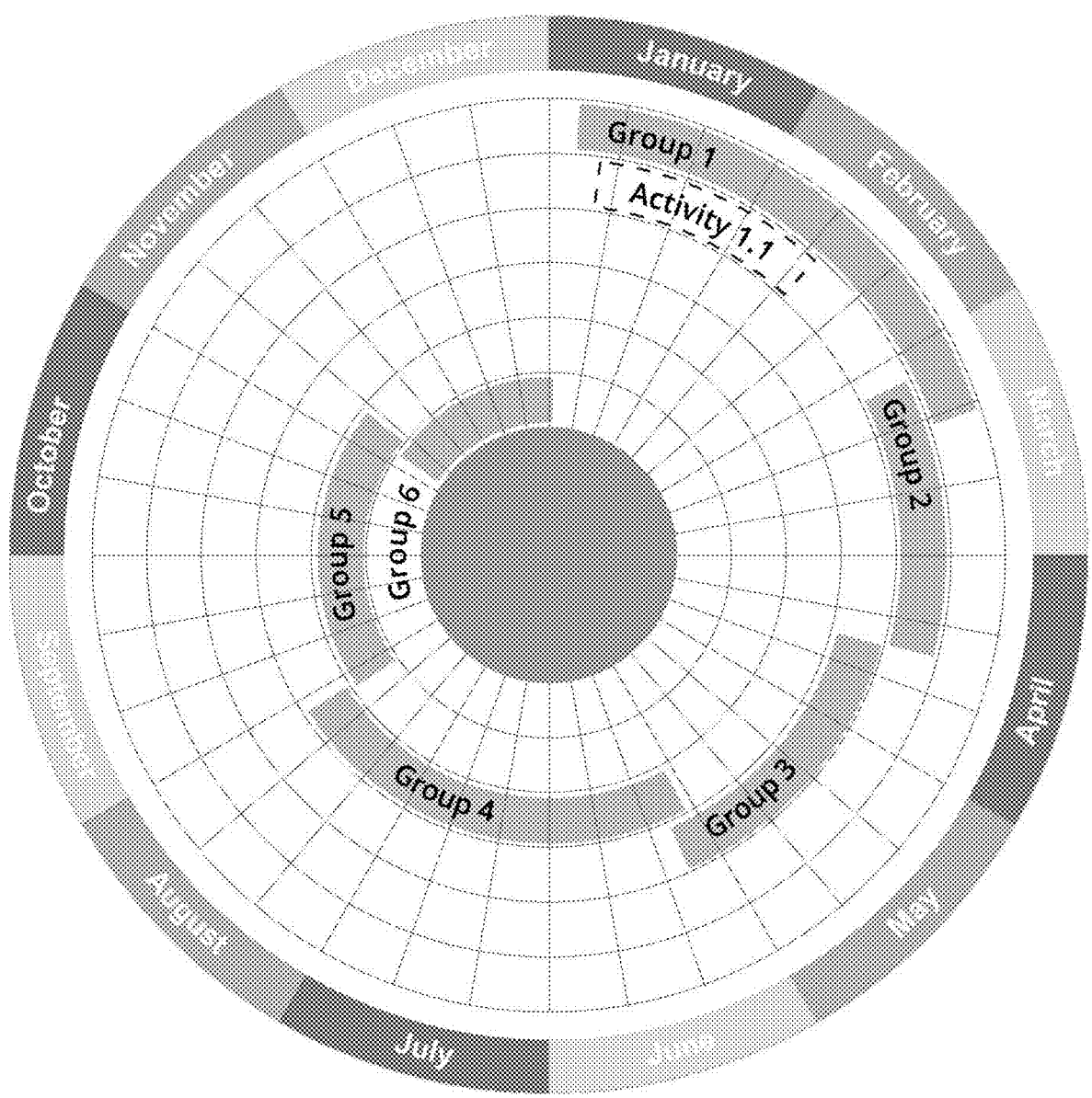
FIG. 32 is a first representation of a task to be extracted from a group.

Referring to FIGS. 32 to 36, an illustration of how the third representation is achieved is demonstrated. Referring to FIG. 32, any overlap between groups (Group 2 in this instance) needs to be factored into any assessment. Equally, Group 6 may need consideration at a later point in the process. It is worth noting that when extracting Activity 1.1, the potential for a collision with Group 2 needs to be considered.

Figure 33:
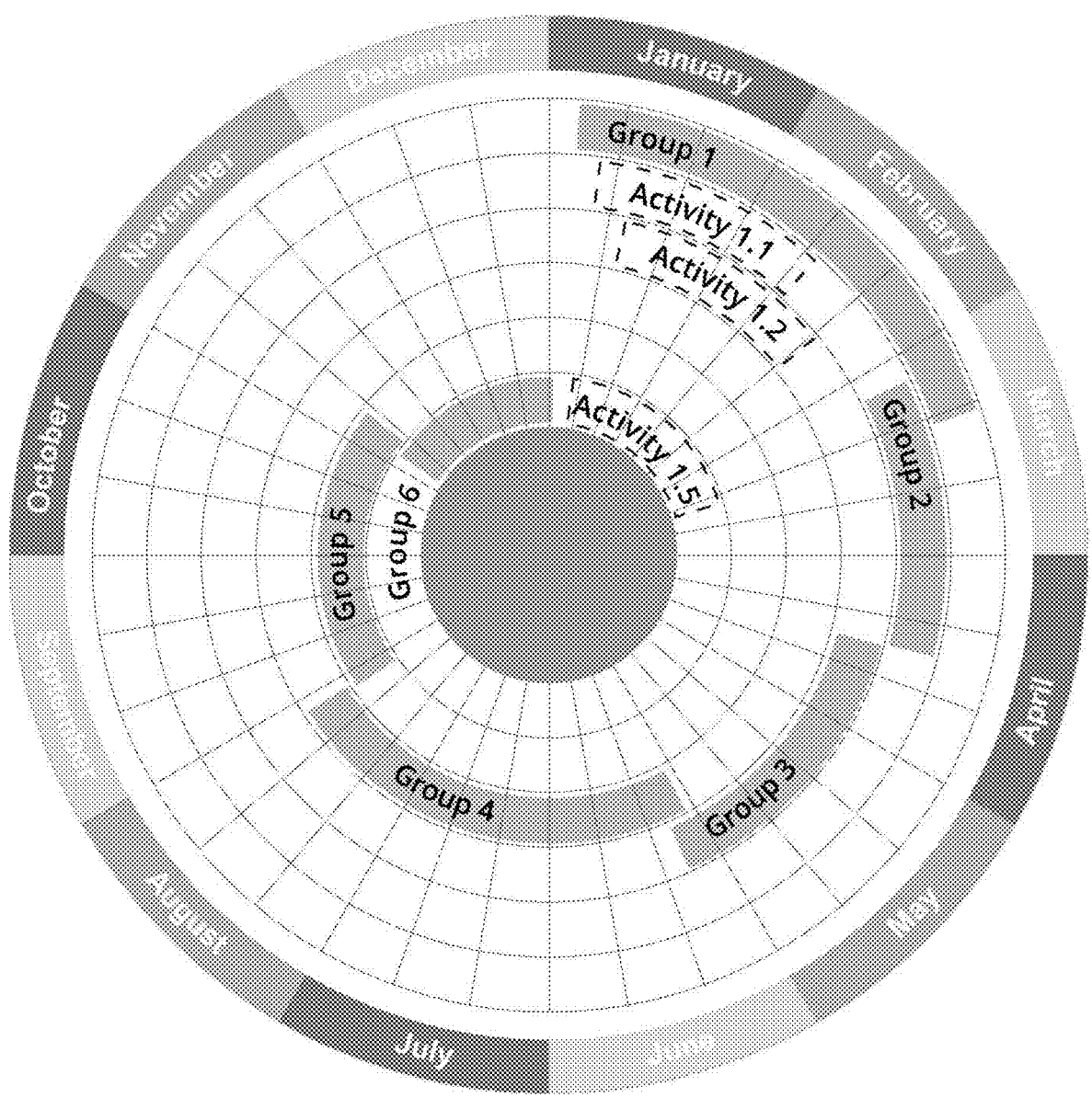
FIG. 33 is a second representation of tasks to be extracted from a group.

Referring to FIG. 33, similarly activities 1.2 and 1.5 do have 'solutions' for which α2 is less than α1, so for the purposes shown here, activity 1.2 and activity 1.5 are extracted. The precise tier (value of r) utilised does not need to be prescriptive, but a useful principal is to utilise the minimum practical value of r to maximise the efficient use of the display area. It is worth noting that in extracting Activity 1.5, the possibility of a collision with Group 6 needs to be considered.

Figure 34:
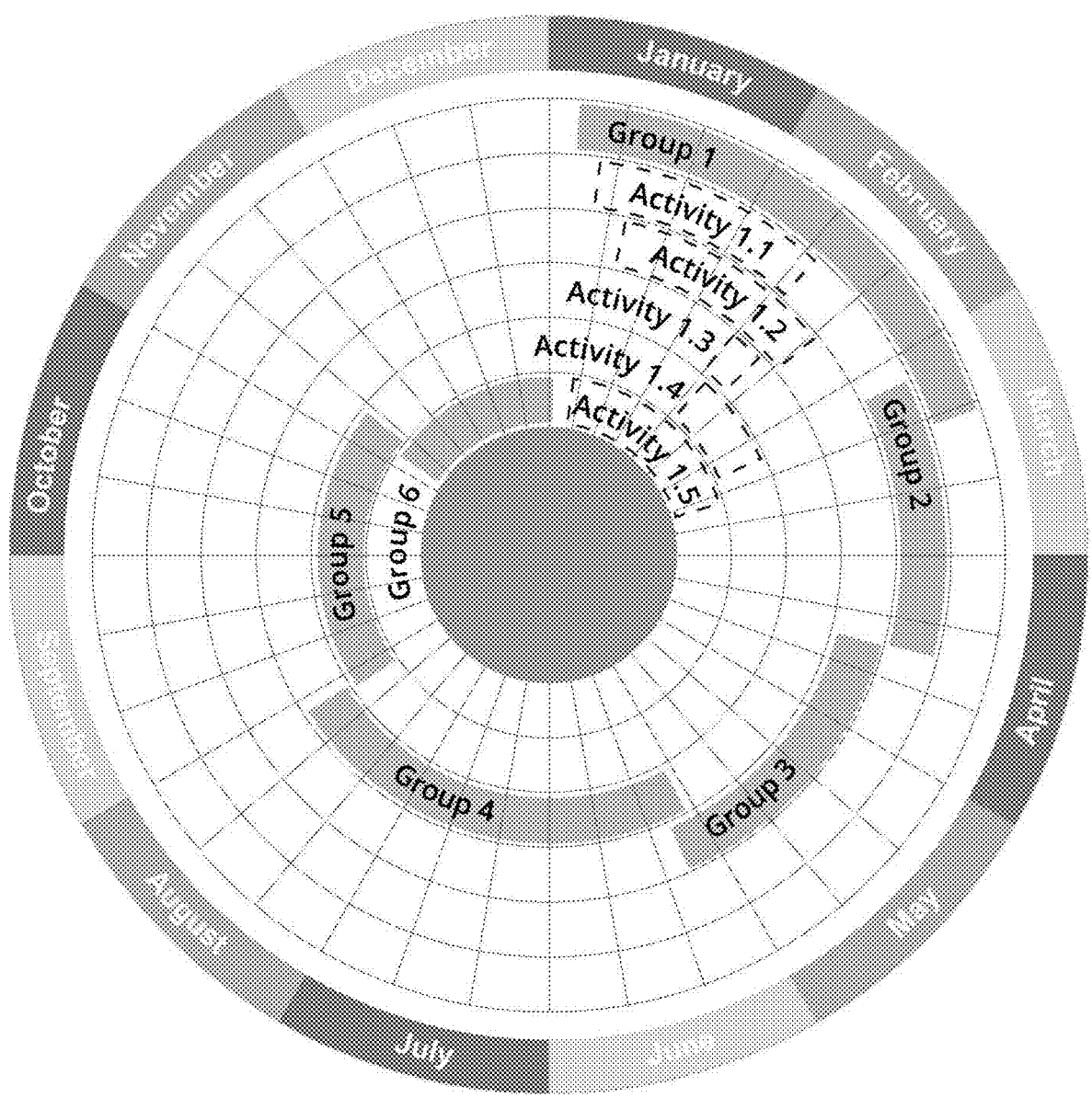
FIG. 34 is a third representation of a tasks to be extracted from a group.
Figure 35:
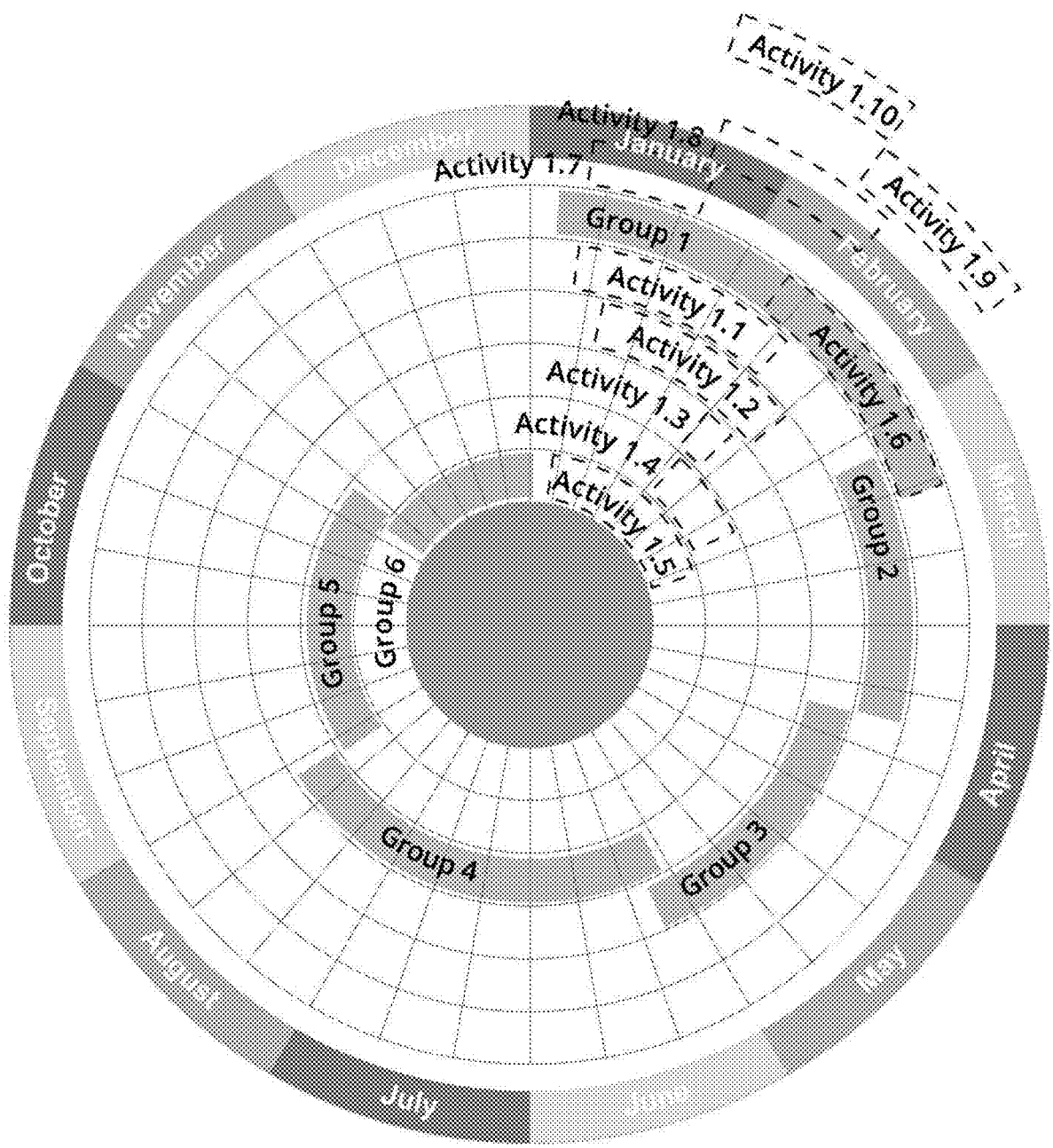
FIG. 35 is a fourth representation of a tasks to be extracted from a group.

Referring to FIG. 34, activity 1.3 and 1.4 are now extracted. There is space to extract these tasks and the associated label. There is no value of r (or no remaining value of r) for which α2 is less than α1.

At this point, Group 1 which contains 10 tasks has had 5 of those tasks extracted. 5 remain and these can be seen below.

Activities 1.7-1.10 inclusive cannot be extracted and must say grouped. The opportunity is taken however to highlight that if instead of 10 tasks, Group 1 only contained 6 tasks (1.1-1.6) then in the example below, Group 1 would be removed and activity 1.6 would take its place.

The requirement to do this work comes from an inability to compute in advance values for α3 and Θ3. An analysis can indicate a likely need for grouping but this can be unreliable, and no final answer can be forecast until the work is done. What this amounts to in practice is that if the number of simultaneous tasks exceeds the number of available tiers (6 in FIG. 35) then grouping and extracting is performed. Only when this is complete can a practical and workable assessment of the positions of the activities and any remaining need for grouping be made.

Figure 36:
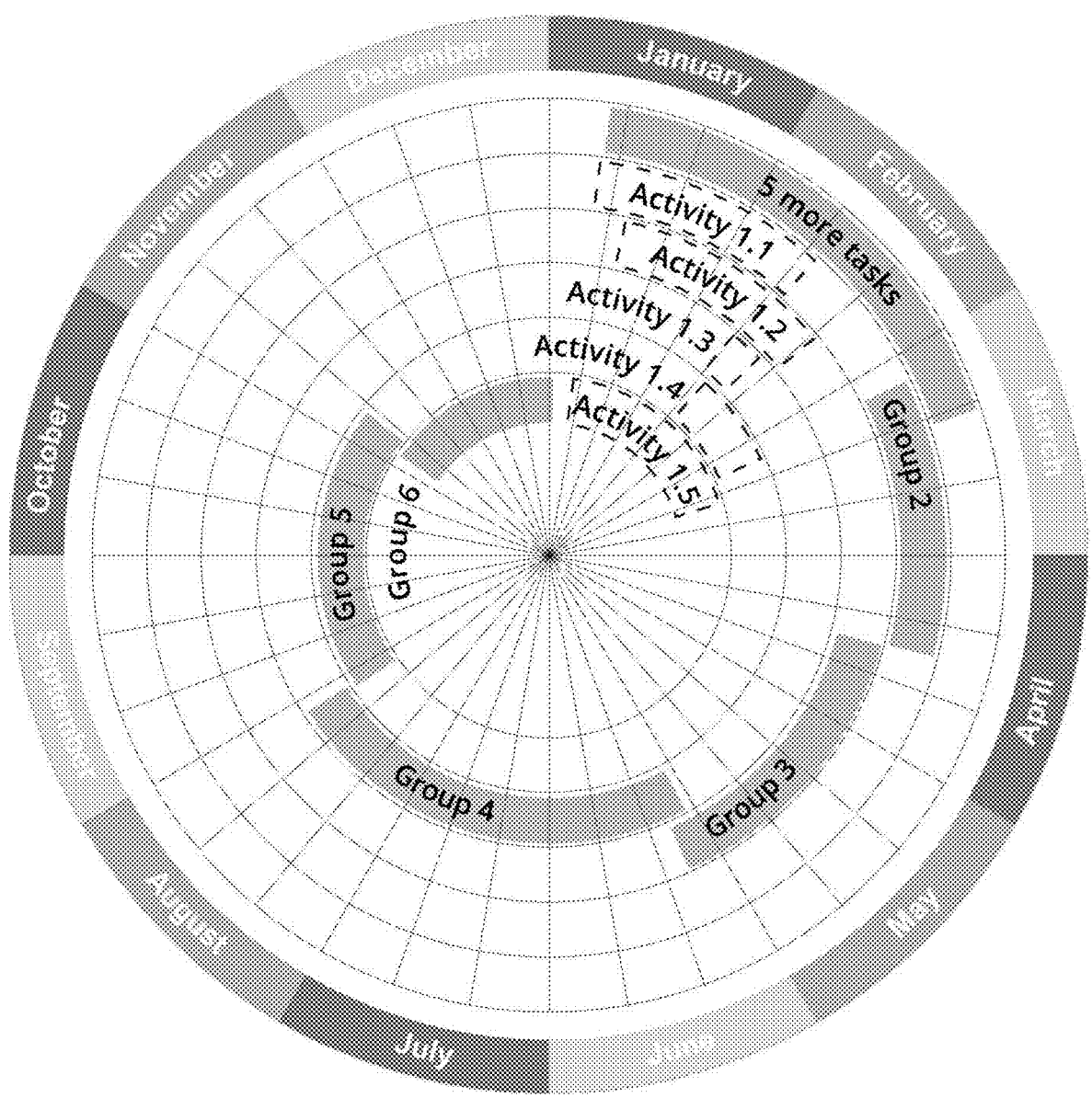
FIG. 36 is a fifth representation of a tasks to be extracted from a group.

Referring to FIG. 36, the only remaining tasks are to re-calculate the start and end position of group 1 to accurately reflect the remaining tasks it contains and label the group. In this instance that label is "5 more tasks". FIG. 36 is a representation of a third representation where each data item that can be displayed separately has been extracted, and the remaining data items (tasks) in the cluster (group, e.g. group 1) are displayed as "5 more tasks".

With Group 1 processed, analysis and extraction of the tasks in group 2 is performed and thereafter, the remaining groups until the Vistogram is fully rendered. A useful by-product of the approach taken here is that near terms tasks (which will often be the focus of users) will be prioritised for extraction. Group 2 tasks will have somewhat less opportunity to be extracted that Group 1 tasks and so on.

Figure 37:
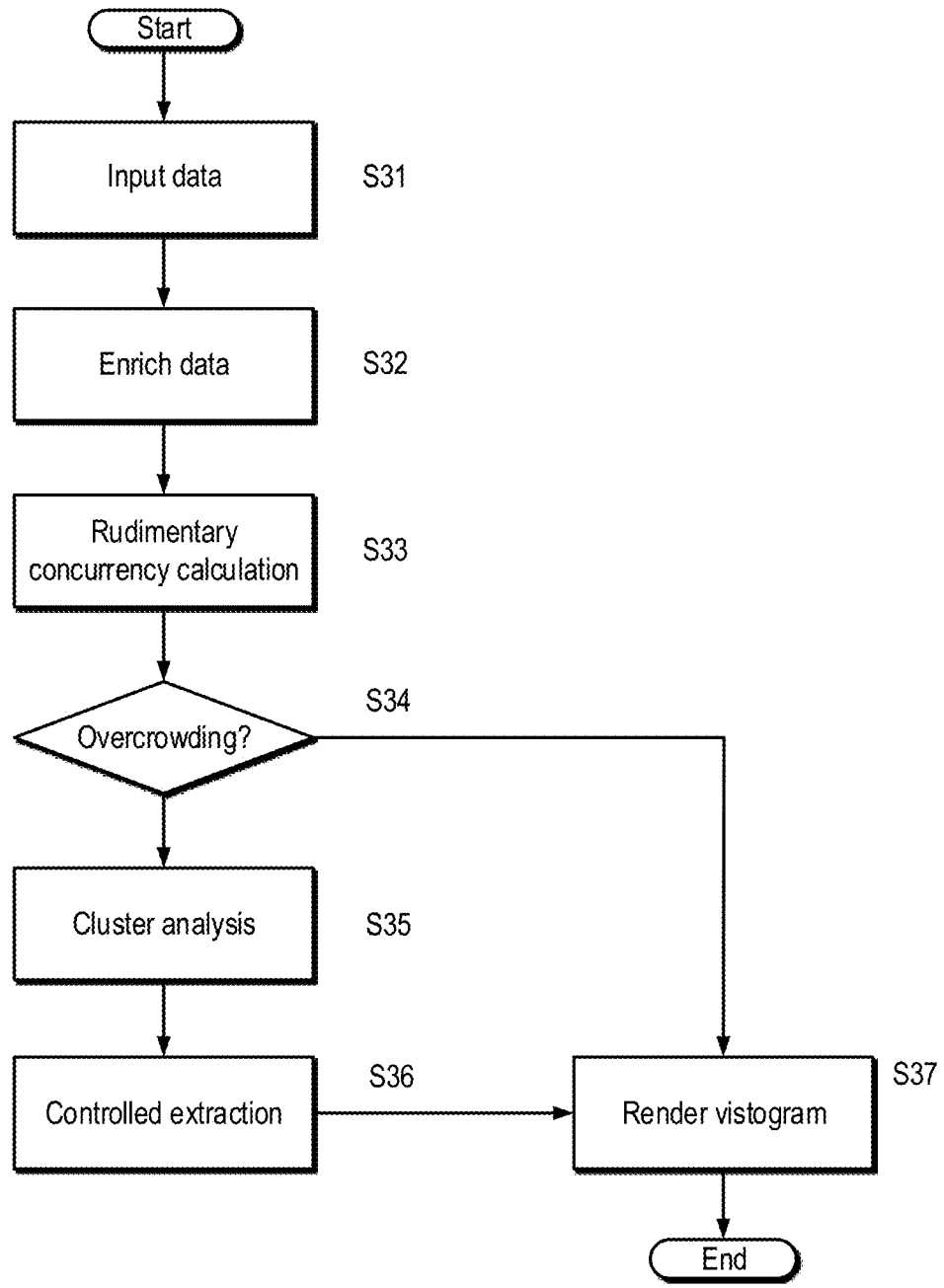
FIG. 37 is a process flow diagram for rendering a representation of data.

Referring to FIG. 37, in step S31, Input data can come from a variety of sources or, more often than not, several different sources. Data will be immediately enriched (step S32) as described to support the downstream analysis. A rudimentary assessment calculation of whether or not there are likely to be issues with 'over-crowding' is made (step S33). If a determination is made that overcrowding is not an issue, then the operation can proceed directly to rendering the Vistogram (step S34). If however overcrowding is an issue, the clustering analysis is performed (step S35). Upon completion of the cluster analysis, controlled extraction is performed, and the revised input data is generated (step S36).

Finally, in step S37, the Vistogram is either rendered with the non-clustered enriched data or the clustered enriched data.

The steps taken in the preceding paragraphs support, enable and deliver the display of PPM data sets of any size in a fixed display area. There has so far been considerable focus on schedule data and specifically data sets used in PPM settings. The point is made that schedule data, its uses and applications, is widespread. Equally, the sort of planning and tracking available in PPM settings is sought after and desired. It has wider scale applications and would be adopted in a broader array of settings if it was easier to generate, publish and consume.

As a by-product of the approaches and mechanisms described so far, the horizontal and vertical axis of any charting are now under control. This supports superimposing other data which is considered to be highly beneficial in a wide variety of settings.

Figure 38:
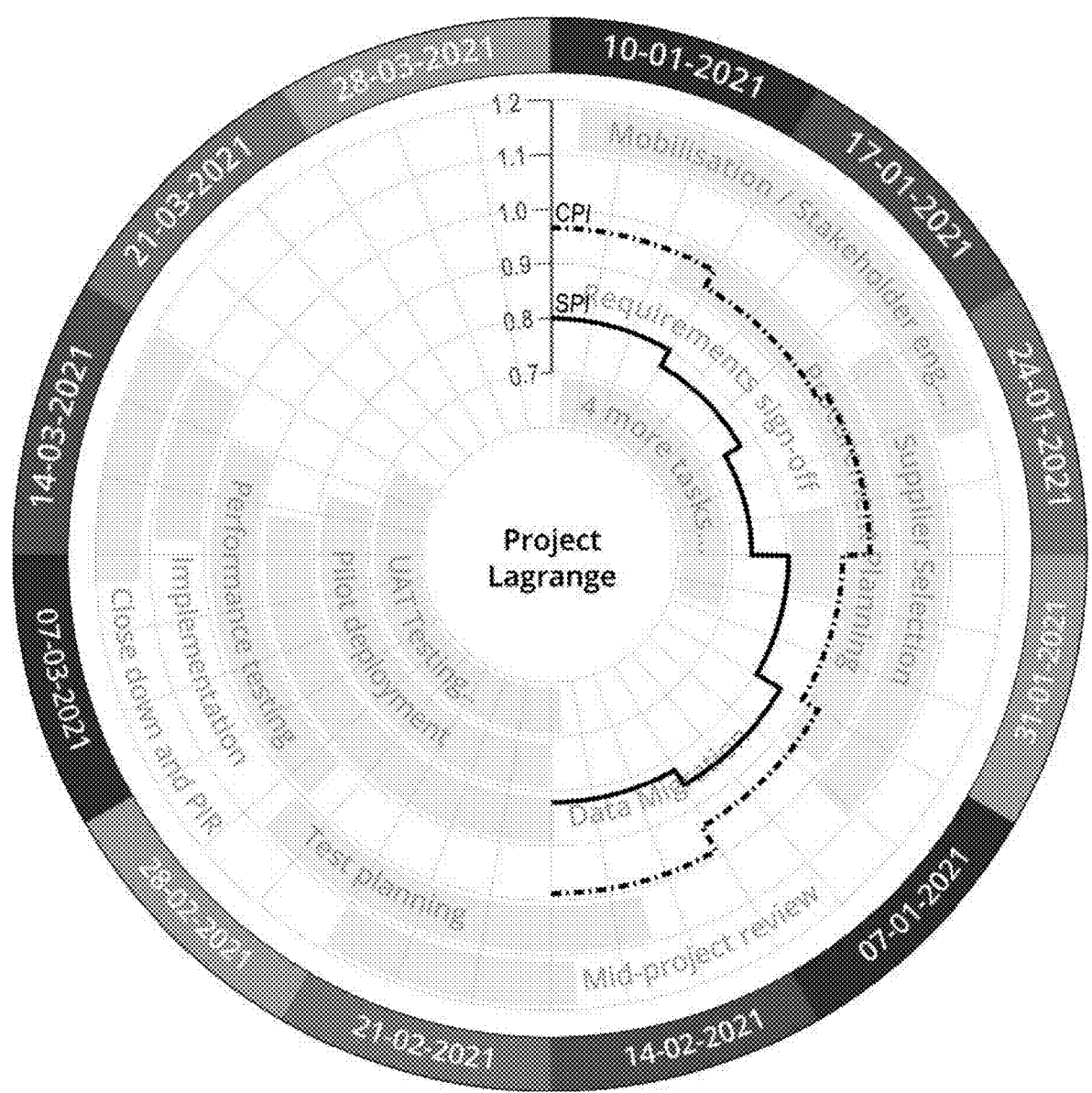
FIG. 38 is a first example of a representation of data according to the present application with additional data superimposed.
Figure 39:
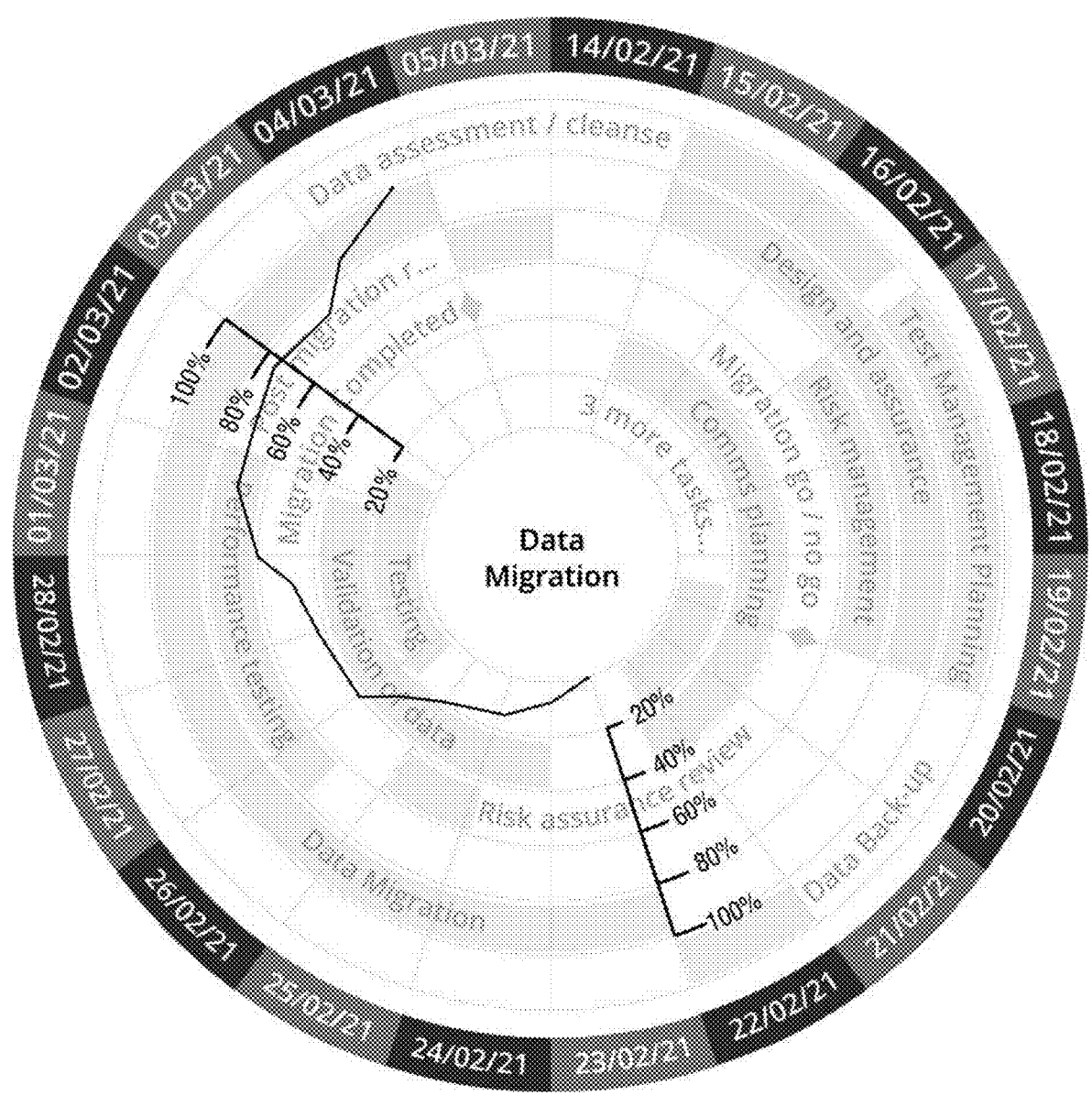
FIG. 39 is a second example of a representation of data according to the present application with additional data superimposed.
Figure 40:
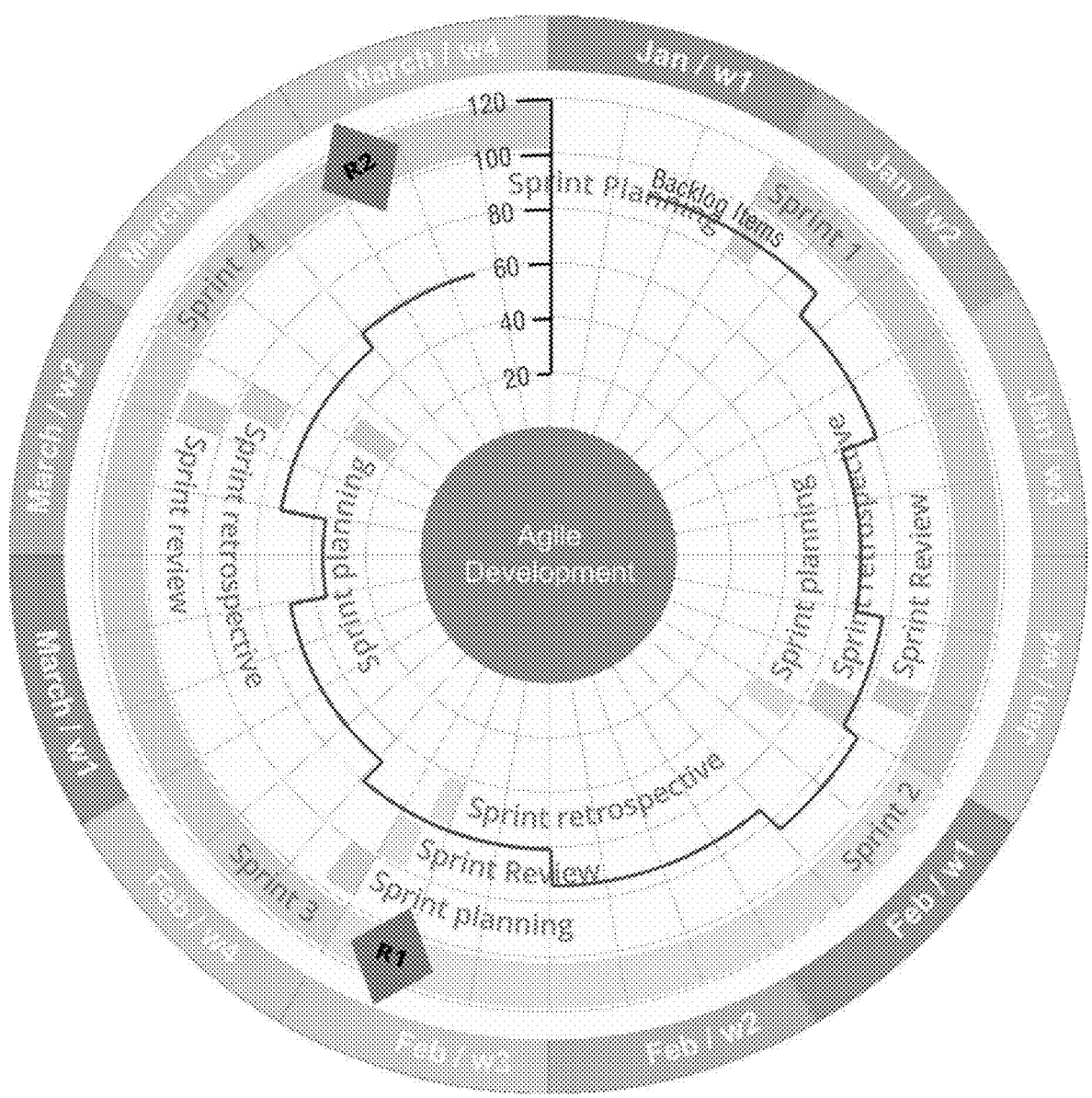
FIG. 40 is a third example of a representation of data according to the present application with additional data superimposed.

Referring to FIGS. 38, 39 and 40, three examples are shown. Creating a durable environment in which a variety of data sets can be superimposed programmatically is a direct consequence of the preceding steps to analyse, enrich and process the input data.

At an earlier point in this document, reference was made to a view that the selection of a radial format was potentially unduly skewing the approaches and mechanisms being put forward.

Equally, it was suggested that detailed review of the Vistogram radial format would set the scene for applying those same mechanisms to provide the same benefits and capabilities in a more recognisable format.

First however, it is worth visiting the topic of screen sizes and more specifically aspect ratios (i.e. the ratio of the horizontal display dimension relative to the vertical display dimension.

Figure 41:
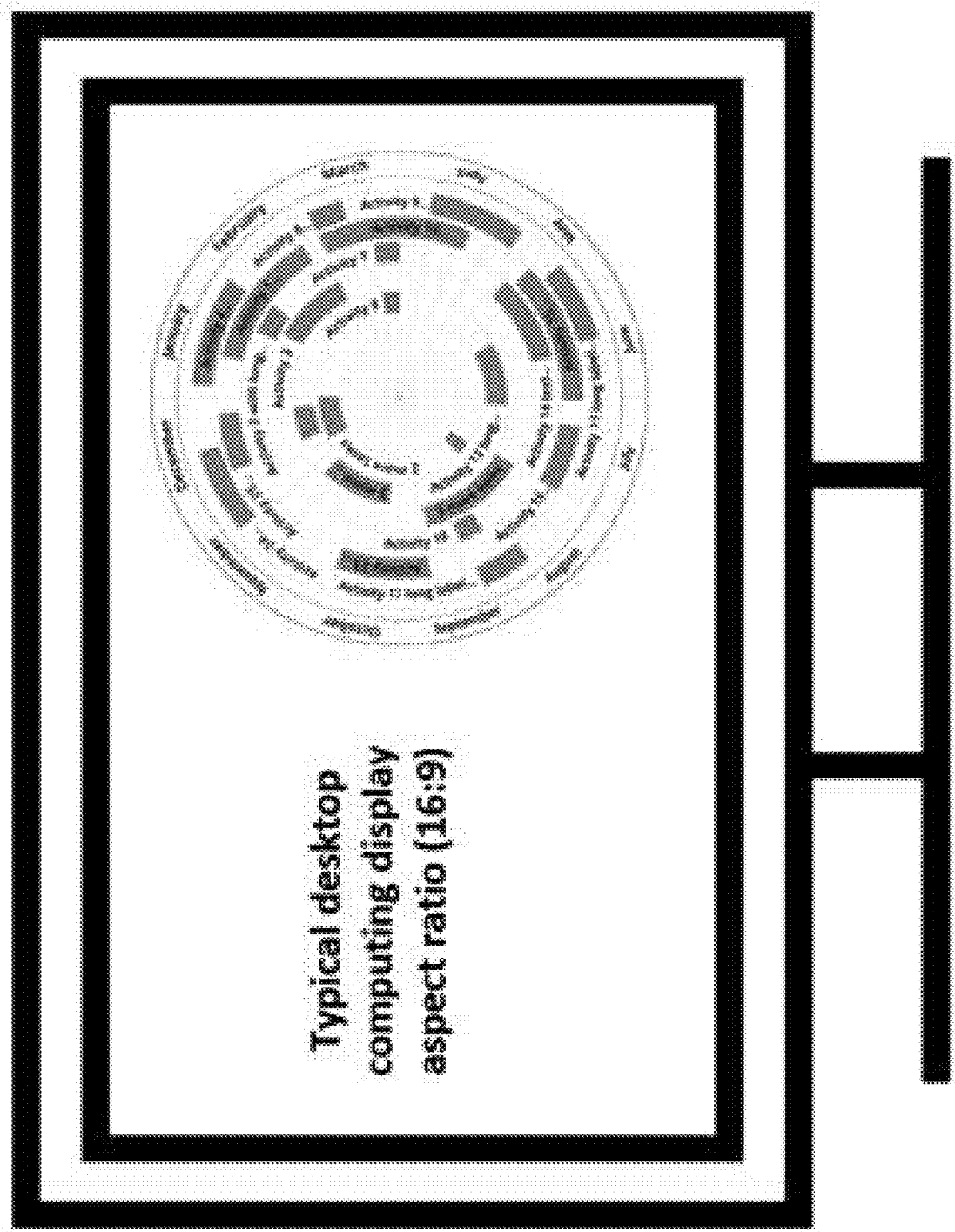
FIG. 41 is a schematic example of a representation of data according to the present application displayed on a computer screen.
Figure 42:
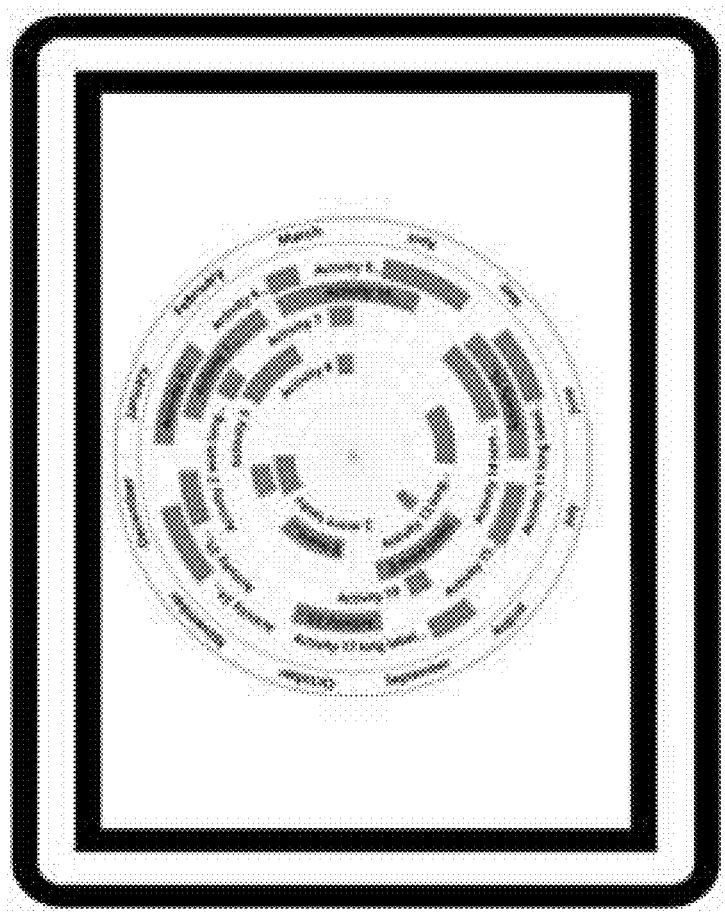
FIG. 42 is a schematic example of a representation of data according to the present application displayed on a tablet screen.
Figure 43:
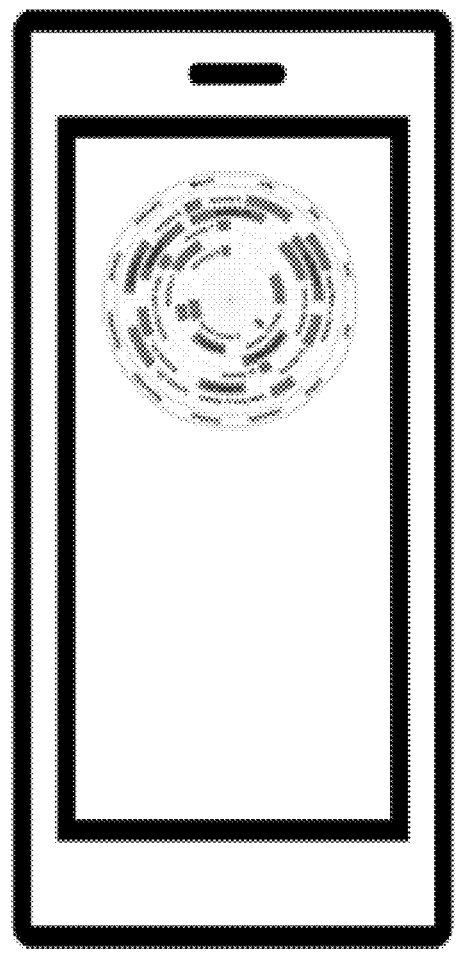
FIG. 43 is a schematic example of a representation of data according to the present application displayed on a smart phone screen.

Referring to FIGS. 41, 42, and 43, a typical aspect ratio of a desktop computer display (16:9) (FIG. 41), a tablet device (4:3) (FIG. 42) smartphone display (20:9) (FIG. 43).

What can be seen is that the Vistogram radial format, while utilising available screen area well on some devices is not well suited so smart phones or wide screen displays.

Figure 44:
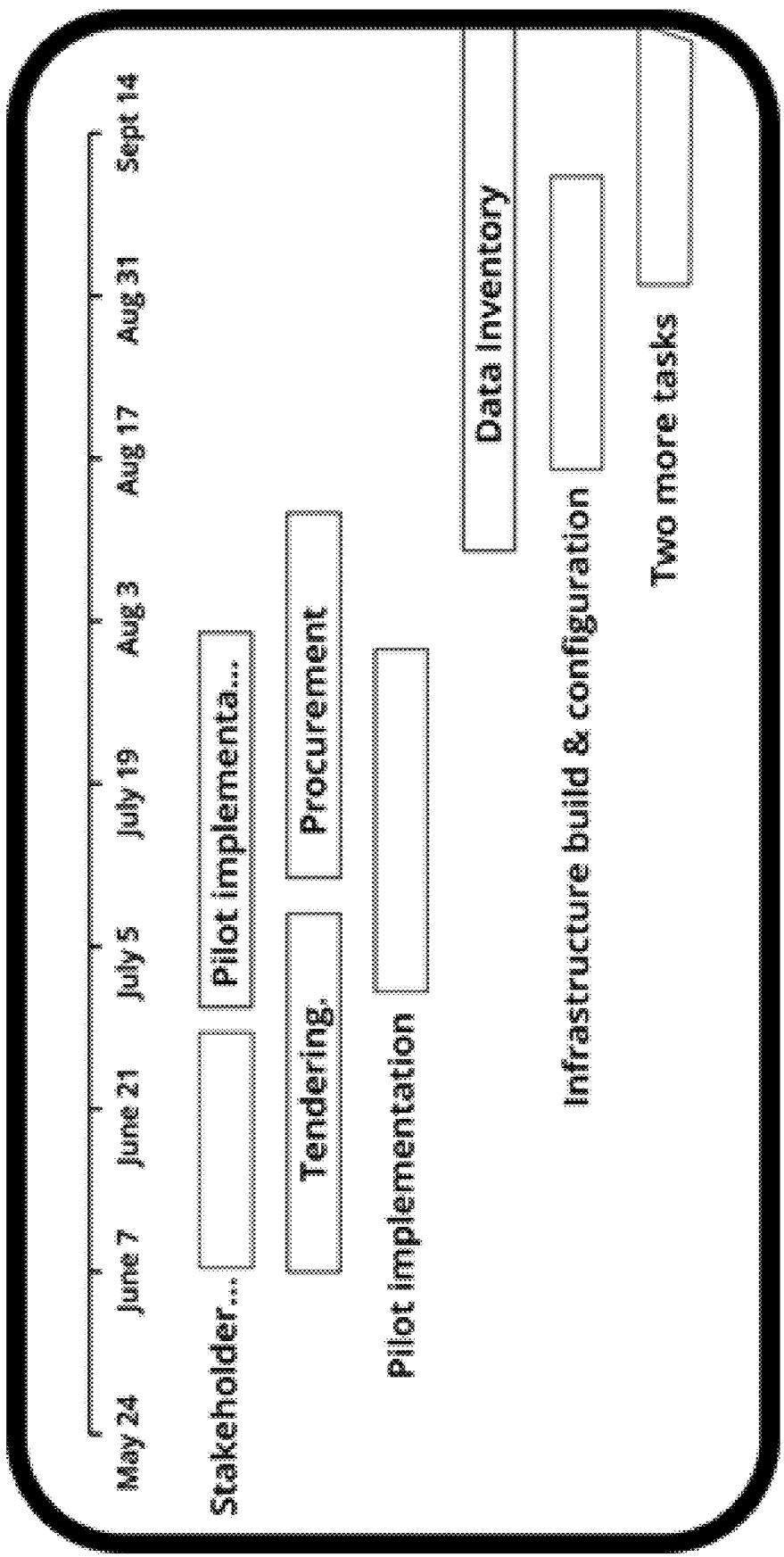
FIG. 44 is linear representation of data according to the present application.

The following content will set out how the approaches described so far can be used to produce an output, and example of which is illustrated in FIG. 44.

Figure 45:
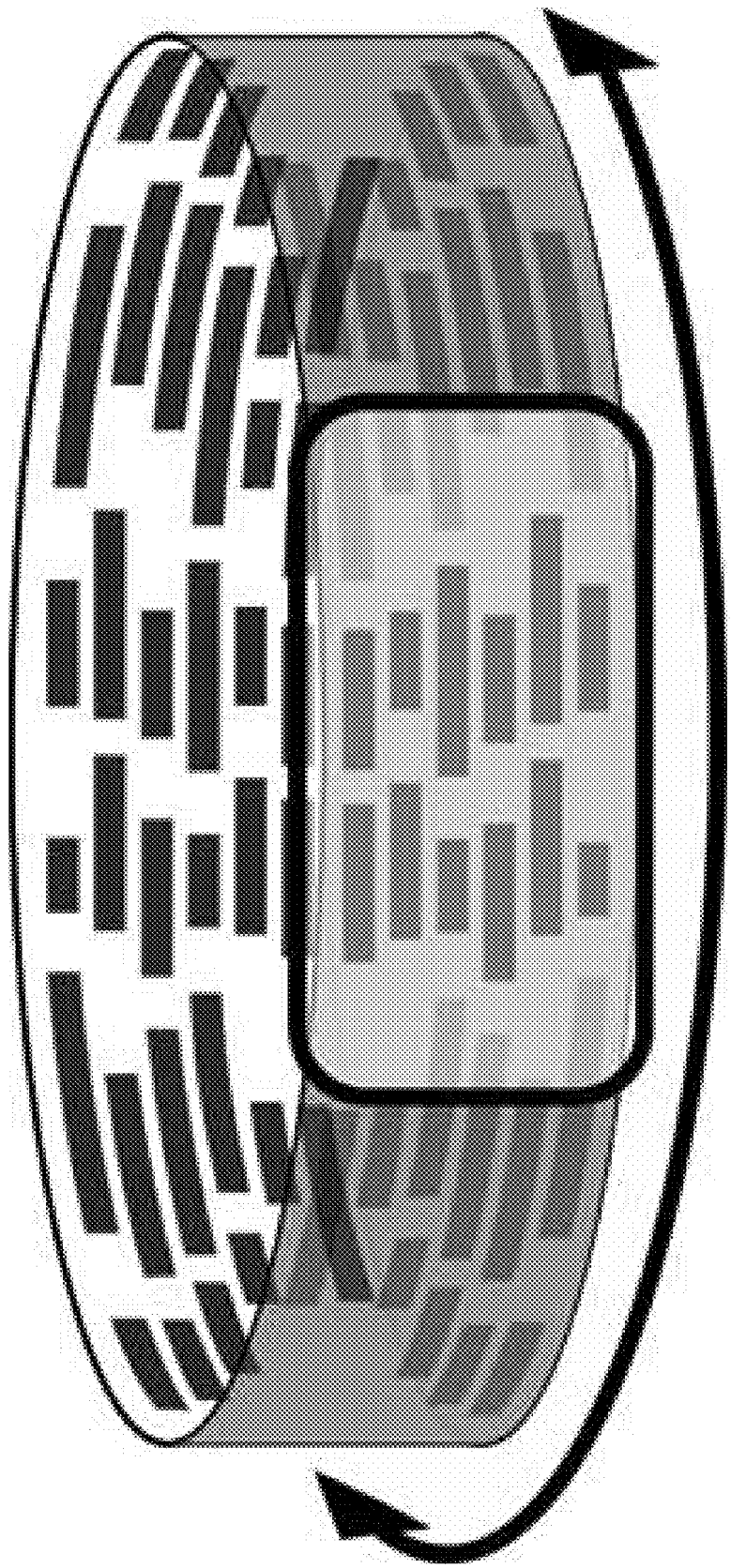
FIG. 45 is a first schematic of a representation of data according to the present application.

A considerable amount of work and processing overhead has been undertaken in order to generate the Vistogram previously described. It would be high advantageous if the same processes and output data could be re-used to suit this new objective. Referring to FIG. 45, we can see how the data processed and enriched for use in a radial format can be re-used to produce a format that is presented as 'flat' to the end user but nevertheless exploits the grouping, angular calculations and extraction previous developed.

In order to provide the best possible flexibility to the end user, both landscape (above) and portrait (below) orientations are catered for. In the landscape scenario above, fewer concurrent tasks are visible and less extraction may be possible. The trade-off is a longer time frame is supported.

Figure 46:
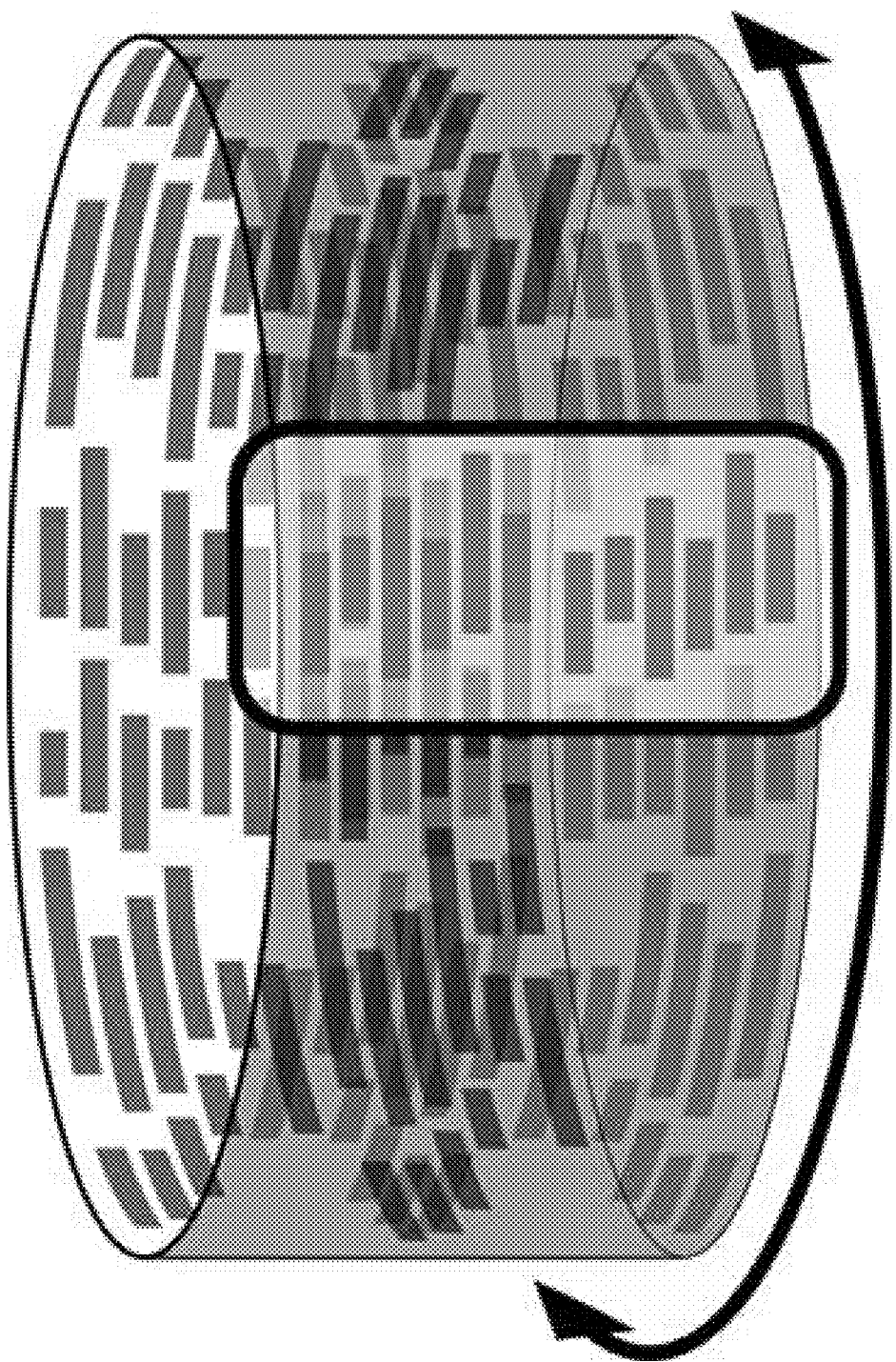
FIG. 46 is second schematic of a representation of data according to the present application.

Referring to FIG. 46, more concurrent tasks can be presented to the user but over a shorter time-frame.

In either event, it is very much the same analysis, enrichment and processing of the data that supports the display of data.

Figure 47:
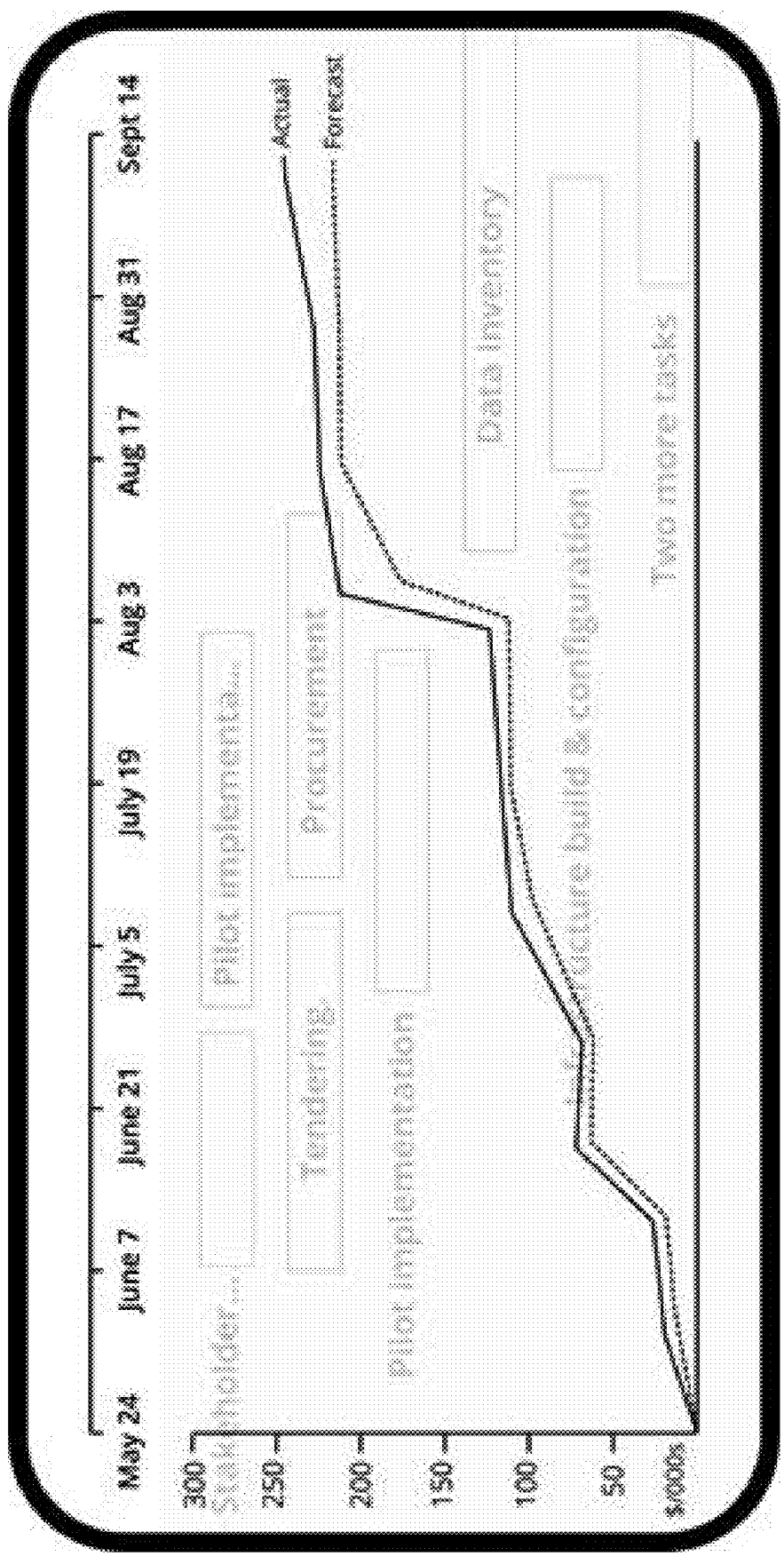
FIG. 47 is a fourth example of a representation of data according to the present application with additional data superimposed.

Referring to FIG. 47, since the horizontal and vertical axis are under control, other data sets can be superimposed.

A further elaboration can support a scalable vertical axis which could be utilised similarly to optimise the number of 'rows' available to the user. If used, the interface would not have to be constrained to a hard limit of (say) 6 rows as shown in FIG. 47. A different number of rows could be used which exceeded the display area while still controlling the vertical access and providing a practical ceiling for the number of rows exposed at any one time. Simply put, 12 rows might be more useful than 6 and will always be more useful than 1000.

Figure 48:
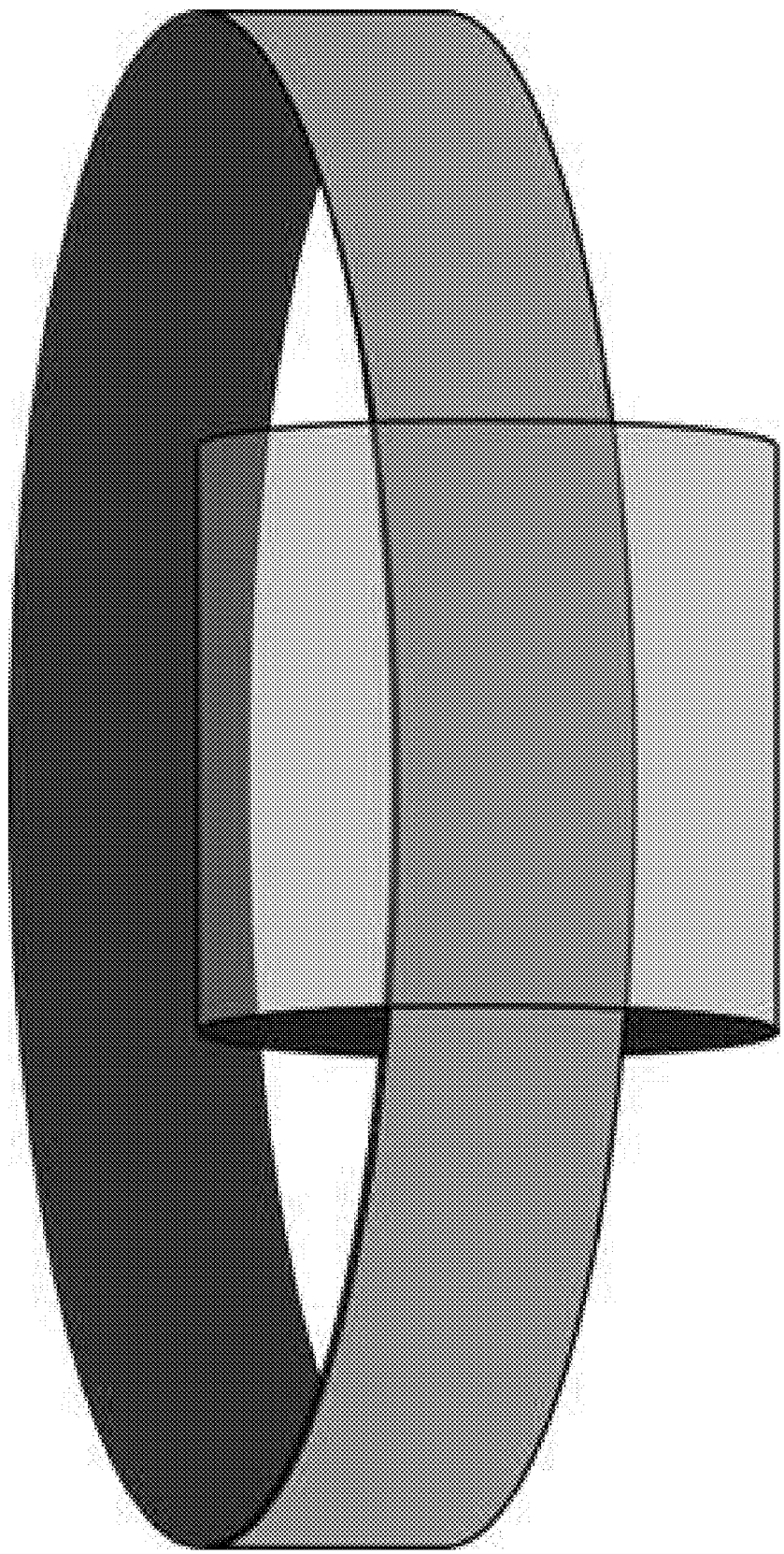
FIG. 48 is a schematic of how data may be rendered to fit into a display area.

Referring to FIG. 48, using the surface of a cylinder provides the means to control, rationalise and render data consistently and usefully. First, in one dimension to control the horizontal axis. If desired, doing the same thing in the vertical axis provide flexibility to expose more data while still controlling what is displayed to the user.

Modifications

It will be appreciated that various modifications may be made to the embodiments hereinbefore described. Such modifications may involve equivalent and other features which are already known in the design and use of methods for displaying a representation of data which may be used instead of or in addition to features already described herein. Features of one embodiment may be replaced or supplemented by features of another embodiment.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. A method executed by a digital electronic processor communicatively coupled to at least one display device, comprising:
   receiving a dataset comprising a plurality of data items, each data item comprising one or more parameters;
   in response to determining that a first representation of the plurality of data items fits within a display area of the at least one display device, outputting the first representation to the display area;
   in response to determining that the first representation exceeds the display area:
      determining one or more clusters of data items by performing a clustering analysis based on at least one of the one or more parameters, wherein each cluster of the one or more clusters of data items corresponds to a sub-region of the display area;
      for each given cluster of data items:
         in response to determining that a second representation of all the data items belonging to the given cluster fits within the respective sub-region, outputting the second representation to the respective sub-region;
         in response to determining that the second representation exceeds the respective sub-region:
            generating a third representation comprising an individual representation of each data item belonging to a display subset of the given cluster and an aggregated representation of the data items of the given cluster not included in the display subset; and
            outputting the third representation to the respective sub-region of the display.

2. The method of claim 1, wherein a coordinate system spans the display area and is parameterised by a first coordinate and a second coordinate, wherein the one or more parameters comprise a first parameter; and
   the first representation comprises representing each given data item of the plurality of data items with a graphic having a first coordinate value based on the first parameter of the given data item, and a second coordinate value which is different to the rest of the plurality of data items.

3. The method of claim 2, wherein each sub-region corresponds to a range of first coordinate values, and wherein the second representation comprises, for the or each given cluster, representing each data item of the given cluster with the graphic having a first coordinate value based on the first parameter of the given data item and a second coordinate value which is different to the rest of the data items belonging to the given cluster.

4. The method of claim 3, wherein two or more clusters of data items are determined and wherein the range of first coordinate values corresponding to the sub-region corresponding to a given cluster of the two or more clusters overlaps the range of first coordinate values corresponding to one or more sub-regions corresponding to other clusters of the two or more clusters.

5. The method of claim 4, wherein the two or more clusters of data items are processed sequentially, wherein areas corresponding to any graphics belonging to the second or third representation of a previously processed cluster are removed from sub-regions corresponding to any subsequently processed clusters.

6. The method of claim 3, wherein the third representation comprises:
   representing the aggregated representation with the graphic having a first coordinate value based on the first parameters of the data items of the given cluster not included in the display subset; and representing the individual representation of each given item belonging to the display subset of the given cluster with the graphic having a first coordinate value based on the first parameter of the given data item and a second coordinate value which is different to the rest of the data items belonging to display subset and the aggregated representation.

7. The method of claim 6, wherein:

the one or more parameters comprise a second parameter; and the graphic corresponding to the aggregated representation has a length spanning a range of first coordinate values based on the first parameters of the data items of the given cluster not included in the display subset and on second parameters of the data items of the given cluster not included in the display subset.

8. The method of claim 2, wherein:

the one or more parameters comprise a second parameter; and the graphic corresponding to a given data item has a length spanning a range of first coordinate values based on the first parameter and second parameter of the given data item.

9. The method of claim 2, wherein:

the one or more parameters comprise a third parameter; and second coordinate values of graphics corresponding to a given data item are based on the third parameter of the given data item.

10. The method of claim 1, wherein generating the third representation further comprises iteratively adding data items to the display subset one at a time until any further addition would cause the third representation to exceed the respective sub-region.

11. The method of claim 10 wherein generating the third representation further comprises:

extracting data items from the given cluster one at a time;

for each data item extracted from the cluster, determining whether the individual representation of the extracted data item plus the existing third representation fits within the respective sub-region; and in response to a positive determination, adding the data item to the display subset.

12. The method of claim 1, wherein the display area is user selectable.

13. The method of claim 1, wherein the first representation comprises the plurality of data items formatted according to one or more first display rules;

wherein each second representation comprises the plurality of data items of the respective cluster formatted according to one or more second display rules; and/or wherein each third representation comprises the individual representations of the data items belonging to the display subset and the aggregated representation, formatted according to one or more third display rules.

14. The method of claim 1, further comprising:

displaying text associated with a given data item superimposed on the representation of the given data item; or displaying text associated with the given data item adjacent to the representation of the data item.

15. The method of claim 1 further comprising providing a graphical user interface to the at least one display device for visualising a hierarchical tree structure of data items having two or more levels including a top level, a bottom level and zero or more intermediate levels, each data item comprising one or more parameters.

16. The method of claim 15, wherein the subset is limited to all or some of the data items belonging to a given layer of the hierarchical tree structure.

17. The method of claim 16, wherein, in response to receiving a user input to change the displayed layer of the hierarchical tree structure, the method further comprises receiving a new dataset comprising a subset of the hierarchical tree structure limited to all or some of the data items belonging to the user selected layer of the hierarchical tree structure.

18. The method of claim 17, wherein the user input takes the form of a user selecting the representation of a given data item which has one or more descendant data items within the hierarchical tree structure, wherein the new dataset comprises the data items descended from the given data item and belonging to next layer down the hierarchical tree structure.

19. A computing device comprising:

a memory; and at least one processor configured for:

receiving a dataset comprising a plurality of data items, each data item comprising one or more parameters;

in response to determining that a first representation of the plurality of data items fits within a display area of at least one display device communicatively coupled the at least one processor, outputting the first representation to the display area;

in response to determining that the first representation exceeds the display area:

determining one or more clusters of data items by performing a clustering analysis based on at least one of the one or more parameters, wherein each cluster of the one or more clusters of data items corresponds to a sub-region of the display area;

for each given cluster of data items:

in response to determining that a second representation of all the data items belonging to the given cluster fits within the respective sub-region, outputting the second representation to the respective sub-region;

in response to determining that the second representation exceeds the respective sub-region:

generating a third representation comprising an individual representation of each data item belonging to a display subset of the given cluster and an aggregated representation of the data items of the given cluster not included in the display subset; and outputting the third representation to the respective sub-region of the display.

20. A non-transitory computer readable medium (CRM), storing one or more programs for execution by one or more processors of a computing device, the one or more programs including instructions for:

receiving a dataset comprising a plurality of data items, each data item comprising one or more parameters;

in response to determining that a first representation of the plurality of data items fits within a display area of at least one display device communicatively coupled to the one or more processors, outputting the first representation to the display area;

in response to determining that the first representation exceeds the display area:

determining one or more clusters of data items by performing a clustering analysis based on at least one of the one or more parameters, wherein each cluster of the one or more clusters of data items corresponds to a sub-region of the display area;

for each given cluster of data items:
  in response to determining that a second representation of all the data items belonging to the given cluster fits within the respective sub-region, outputting the second representation to the respective sub-region;
  in response to determining that the second representation exceeds the respective sub-region:
    generating a third representation comprising an individual representation of each data item belonging to a display subset of the given cluster and an aggregated representation of the data items of the given cluster not included in the display subset;
    and outputting the third representation to the respective sub-region of the display.

\* \* \* \* \*